(12) United States Patent
Anderson

(10) Patent No.: US 8,739,593 B2
(45) Date of Patent: Jun. 3, 2014

(54) FOIL CONFIGURING DEVICE

(71) Applicant: Lawrence E Anderson, Arlington, VA (US)

(72) Inventor: Lawrence E Anderson, Arlington, VA (US)

(*) Notice: Subject to any disclaimer, the term of this patent is extended or adjusted under 35 U.S.C. 154(b) by 0 days.

(21) Appl. No.: 13/887,356

(22) Filed: May 5, 2013

(65) Prior Publication Data

US 2013/0269409 A1  Oct. 17, 2013

Related U.S. Application Data

(63) Continuation-in-part of application No. 13/842,321, filed on Mar. 15, 2013, which is a continuation-in-part of application No. 13/011,893, filed on Jan. 22, 2011, now Pat. No. 8,490,458.

(51) Int. Cl.
*B21C 37/12* (2006.01)
*B21D 15/00* (2006.01)

(52) U.S. Cl.
USPC ........... 72/379.6; 72/199; 72/211; 72/224; 72/252.5; 99/444; 99/450; 493/194

(58) Field of Classification Search
USPC ........ 72/196, 324, 379.2, 379.6, 326, 414, 72/199, 211, 224, 252.5; 29/623.1; 493/60, 194, 355; 225/49, 91; 428/595, 428/596; 99/444, 450
See application file for complete search history.

(56) References Cited

U.S. PATENT DOCUMENTS

| | | | | |
|---|---|---|---|---|
| 2,290,608 A * | 7/1942 | Evans | ........................ | 72/196 |
| 2,880,860 A * | 4/1959 | Rhoades et al. | ........... | 242/160.4 |
| 3,335,592 A * | 8/1967 | Woodling | ........................ | 72/196 |
| 3,408,735 A * | 11/1968 | Eisler | ........................ | 29/610.1 |
| 3,566,643 A * | 3/1971 | Westerbarkey | ........... | 72/49 |
| 4,058,996 A * | 11/1977 | Schaefer et al. | ........... | 72/49 |
| 4,366,691 A * | 1/1983 | Schafer | ........................ | 72/84 |
| 4,622,838 A * | 11/1986 | Schafer | ........................ | 72/49 |
| 4,794,052 A * | 12/1988 | Morrison | ........................ | 428/595 |
| 4,969,449 A * | 11/1990 | Levin | ........................ | 126/332 |
| 5,007,271 A * | 4/1991 | Boegli | ........................ | 72/196 |
| 5,226,571 A * | 7/1993 | Eastwood et al. | ........... | 225/49 |
| 5,447,097 A * | 9/1995 | Rhee | ........................ | 99/450 |
| 5,586,491 A * | 12/1996 | Diller et al. | ........... | 99/450 |
| 6,052,447 A * | 4/2000 | Golden et al. | ........... | 379/114.1 |
| 6,176,819 B1 * | 1/2001 | Boegli et al. | ........... | 493/355 |
| 6,655,184 B2 * | 12/2003 | Meaney et al. | ........... | 72/196 |
| 6,715,411 B1 * | 4/2004 | Boegli | ........................ | 101/6 |
| 7,036,347 B2 * | 5/2006 | Boegli | ........................ | 72/196 |
| 7,279,016 B2 * | 10/2007 | Allen | ........................ | 29/623.1 |
| 7,641,193 B2 * | 1/2010 | Barinaga et al. | ........... | 271/277 |
| 8,387,432 B2 * | 3/2013 | Ross et al. | ........... | 72/185 |
| 8,490,458 B2 * | 7/2013 | Anderson | ........... | 72/379.6 |
| 2013/0233042 A1 * | 9/2013 | Anderson | ........... | 72/372 |
| 2013/0269409 A1 * | 10/2013 | Anderson | ........... | 72/380 |

* cited by examiner

*Primary Examiner* — David B Jones

(57) ABSTRACT

A device for configuring foil for use in cooking food comprising: a base portion; a first plurality of rotatable elements operatively associated with the base portion; a support mounted on the base portion; and a second plurality of rotatable elements operatively associated with the support; the support operating to pivot relative to the base portion so as to allow entry of foil between the first and second plurality of rotatable elements in a first position and engagement of the first and second plurality of rotatable elements in a second position; whereby in the second position the first and second plurality of rotatable elements impart a configuration to the foil.

20 Claims, 53 Drawing Sheets

FIG. 1 TOP VIEW

FIG. 2 FRONT VIEW

FIG. 3 SIDE VIEW

FIG. 4 TOP VIEW

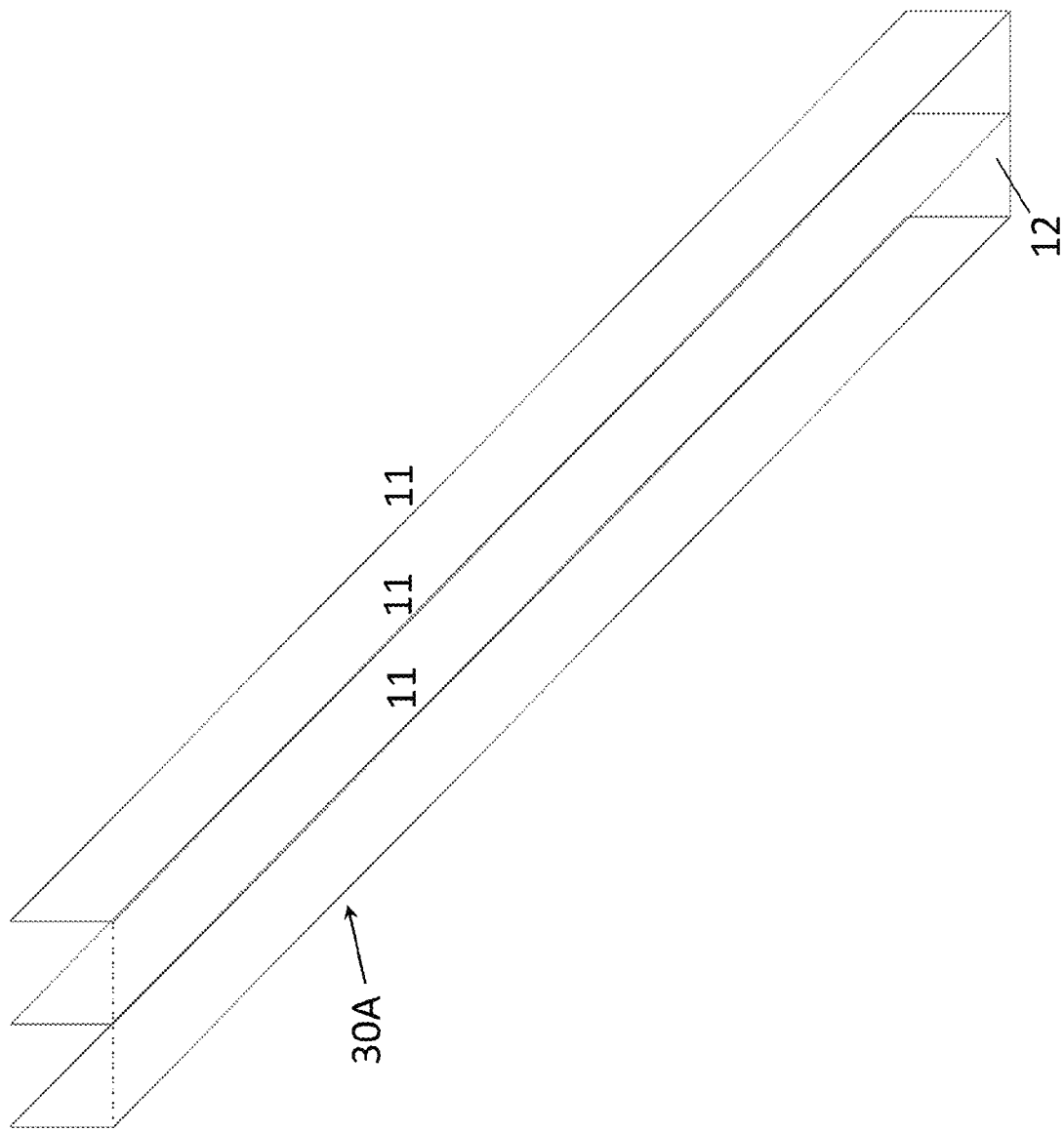

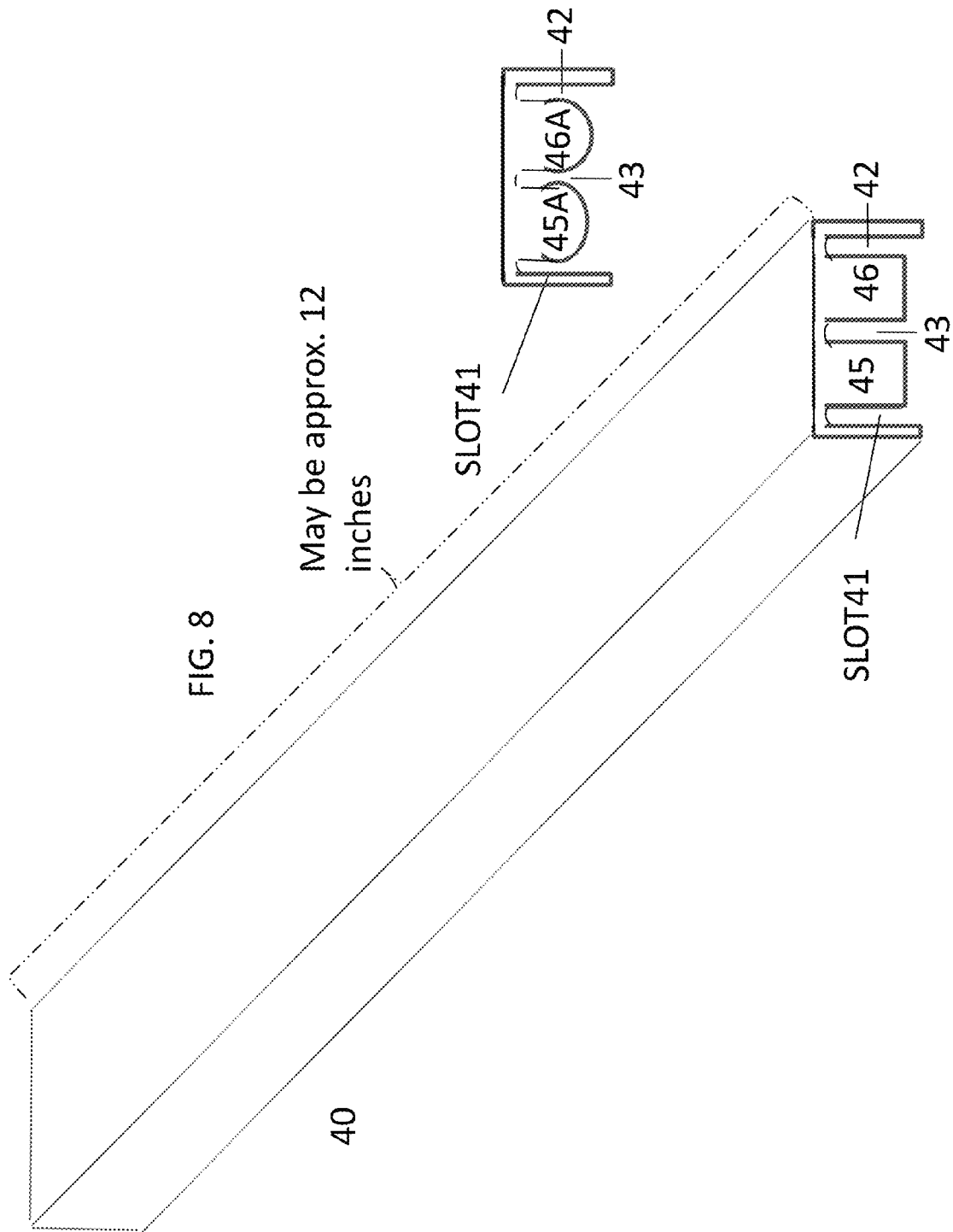

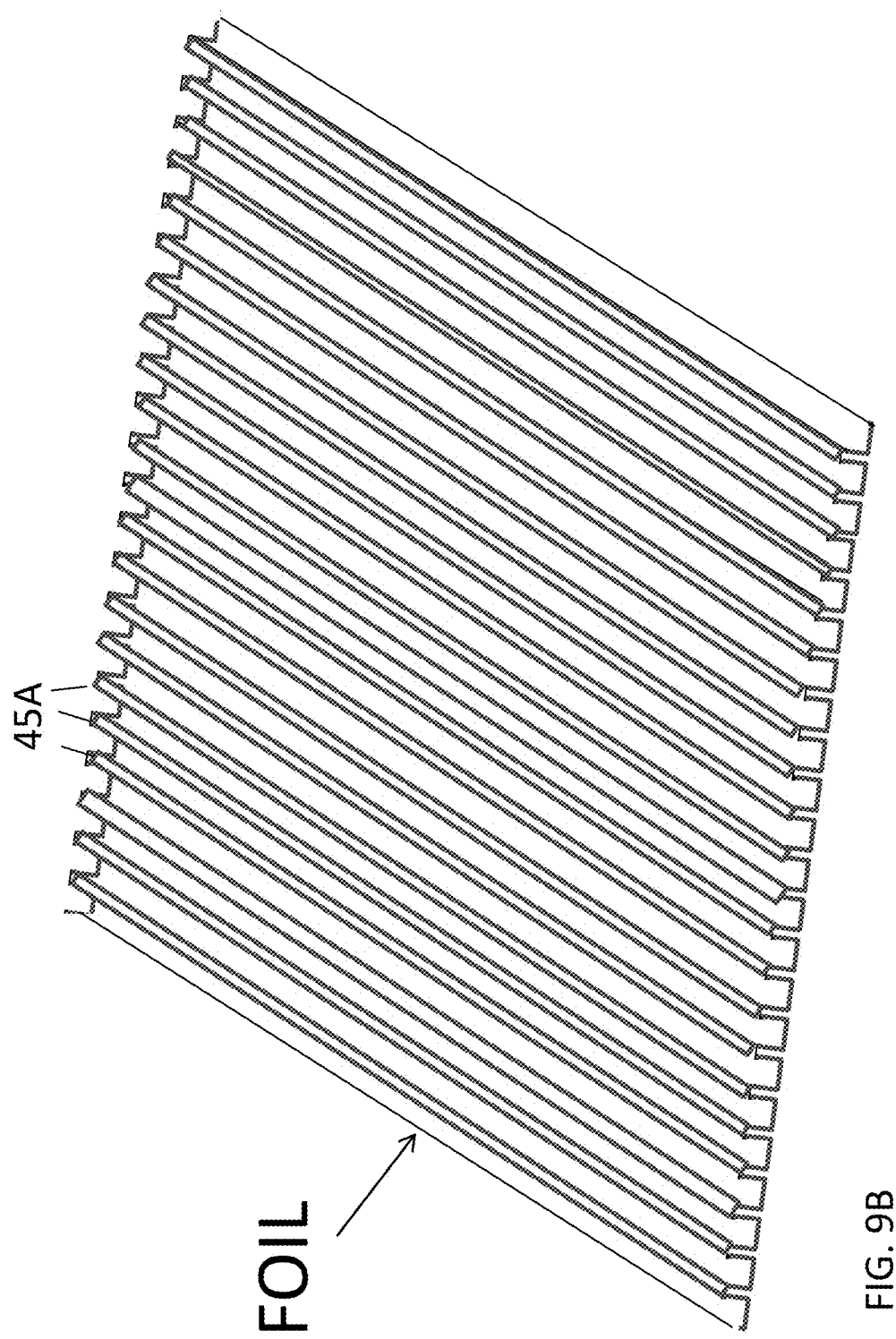

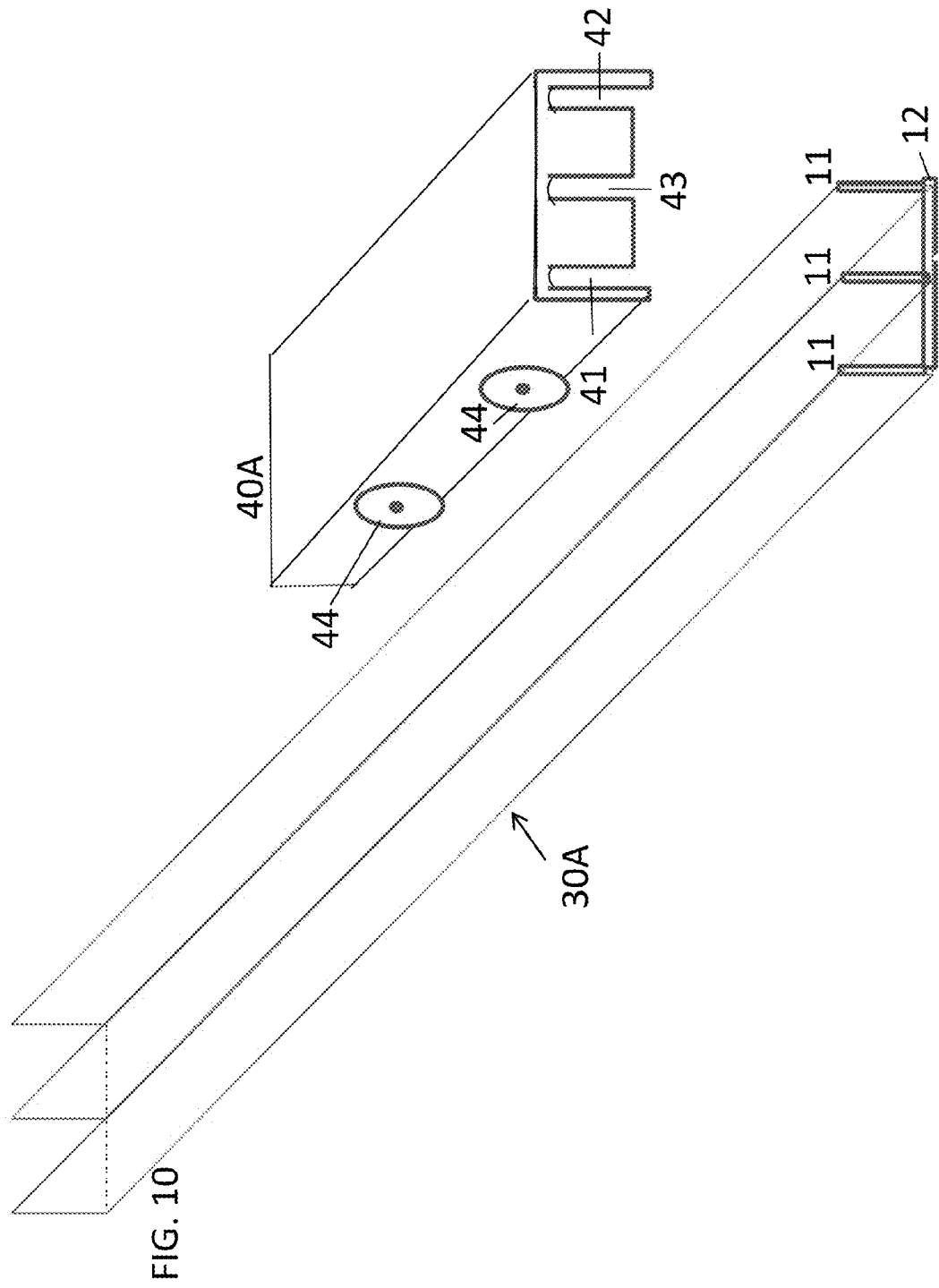

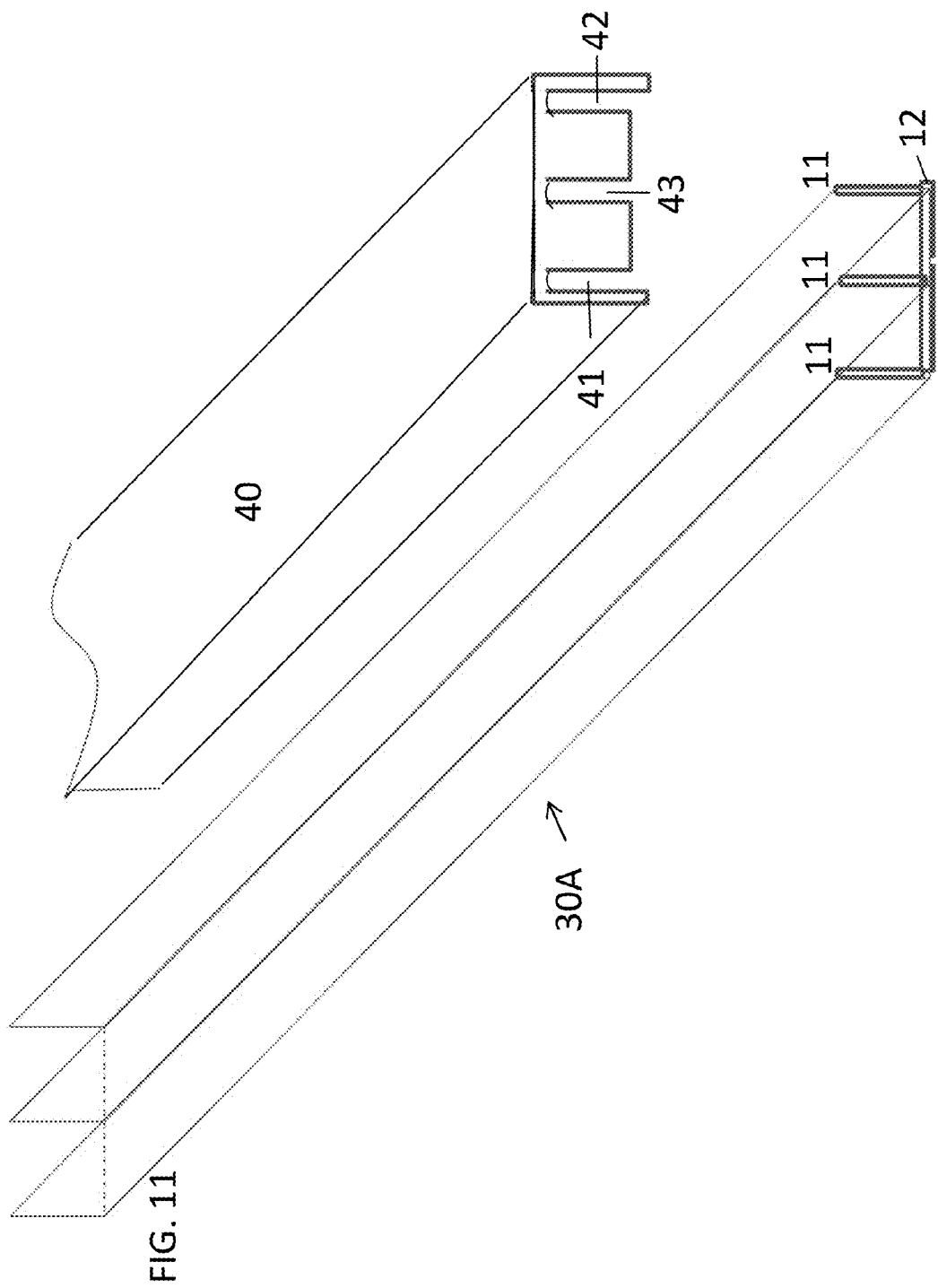

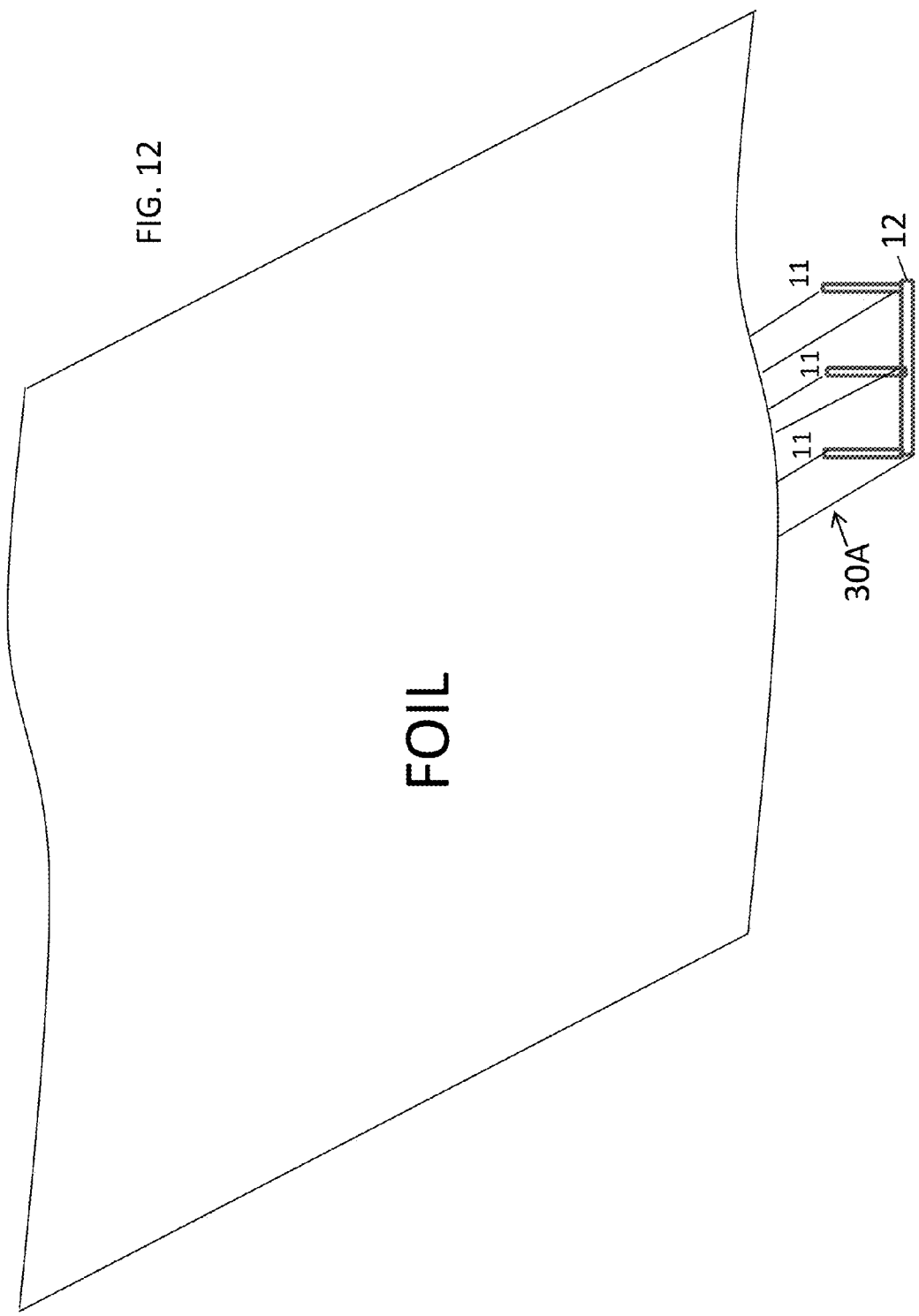

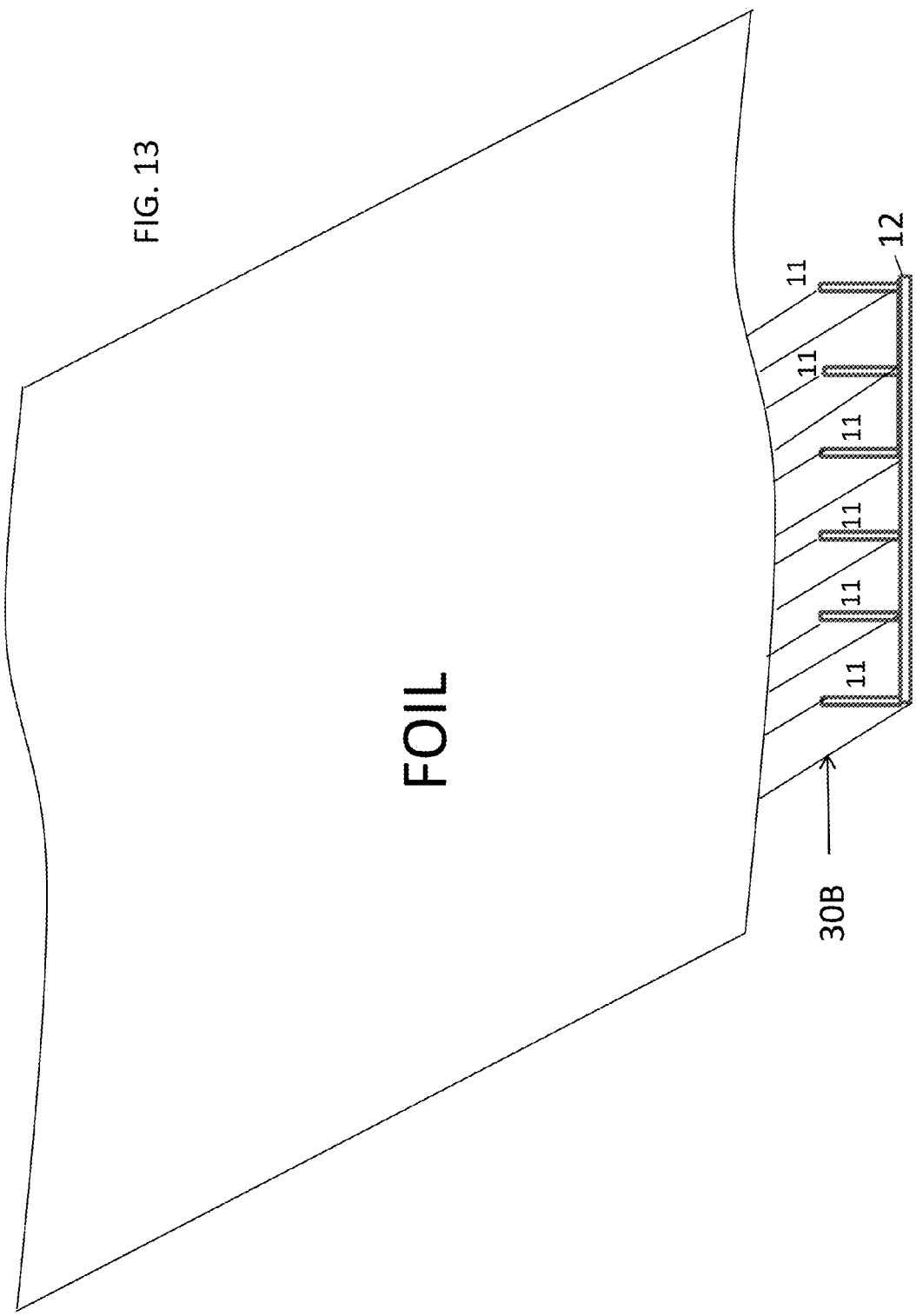

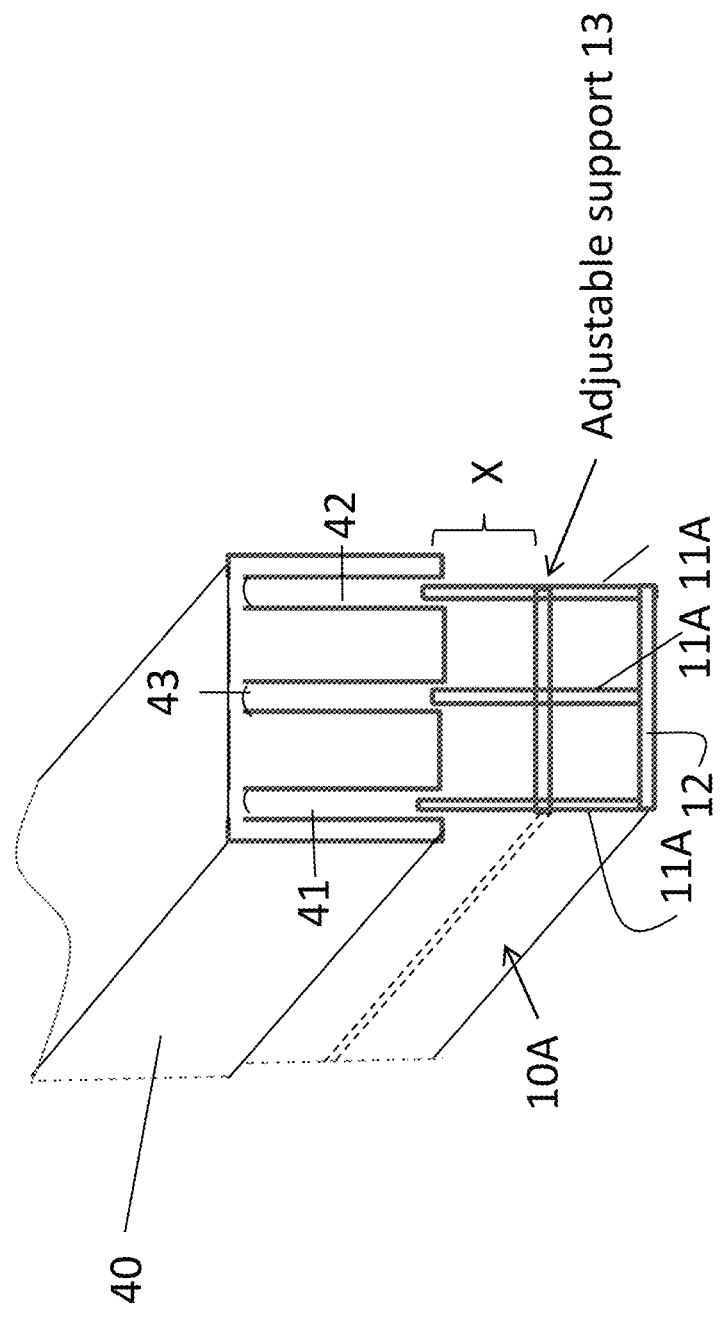

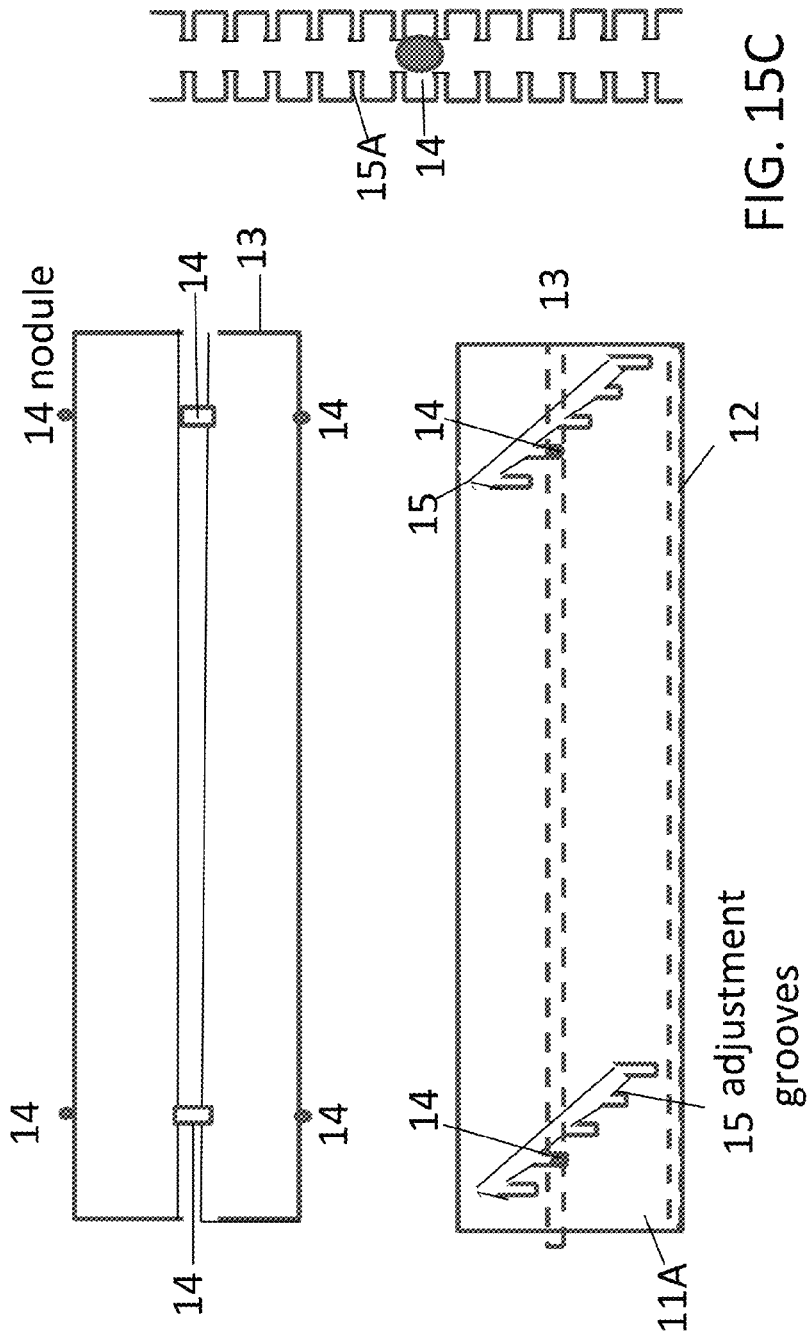

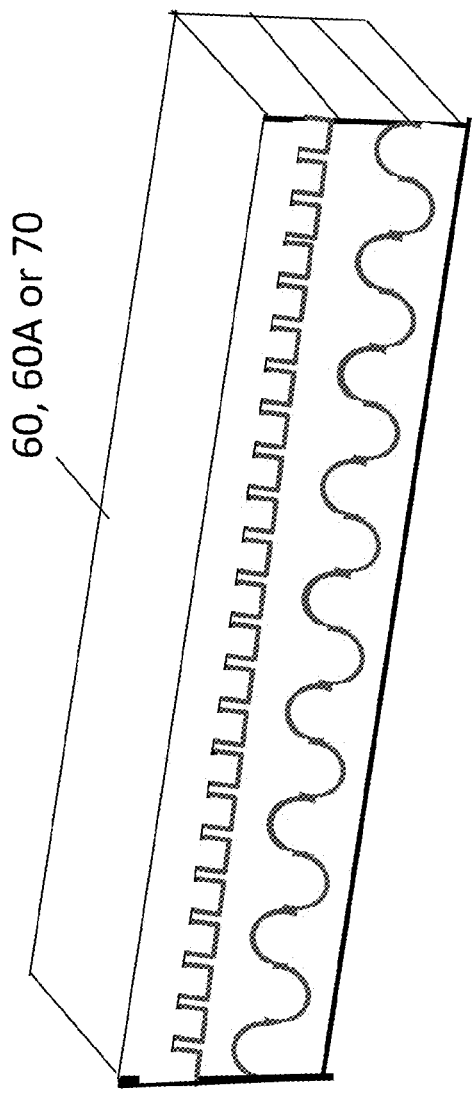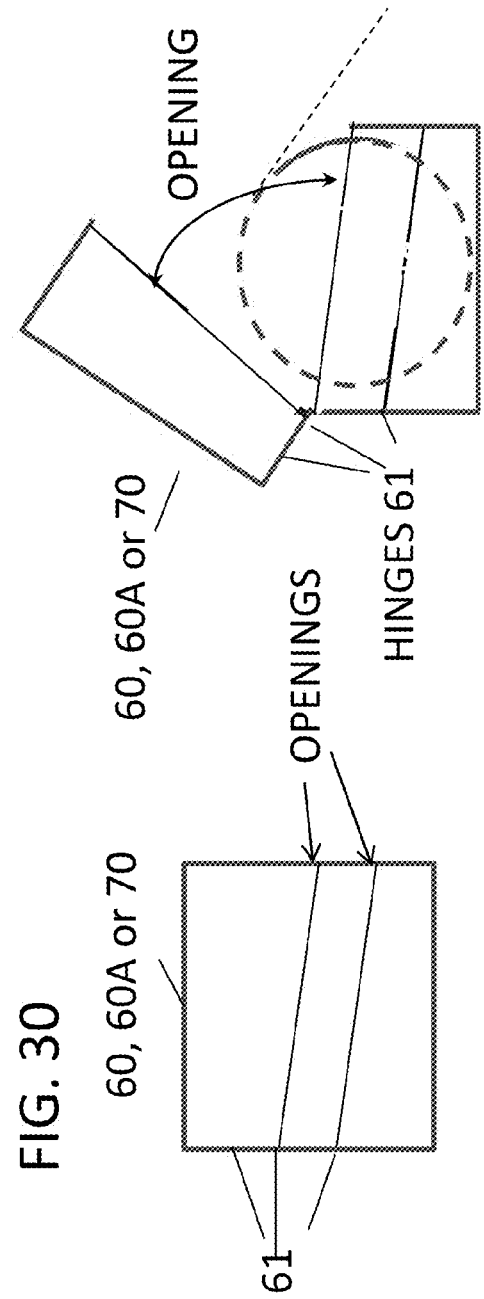
FIG. 30

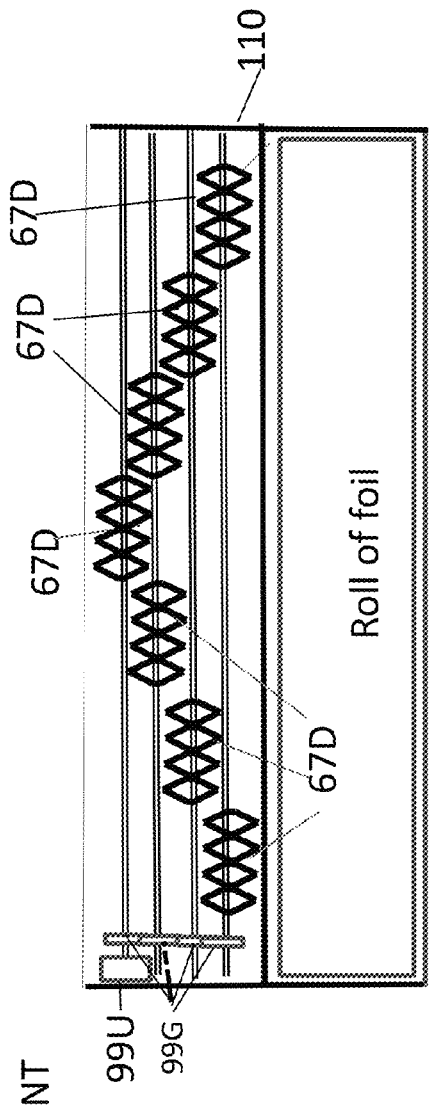
FIG. 38B TOP VIEW- ALTERNATIVE CASCADED EMBODIMENT
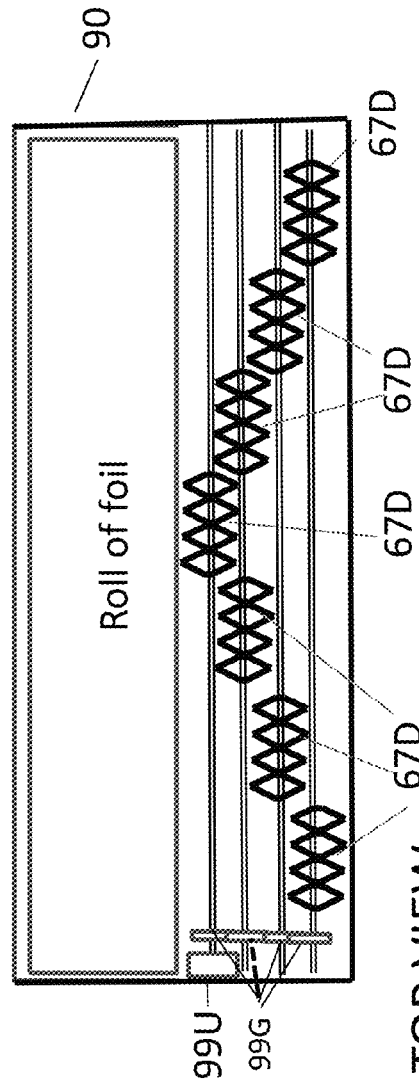
FIG. 38A TOP VIEW- CASCADED EMBODIMENT

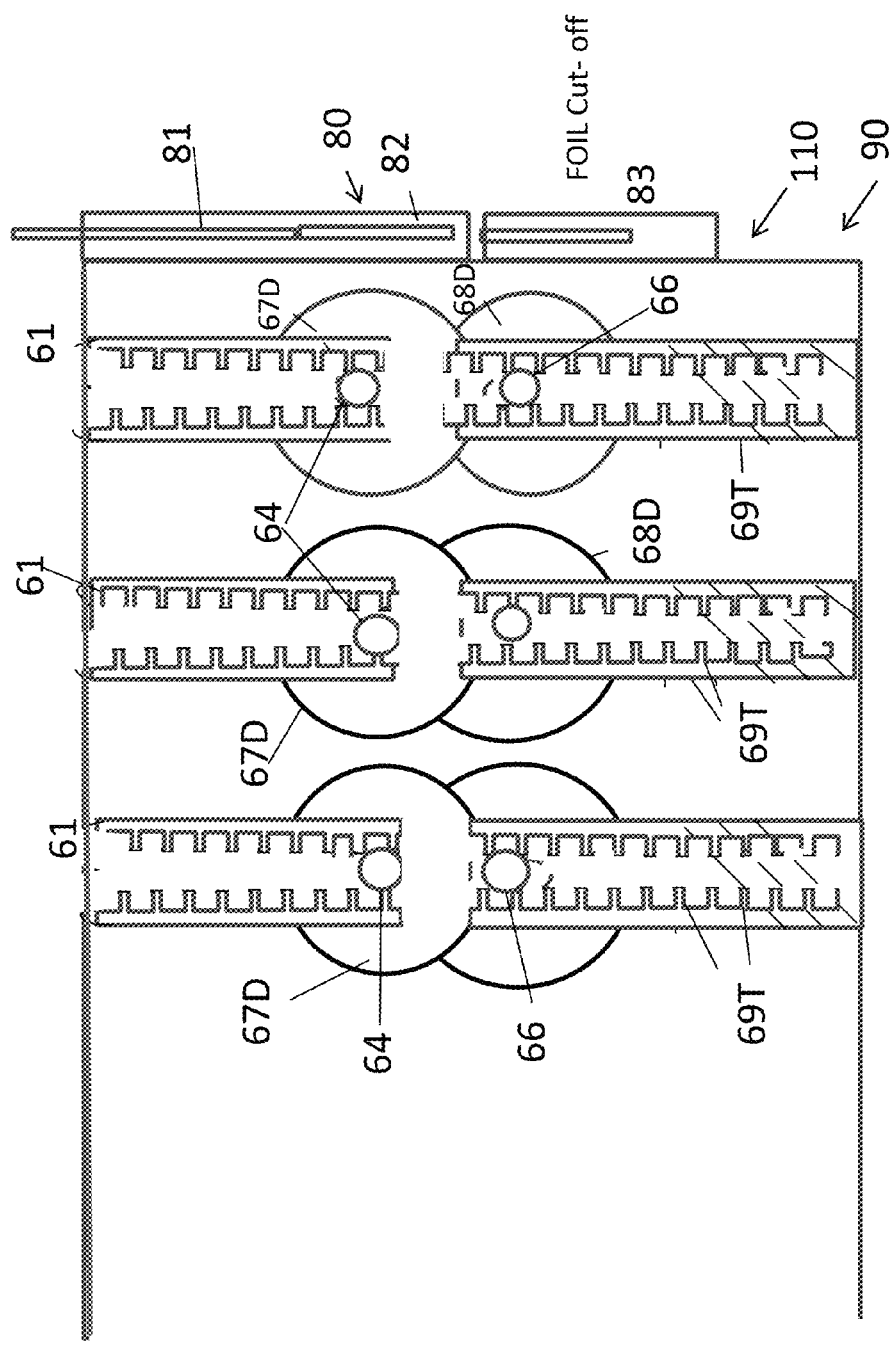
FIG. 39 SIDE VIEW OF CASCADED EMBODIMENTS 90, 110

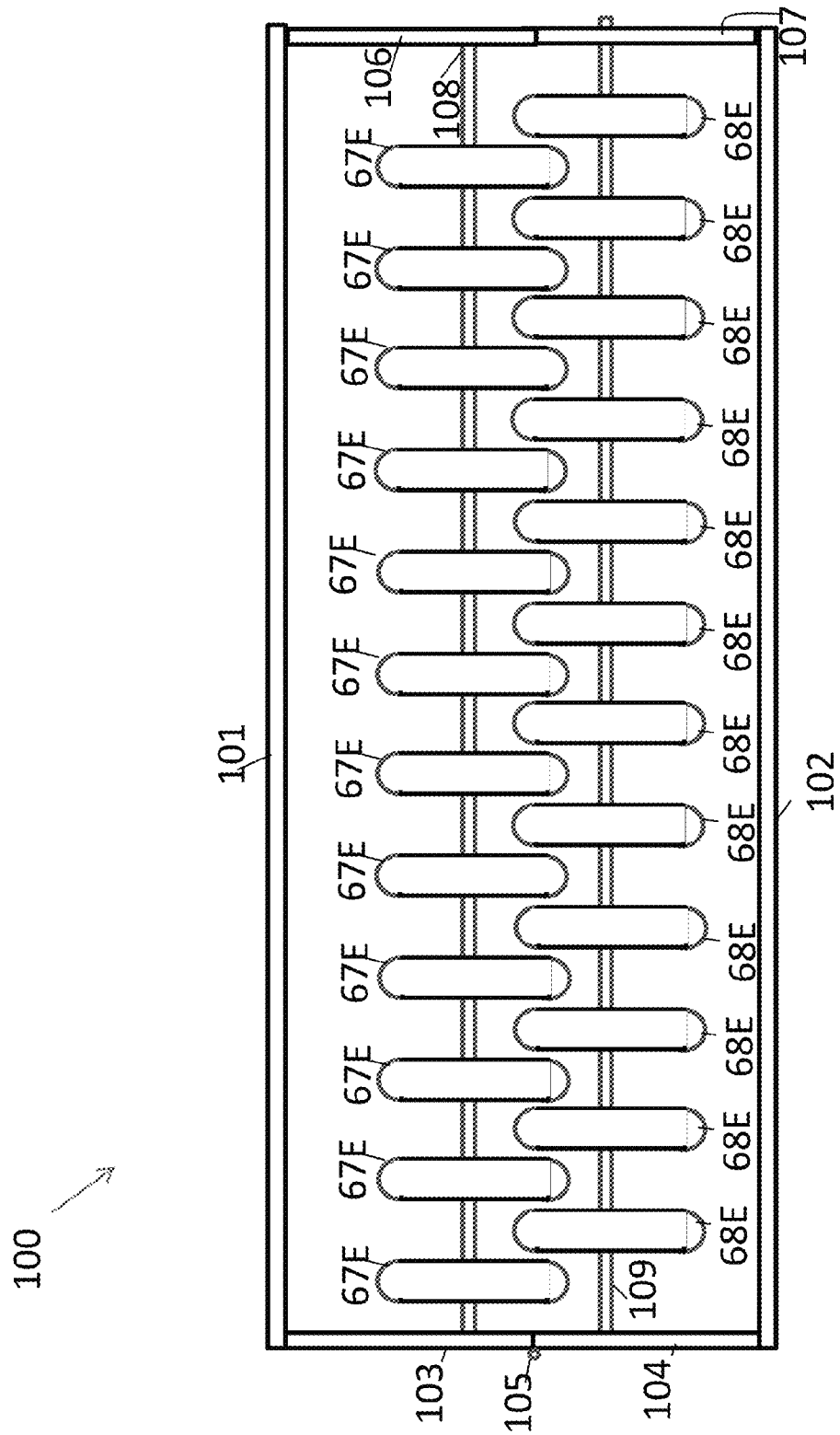

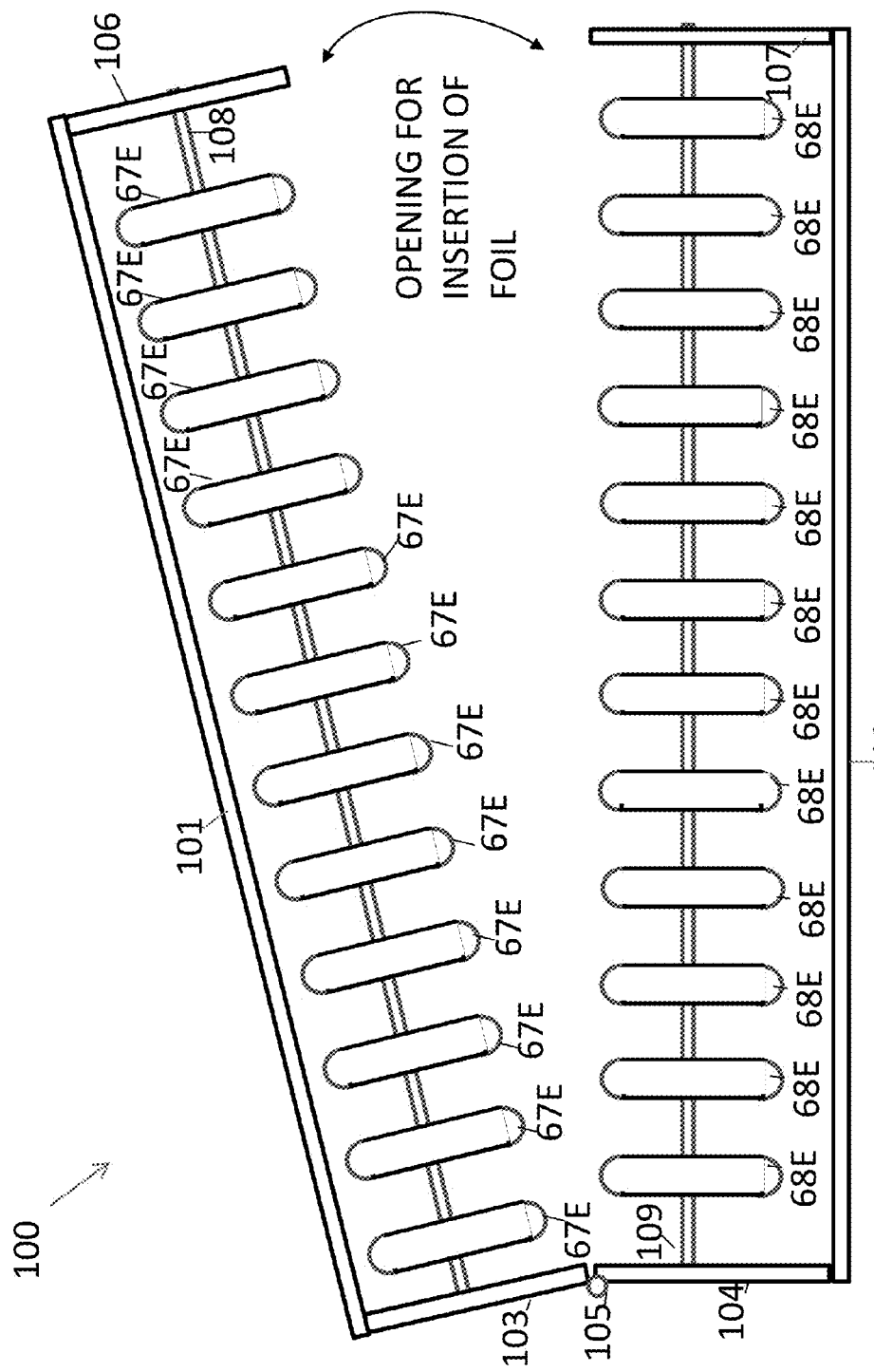

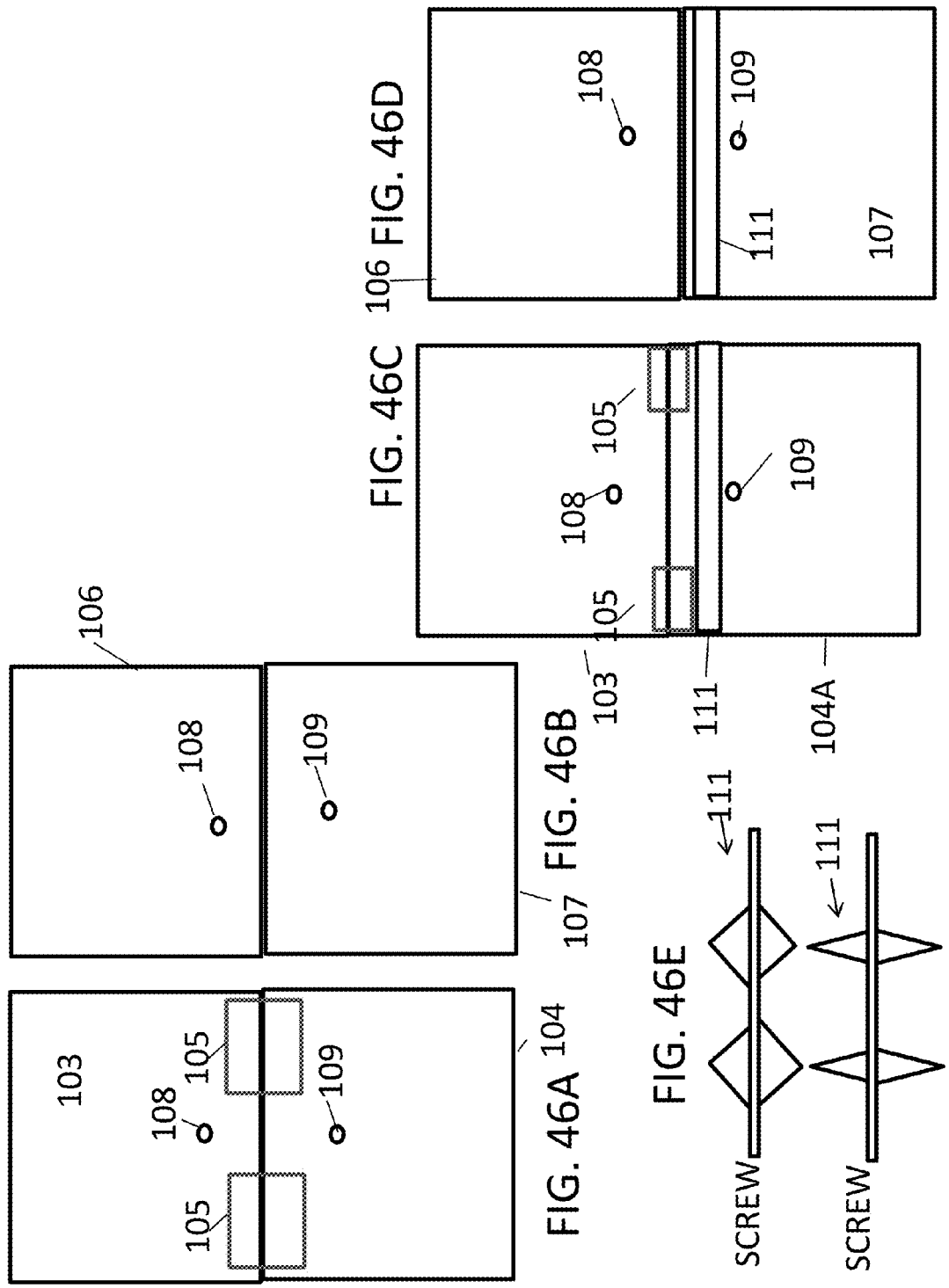

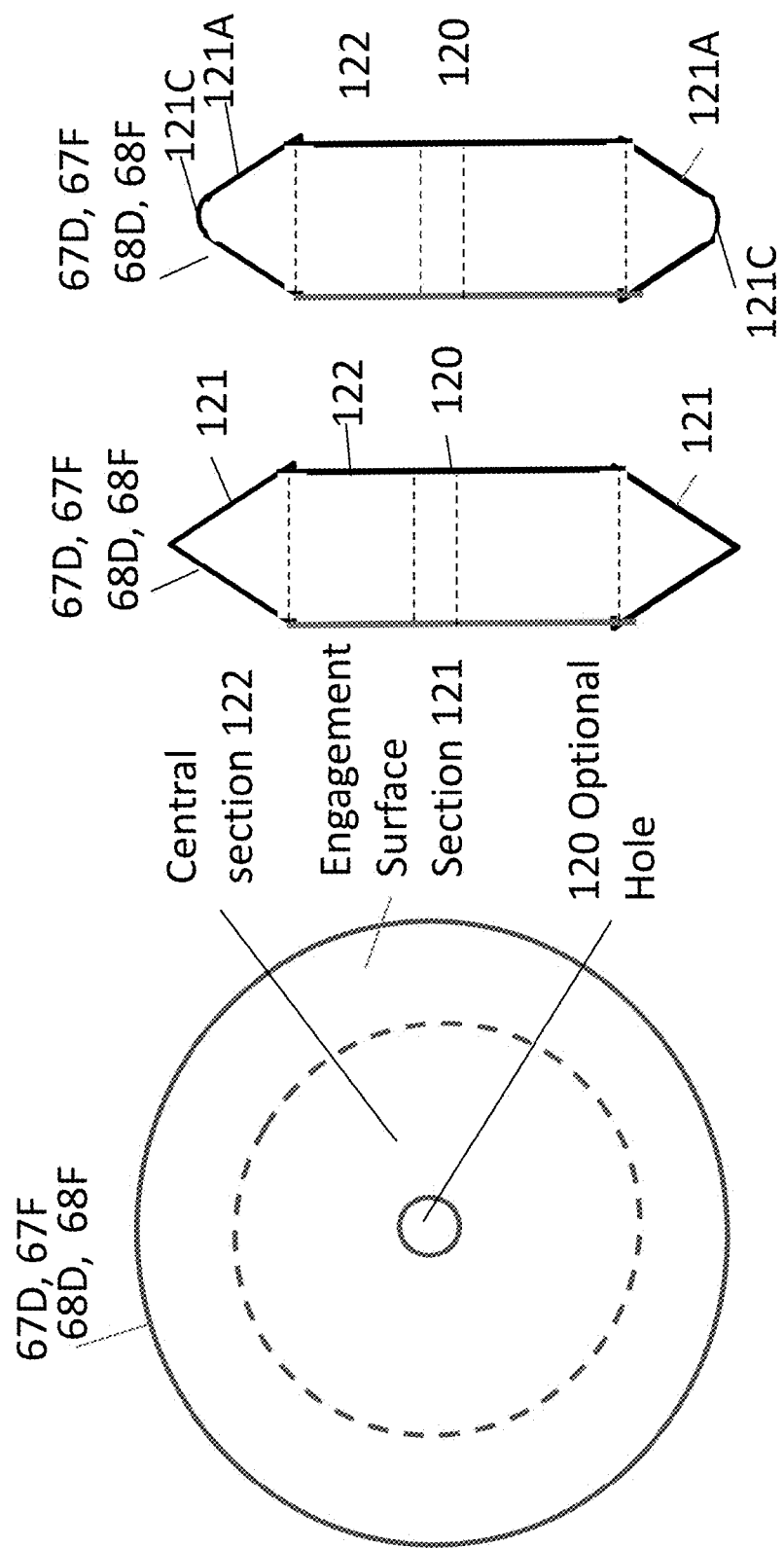

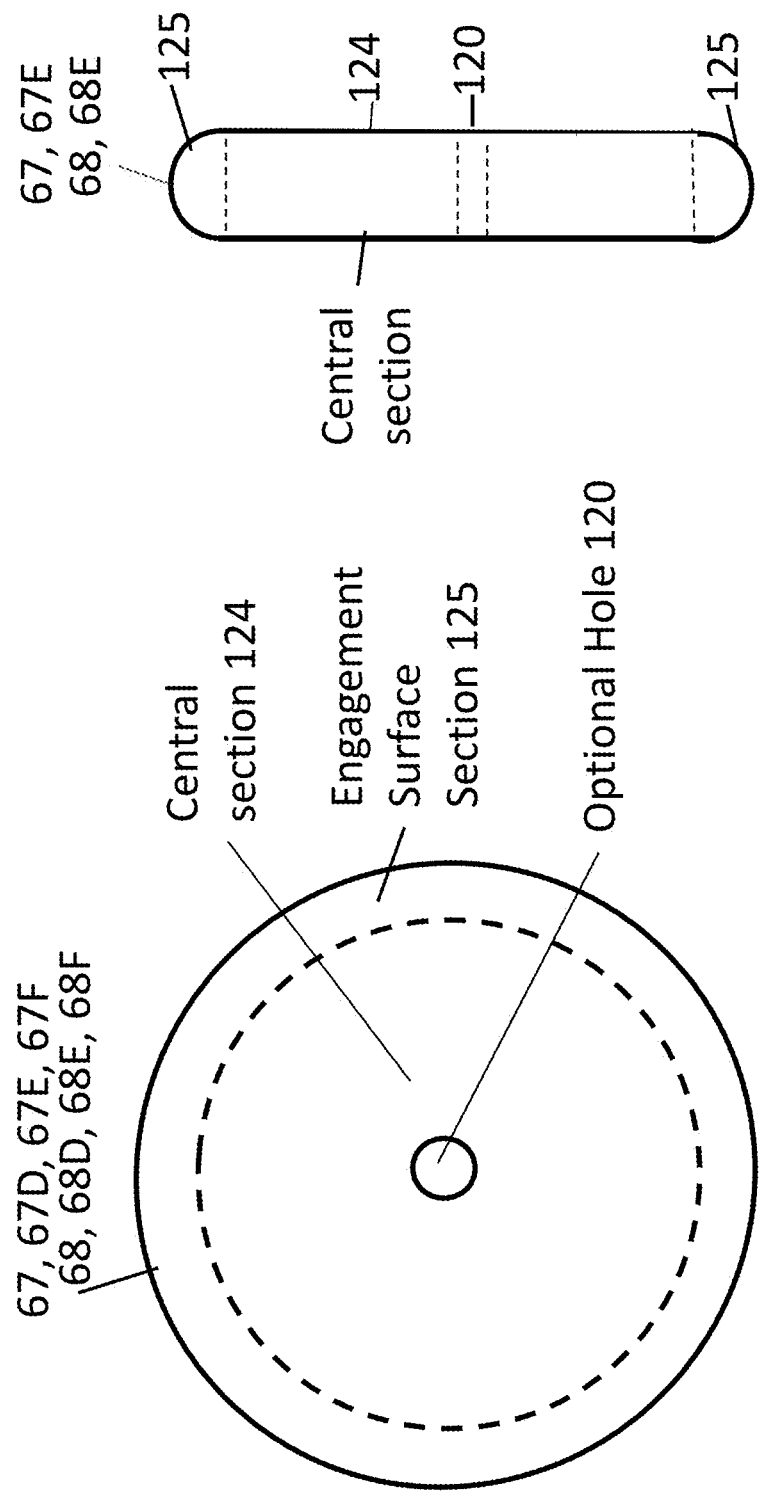

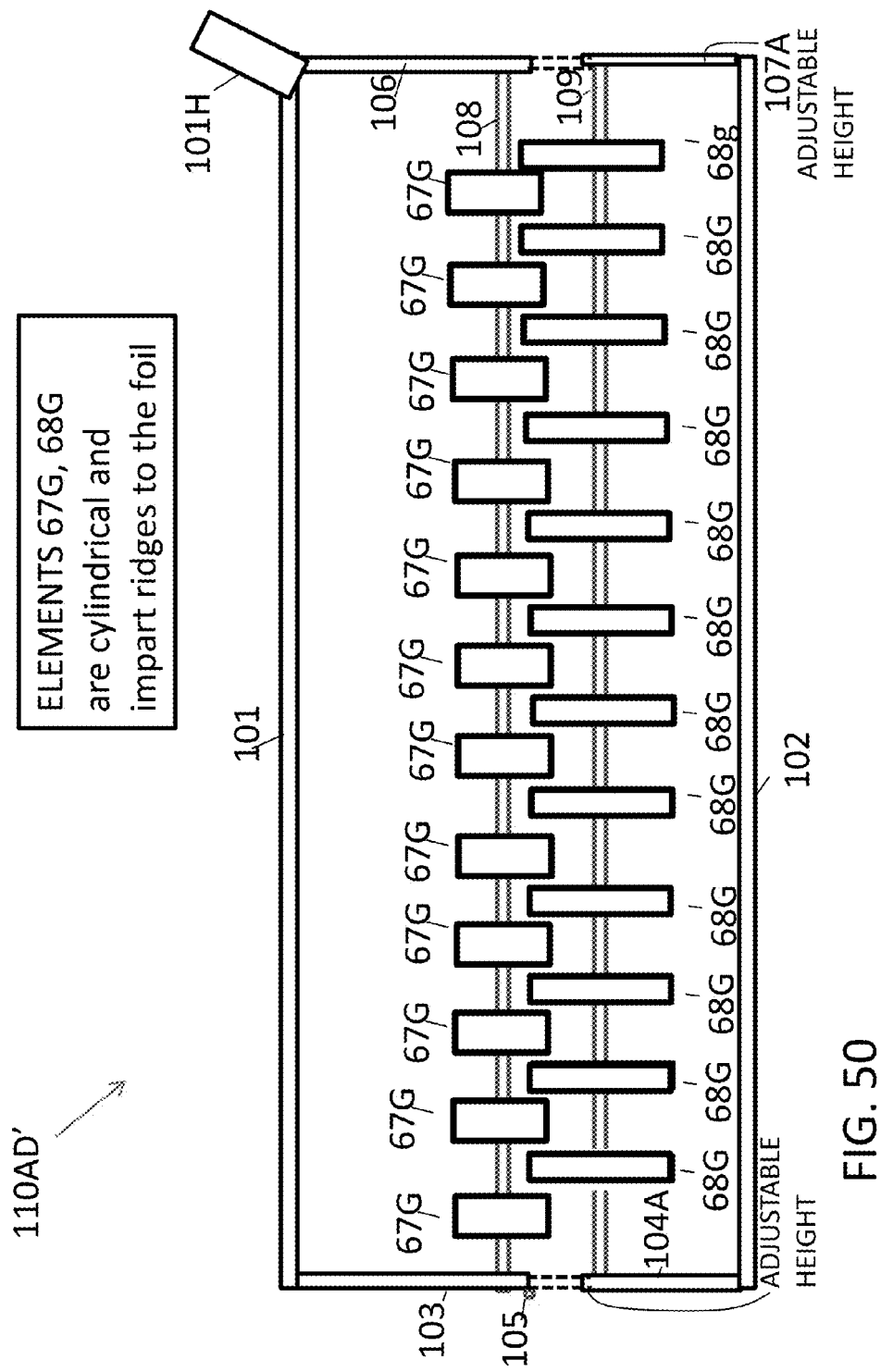

FOIL CONFIGURING DEVICE

CROSS REFERENCE TO RELATED APPLICATIONS

The present invention is a continuation-in-part of and claims priority to U.S. patent application Ser. No. 13/842,321 entitled "Foil Configuration Device And Method" which is a continuation-in-part of and claims priority to U.S. application Ser. No. 13/011,893 entitled "Foil Configuration Device And Method" filed Jan. 22, 2011.

BACKGROUND OF THE INVENTION

It is known to cook food items using aluminum foil. The aluminum foil may be heated along with the food and disposed of thereafter. In many cases, the interior of the oven is not exposed to droppings or spattering as the foil provides adequate protection for collection of run-off, droppings and/or sputtering. However, frequently when cooking an item such as a pizza pie, the instructions indicate that the pie should be placed directly upon the grill in order that the crust be cooked in the proper manner. However, this exposes the grill and the area of the oven below the grill to spatterings or droppings from the cooked item.

Another problem with the conventional use of aluminum foil is that food items tend to stick to the surface of the aluminum foil, which may pose a problem when flipping the food item to ensure cooking on both sides.

Using the concept to a grill pan, when the juices of the food bring cooked are permitted to flow beneath the food, the results are improved, however, grill pans require cleaning and are limited in size and utility.

Moreover, nonstick chemicals are sometimes used to coat pans and/or foils to enable the easy removal of foods from the foil. Chemicals, particularly when subjected to high temperatures, may pose increase risks to the health of the user. The present invention eliminates the need for cooking sprays.

SUMMARY OF THE PRESENT INVENTION

A preferred embodiment is used for configuring aluminum foil for cooking or the like and comprise a base portion; a first plurality of rotatable elements operatively associated with the base portion; a support mounted on the base portion; a second plurality of rotatable elements operatively associated with the support; the support operating to pivot relative to the base portion so as to allow entry of foil between the first and second plurality of rotatable elements in a first position and engagement of the first and second plurality of rotatable elements in a second position; whereby in the second position the first and second plurality of rotatable elements impart a configuration to the foil.

Optionally, the first and second plurality of rotatable elements may be positioned diagonally across from each other. Optionally, the base portion comprises a first axle, and the first plurality of rotatable elements are rotatable on the first axle, and the support comprises a second axle and the second plurality of rotatable elements are rotatable on the second axle.

Optionally, when support is in the second position, the first and second plurality of rotatable elements are interleaved and off-set from each other so as to produce one of ridges, undulations or serrations in the foil is passed therebetween. Optionally, the first and second plurality of rotatable elements are substantially circular in a plane perpendicular to the longitudinal axis of the base portion. Optionally, each of the first and second plurality of rotatable elements are circular in a first plane and comprise a central portion and an engagement portion, the engagement portion forms an apex in a second plane perpendicular to the first plane.

Optionally, the device comprises a first plurality of rotatable elements that have external surfaces that are circular in cross section in a first plane and form an oval in a second plane perpendicular to the first plane.

Optionally, each of the first and second plurality of rotatable elements are cylindrical.

Optionally, each of the first and second plurality of rotatable elements comprise a central portion which is substantially cylindrical and an engagement portion which is substantially triangular in cross-section.

Optionally, the first and second plurality of rotatable elements rotate on first and second axles, respectively, and the first and second plurality of rotatable elements are adapted to pass foil therebetween in order to configure one of ridges, undulations or serrations along the longitudinal axis of the foil.

An alternative preferred embodiment, also used for configuring foil for use in cooking food, comprises a base portion; a first plurality of rotatable elements operatively associated with the base portion; a support mounted on the base portion; and a second plurality of rotatable elements operatively associated with the support; the support operating to move relative to the base portion so as to allow entry of foil between the first and second plurality of rotatable elements in a first position and engagement of the foil with the first and second plurality of rotatable elements in a second position; the first plurality of rotatable elements being positioned diagonally across from the second plurality of rotatable elements such that in the second position the first and second plurality of rotatable elements impart a configuration to the foil.

Optionally, the first and second plurality of rotatable elements are positioned on first and second axles, respectively, that are separated spatially from one another in the vertical direction. Optionally, the spacing between the spatially separated first and second axles is adjustable such that the depth of the configuration imparted to the foil is adjustable.

When aluminum foil is passed between the opening between the first and second plurality of rotatable elements a cross sectional configuration is imparted to the foil. Optionally, the first and second plurality of rotatable elements are configured to create continuously elevated portions along the longitudinal axis of the foil. Optionally, the continuously elevated portions are ridge-like which provide a grill-like surface along the longitudinal axis of the foil. The first and second plurality of rotatable elements may comprise rounded engagement portions which create undulations or ridges in aluminum as the foil is passed therebetween. Optionally, the spacing between the ridges or undulations in the lateral direction of the foil is in a range of approximately one-eighth to approximately one inch and wherein the length of the device is approximately one of 12, 18, 20 or 24 inches. Optionally, the spacing between the first and second plurality of rotatable elements is adjustable.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which: The drawings of this invention are illustrative and diagrammatic in nature in order to present the principles of the invention. They are being provided as examples without limiting the invention to the specific configuration or dimensions shown.

FIG. 7 is a schematic illustration of the preferred embodiment of FIG. 6 from a different perspective comprising vertical supports 11 positioned on a base 12.

FIG. 8 is a schematic illustration of the preferred embodiment top portion 40 comprising slots 41, 42 and 43.

FIG. 9B is a schematic illustration of foil subjected to incremental impressions of top portion 40 and base portion 30A wherein a series of ridges 45A result from the impression of the segments 45.

FIG. 10 is a schematic illustration of the preferred embodiment top portion 40A comprising slots 41, 42 and 43 and wheels 44 adapted to be positioned over a base portion.

FIG. 11 is a schematic illustration of a partial view of the top portion 40 comprising slots 41, 42 and 43 positioned above a base portion comprising a base 12 and vertical supports 11.

FIG. 12 schematically depicts a methodology associated with a preferred embodiment of the present invention in which foil is shown in conjunction with a base portion comprising base 12 and vertical supports 11.

FIG. 13 schematically depicts a methodology associated with a preferred embodiment of the present invention in which foil is shown in conjunction with a base portion comprising base 12 having multiple vertical supports 11; such as for example six.

FIG. 14 is a schematic illustration of a partial view of the top portion 40 comprising slots 41, 42 and 43 positioned above a base portion comprising a base 12, vertical supports 11A and adjustable support 13. When the foil is inserted on top of the vertical supports 11A, and the slots 41, 42, and 43 are matched with the vertical supports 11A, the foil will be pressed down to the adjustable support 13, resulting in the ridges in the foil being approximately the distance between the adjustable support 13 and the top of the adjustable supports 11A, which is represented by "X" in FIG. 14.

FIG. 15A is a schematic illustration of a horizontal/adjustable support 13.

FIG. 15B is a schematic illustration of a vertical support 11A comprising, inter alia, adjustable grooves 15.

FIG. 15C is a schematic illustration of the resilient fingers 15A which may be substituted for the adjustment grooves 15, such that the nodules 14 are supported between the resilient fingers and are movable for adjustment of the horizontal support 13.

FIG. 30 is a schematic illustration of a dispenser 60, 60A or 70 comprising two sets of configurable surfaces providing two different configuration patterns.

FIG. 38A is a top view of an alternate configuration in which the axles 64, 66 and configuration portions may be cascaded so that the configuration of the foil on the outside portion of the foil is not done at the same time as the configuration of the inner portion of the foil.

FIG. 38B is a top view of an alternate configuration in which the axles 64, 66 and configuration portions may be cascaded so that the configuration of the foil on the outside portion of the foil is not done at the same time as the configuration of the inner portion of the foil; i.e. the inner set configures the foil last.

FIG. 39 is a side view of the cascaded embodiments 90, 110.

FIG. 40 is a schematic illustration of an alternative preferred embodiment comprising rotatable elements 67E, 68E operatively associated with a base portion 102, 104, 107, and a support portion 101, 103, 106. The support portion pivots on hinge 105 and is shown in a closed or engaged position.

FIG. 41 is a schematic illustration of the preferred embodiment of FIG. 40 showing the support portion in an open position.

FIG. 46A is a schematic illustration showing a side view showing the sides 103, 104.

FIG. 46B is a schematic illustration showing a side view showing the sides 106, 107.

FIG. 46C is a schematic illustration showing a side view showing the sides 103, 104 wherein the spacing between the rotatable elements is adjustable.

FIG. 46D is a schematic illustration showing a side view showing the sides 106, 107 wherein the spacing between the rotatable elements is adjustable.

FIG. 46E is a schematic illustration showing a side view showing the sides 103, 104 wherein the spacing between the rotatable elements is adjustable.

FIG. 47A is a schematic illustration showing a cross sectional schematic illustration of elements 67D, 67F, 68D, and 68F taken in a plane perpendicular to the axis of rotation.

FIG. 47B is a schematic illustration showing a cross sectional schematic illustration of elements 67D, 67F, 68D, and 68F taken in a plane parallel to the axis of rotation.

FIG. 47C is a schematic illustration showing a cross sectional schematic illustration of elements 67D, 67F, 68D, and 68F, taken in a plane parallel to the axis of rotation, comprising a curved portion 121C.

FIG. 48A is a schematic illustration showing a cross sectional schematic illustration of elements 67, 67E, 68, and 68E taken in a plane perpendicular to the axis of rotation.

FIG. 48B is a schematic illustration showing a cross sectional schematic illustration of elements 67, 67E, 68, and 68E taken in a plane parallel to the axis of rotation.

FIG. 50 is a schematic illustration of another preferred embodiment comprising rotatable elements 67G, 68G operatively associated with a base portion 102, 104, 107, and a support portion 101, 103, 106. The support portion pivots on hinge 105 and is shown in a closed or engaged position. The spacing between the rotatable elements 67G and 68G is adjustable.

DETAILED DESCRIPTION OF PREFERRED EMBODIMENTS

Figure 1:
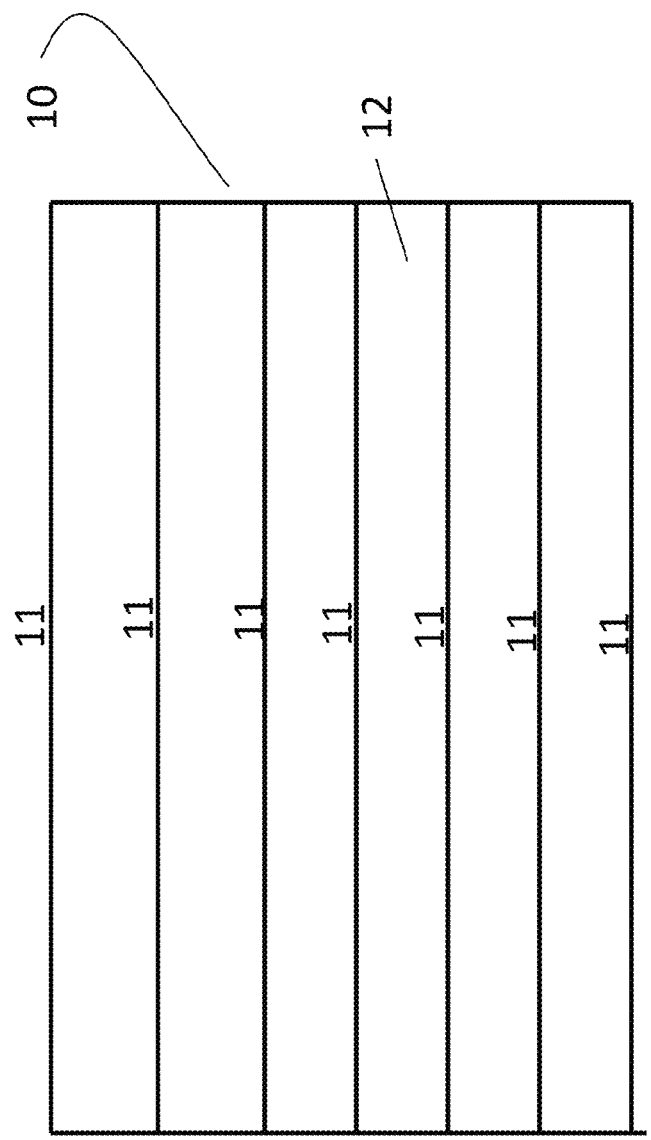
FIG. 1 is a schematic illustration of a preferred embodiment comprising selective components of a grill provider device comprising vertical supports 11 positioned on a base 12.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout the description of the figures.

It will be understood that when an element is referred to as being "connected" or "coupled" to another element, it can be directly connected or coupled to the other element or intervening elements may be present. In contrast, when an element is referred to as being "directly connected or coupled" to another element, there are no intervening elements present. Furthermore, "connected" or "coupled" as used herein may include wirelessly connected or coupled. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first portion could be termed a second portion and, similarly, a second portion could be termed a first portion without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes illustrated herein but are to include deviations in shapes that result, for example, from manufacturing.

FIGS. 1-39 are schematic illustrations comprising selective components of "grill" creating systems. As used herein, the terminology "grill" refers to the feature of a cooking surface wherein only a portion of the full surface engages the surface of the food. The illustrations are merely exemplary. It is noted that the principles of the present invention may be utilized in connection with a foil or foil dispensing system, but are not necessarily limited thereto. Moreover, the invention is not limited to personal or home usage and may be used in corporate food processing, restaurant food processing or the like. As used herein, the term person refers to a person, company, organization, or group of persons. The foil configuring portions are interchangeable in the embodiments disclosed and may be combined together in one device.

FIG. 1 is a schematic illustration of a preferred embodiment comprising selective components of a grill provider device comprising vertical supports 11 positioned on a base 12. The length of the device, which would correlate to the horizontal direction as shown in FIG. 1, may be approximately twelve inches, 18 inches, twenty inches, or twenty-four inches to accommodate common foil widths. Similarly, the length of the device shown in FIG. 1 may be selected based upon the foil width, for example, 12, 18, 20 or 24 inches.

Figure 2:
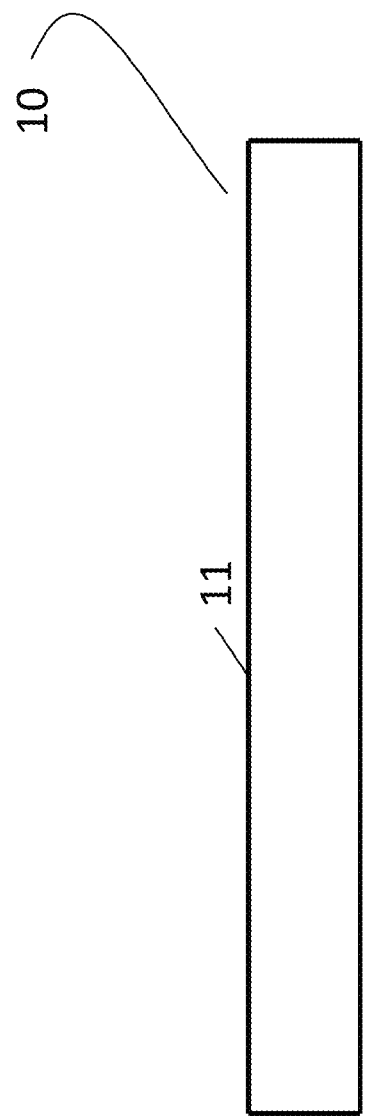
FIG. 2 is a front view schematic illustration of the preferred embodiment of FIG. 1.

FIG. 2 is a front view schematic illustration of the preferred embodiment of FIG. 1. The vertical supports 11 may comprise a wire frame which extends around the perimeter as shown in FIG. 2 or may be a solid wall construction or a combination of the two. The material composition may be metallic if it is desirable to make it oven compatible and subject to oven temperatures or may comprise plastic, such as PVC if not subjected to high temperatures. Similarly, the base portion 12 may be of metal composition or plastic, such as PVC.

Figure 3:
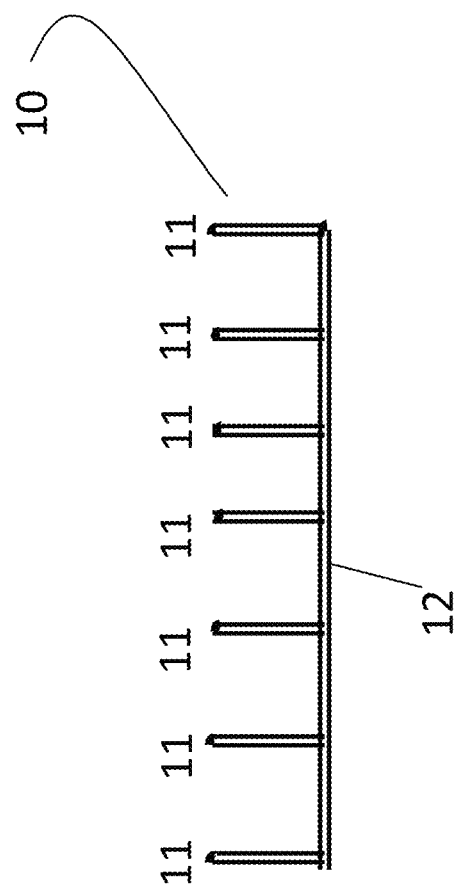
FIG. 3 is a side view schematic illustration of the preferred embodiment of FIG. 1.

FIG. 3 is a side view of the embodiment of FIGS. 1 and 2. Although 7 vertical supports 11 are depicted in FIG. 3, the embodiment is not limited to 7 vertical supports and the number may be in a range from 2 to 30, depending upon the application and/or desired size.

Figure 4:
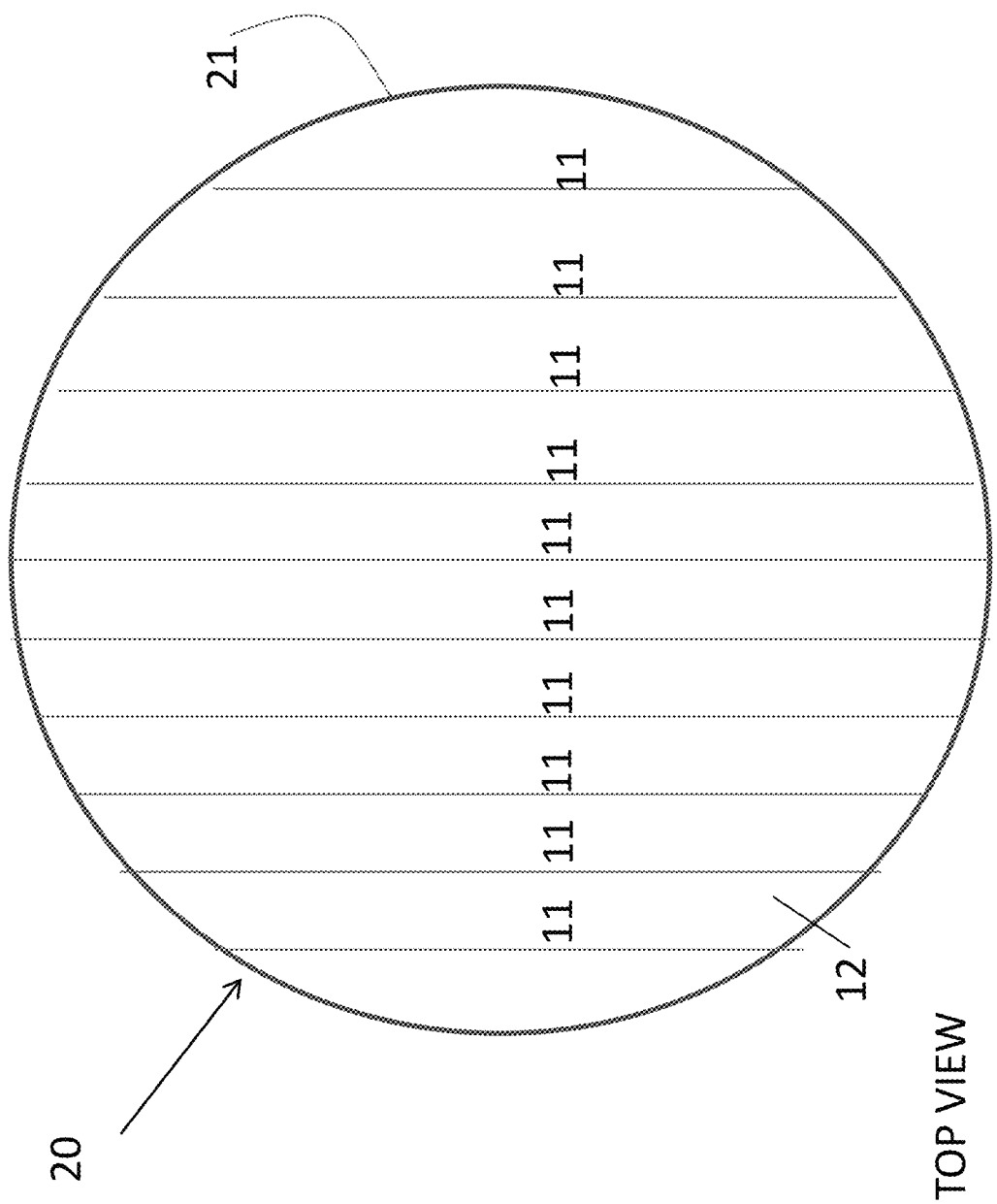
FIG. 4 is a schematic illustration of another preferred embodiment comprising selective components of a grill provider device comprising vertical supports 11 positioned on a substantially round base 12, although the base of the preferred embodiment may be rectangular, elliptical or any configuration.

FIG. 4 is a schematic illustration of another preferred embodiment comprising selective components of a grill provider device comprising vertical supports 11 positioned on a substantially round base 12. Although a circular base is depicted in FIG. 4, the base of the preferred embodiment may be rectangular, polygonal, elliptical, triangular, or any similar configuration. Also, the perimeter 21 may be a vertical wall similar in size to the vertical supports 11 or may optionally be omitted.

Figure 5:
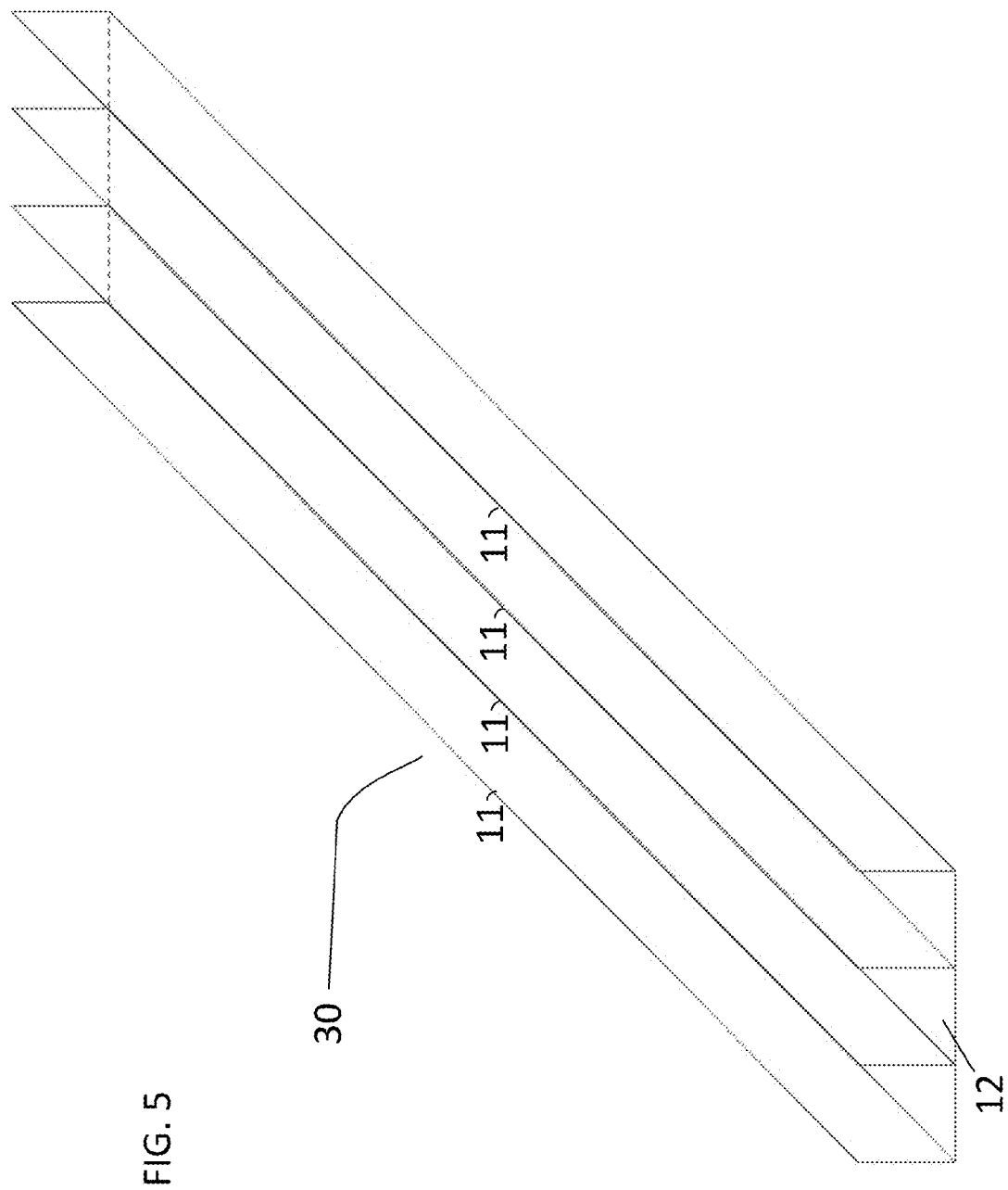
FIG. 5 is a schematic illustration of a preferred embodiment comprising selective components of a grill provider device 30 comprising vertical supports 11 positioned on a base 12.

FIG. 5 is a schematic illustration of a preferred embodiment comprising selective components of a grill provider device 30 comprising vertical supports 11 positioned on a base 12. With respect to all of the embodiments disclosed in FIGS. 1-50, the material composition may be metallic or may comprise plastic, such as PVC if not subjected to high temperatures. Similarly, the base portion (for example 12) may be of metal composition or plastic, such as PVC. In FIG. 5, the height of the vertical supports may vary from one-quarter of an inch to one inch. However, a size of approximately 0.30 to 0.40 inches is preferred when adapted to be used as a foil template inasmuch as the support capability of foil may preclude higher heights when supporting food items. The spacing between the vertical supports may be similar to the spacing between grill wires, that is approximately one inch. For example, oven grill support wires of approximately one inch provide ample support for food items and allow a sufficient percentage of the food item to be exposed to convection currents within the over. Vertical supports 11 may be spaced in the range of ⅜" to 1½" apart; such that ample support is provided for the food item and at the same time, allow sufficient circulation of convection currents. The number of vertical supports 11 shown in FIG. 5 is four, but the invention is not limited to four supports, and the number may be in a range from 2 to 30, depending upon the application.

Figure 6:
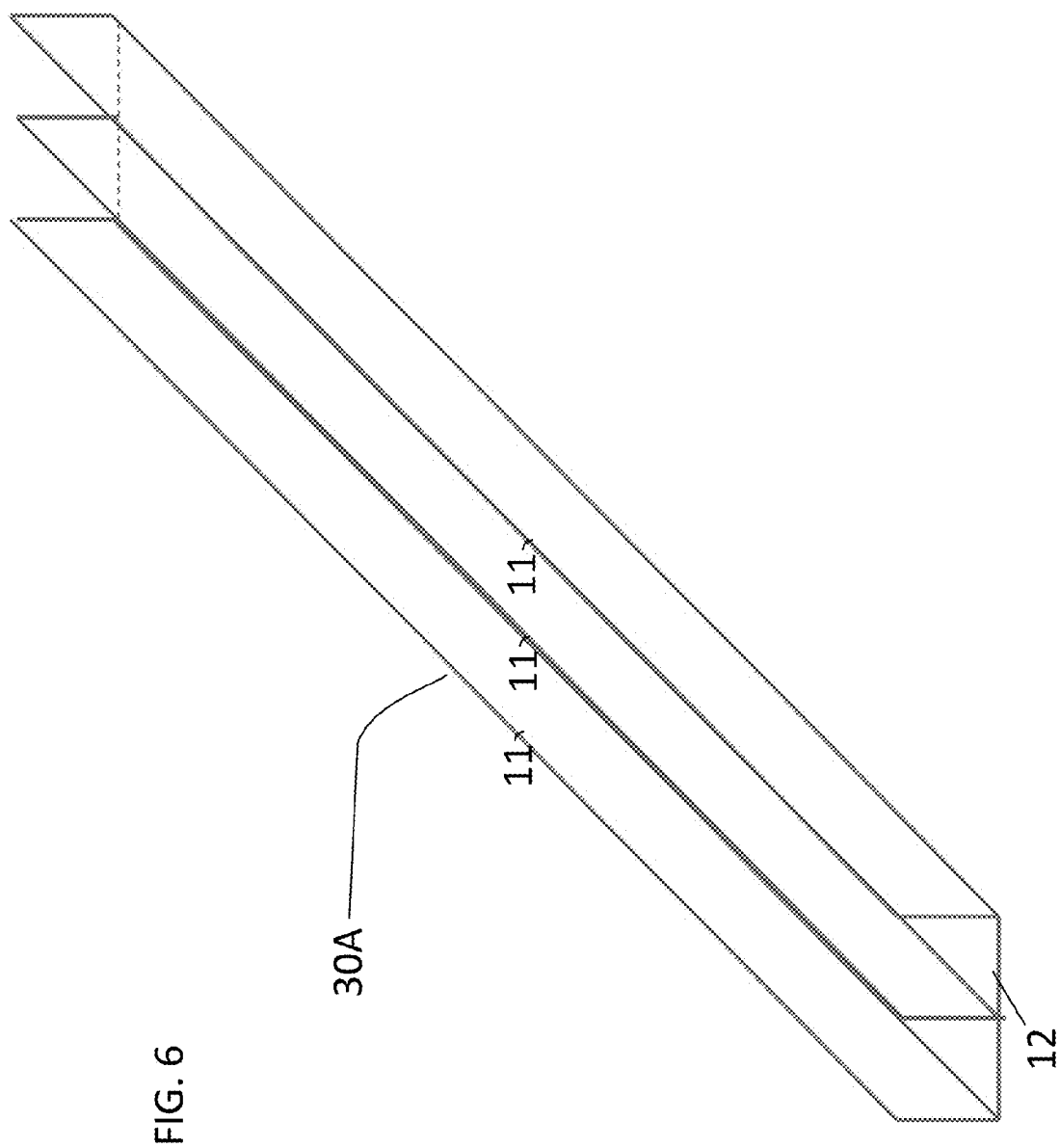
FIG. 6 is a schematic illustration of a preferred embodiment comprising selective components of a grill provider device 30A comprising vertical supports 11 positioned on a base 12.

FIG. 6 is a schematic illustration comprising selective components of a grill provider device 30A comprising vertical supports 11 positioned on a base 12.

FIG. 7 is a schematic illustration of the preferred embodiment of FIG. 6 from a different perspective comprising vertical supports 11 positioned on a base 12. The component 30A may be used as a base support for the configuration of foil, as will be explained in further detail in the following.

FIG. 8 is a schematic illustration of the preferred embodiment top portion 40 comprising slots 41, 42 and 43. The top portion may be fabricated from plastic, such as PVC, or a metal, such as aluminum. The top portion 40 is adapted to fit over a bottom portion 30A. The top portion 40 pushes the foil into the region between the supports 11 to create vertical portions in the foil; i.e., a grill-like surface. Although the portions 45, 46 between the slots 41, 43 and 42 are somewhat rectangular, the portions may be arcuate, rounded or semicircular; as shown as 45A and 46A.

Figure 9A:
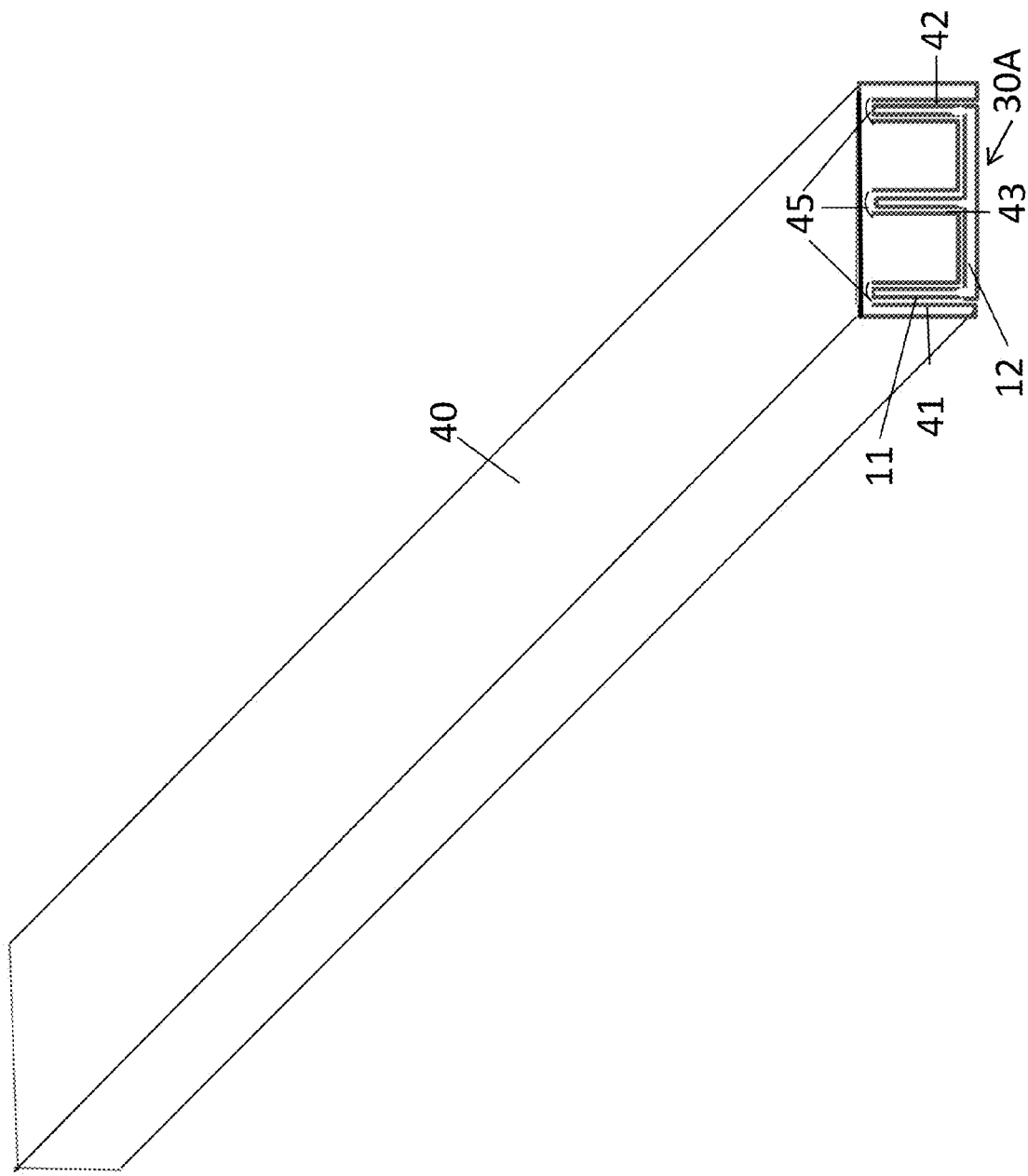
FIG. 9A is a schematic illustration of the preferred embodiment top portion 40 comprising slots 41, 42 and 43 positioned over a base portion 30A as depicted in FIG. 7.

FIG. 9A is a schematic illustration of the preferred embodiment top portion 40 comprising slots 41, 42 and 43 positioned over a base portion 30A as depicted in FIG. 7. The top portion 40 may include a handle, not shown, to facilitate placement and removal of the top portion over the base portion 30A. Foil (although not shown in FIG. 9) may be placed in between the top portion 40 and base portion 30A so as to configure the foil with a grill-like top surface and allow drippings to be captured in the valleys between the top surface supports. Although a single use would impart three vertical supporting ridges correlating to uppermost segments 45, by repeatedly passing other portions of the foil though the top portion 40 and bottom portion 30A, any number of ridges may be impressed into the foil. The impression of multiple ridges by repeatedly impressing a piece of foil with the top and base portions 30A, 40 is depicted in FIG. 9B wherein a series of ridges 45A result from the impression of the segments 45. Although ridges 45A are shown in FIG. 9B, the foil may have a series of undulations or apices depending upon the configuration of the top and base portions 40 and 30A.

FIG. 10 is a schematic illustration of the preferred embodiment top portion 40A comprising slots 41, 42 and 43 and wheels 44 adapted to be positioned over a base portion. The technique illustrated in FIG. 10 extends the principles of the present invention to an embodiment wherein the top portion 40A covers only a portion of the base portion 30A. Wheels 44 may be provide to ease passage of the top portion 40A over the foil placed between the top and base portions in order to impart the configuration to the foil (as depicted in FIG. 9B).

FIG. 11 is a schematic illustration of a partial view of the top portion 40 comprising slots 41, 42 and 43 positioned above a base portion comprising a base 12 and vertical supports 11. The top portion need not be coextensive with the base portion 30A and may be moved to impart the desired configuration to the foil as depicted in FIG. 9B.

FIG. 12 schematically depicts a methodology associated with a preferred embodiment of the present invention in which foil is shown in conjunction with a base portion 30A comprising base 12 and vertical supports 11.

FIG. 13 schematically depicts a methodology associated with a preferred embodiment of the present invention in which foil is shown in conjunction with a base portion 30B comprising base 12 having multiple vertical supports 11; such as for example six. The material composition of the base section 30B may be metallic if it is desirable to make it oven compatible and subject to oven temperatures or may comprise plastic, such as PVC if not subjected to high temperatures. Similarly, the base 12 may be of metal composition or plastic, such as PVC. The height of the vertical supports may vary from one-quarter of an inch to one inch. However, a size of approximately 0.30 to 0.40 inches is preferred when adapted to be used as a foil template inasmuch as the support capability of foil may preclude higher heights when supporting food items. The spacing between the vertical supports may be similar to the spacing between grill wires, such as, for example, approximately one inch. For example, oven grill support wires of approximately one inch provide ample support for food items and allow a sufficient percentage of the food item to be exposed to convection currents within the over. Vertical supports 11 may be spaced in the range of ⅜" to 1½" apart; such that ample support is provided for the food item and at the same time, allow sufficient circulation of convection currents. The number of vertical supports 11 shown in FIG. 13 is six, but the invention is not limited to six supports, and the number may be in a range from 2 to 30, depending upon the application.

FIG. 14 is a schematic illustration of a partial view of the top portion 40 comprising slots 41, 42 and 43 positioned above a base portion comprising a base 12, vertical supports 11A and adjustable support 13. The adjustable support allows the user to vary the effective height of the supports 11A. When the top portion is lowered onto the foil which has been inserted between the top and bottom assembly 10A, the foil will initially supported by the top of the supports 11A and be driven to the support 13 location by vertical movement of the top portion 40. Consequently, the depth of the foil configuration is adjusted by the movement of the adjustable support 13 and corresponds to the distance "X" as depicted in FIG. 14. The distance X may be a distance in the range of one-eighth of an inch to one inch, depending upon the application. That is, a greater distance provides a deeper trough between vertical supports 11A allowing more heat flow between the vertical supports as a grill allows heat flow in the typical oven FIG. 15A is a schematic illustration of a horizontal/adjustable support 13. The horizontal adjustable support 13 may comprise nodules 14 which engage adjustable grooves 15 for movable adjustment of the horizontal support 13. FIG. 15B is a schematic illustration of a vertical support 11A comprising, inter alia, adjustable grooves 15. Although only on vertical support 11A is shown in FIG. 15B, each vertical support 11A may have the same configuration to provide for engagement of the nodules 14 on the horizontal support 13. The invention is not limited to this type of adjustment means and a variety of adjustable supports may be utilized without departing from the spirit of the invention. For example, the resilient fingers 15A shown in FIG. 15C may be substituted for the adjustment grooves 15, such that the nodules 14 are supported between the resilient fingers and are movable for adjustment of the horizontal support 13.

Figure 16:
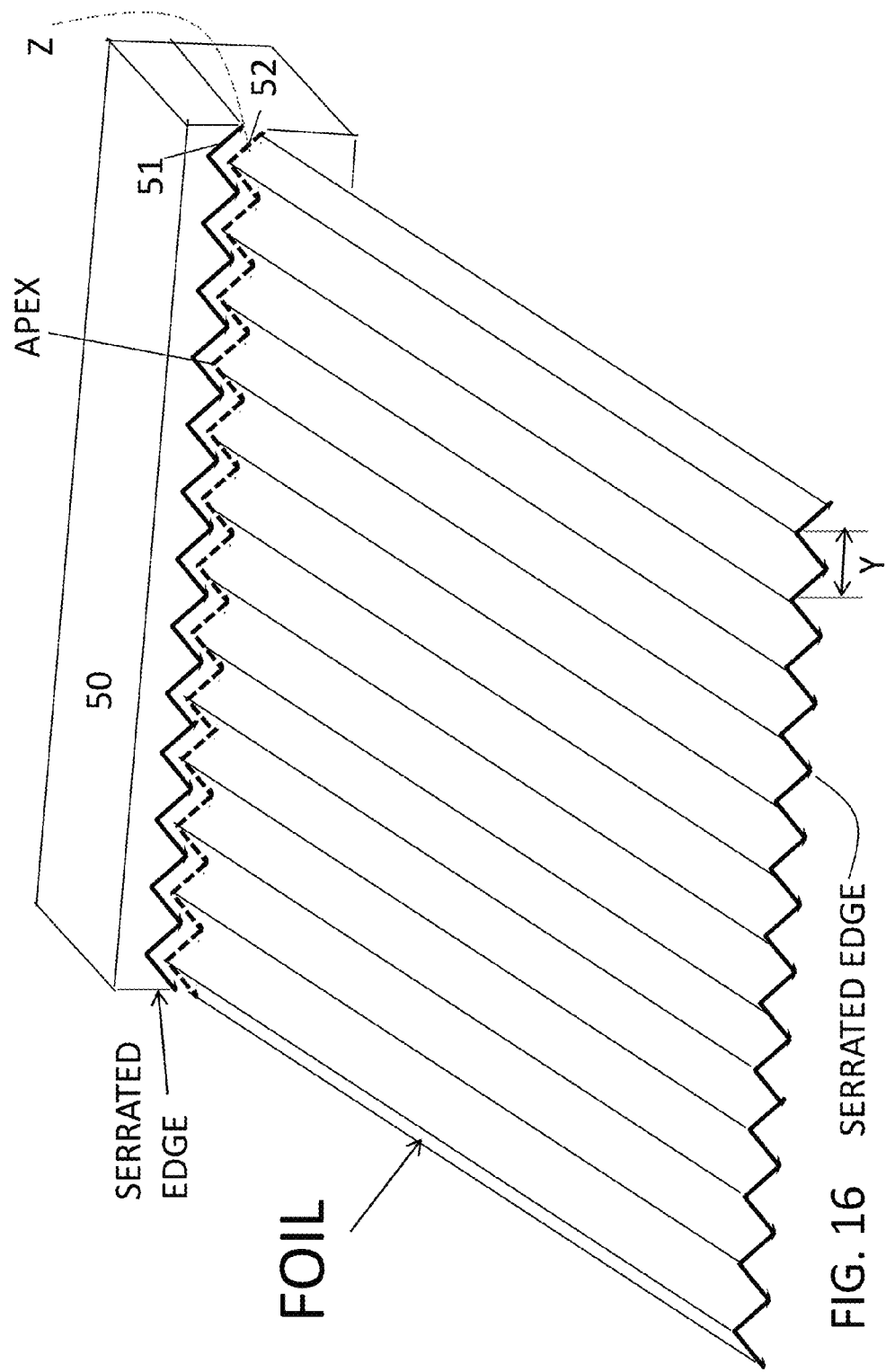
FIG. 16 is a schematic illustration of a preferred embodiment of the present invention comprising a top portion 51 and a bottom portion 52 which may be integral with a dispenser for production of foil having a serrated edge (distance between the serrated top portions may be spaced from one-eighth to one inch).

FIG. 16 is a schematic illustration of a preferred embodiment of the present invention comprising a top portion 51 and a bottom portion 52 which may be integral with a dispenser for production of foil having a serrated edge (distance "Y" between the serrated top portions may be spaced from one-eighth to one inch). The distance Z as shown in FIG. 16 between the top and bottom serrated surfaces may be approximately slightly larger than the thickness of the foil to permit movement of the foil therebetween while at the same time configuring the foil in a serrated configuration as depicted in FIG. 16. The top and bottom serrated surfaces may be rounded to prevent tearing of the foil, depending upon the type of foil being used. Given that household aluminum foils products commonly have a thickness in the range of 0.01-0.018 mm, the distance Z may be approximately 0.02-0.03 mm.

Figure 17A:
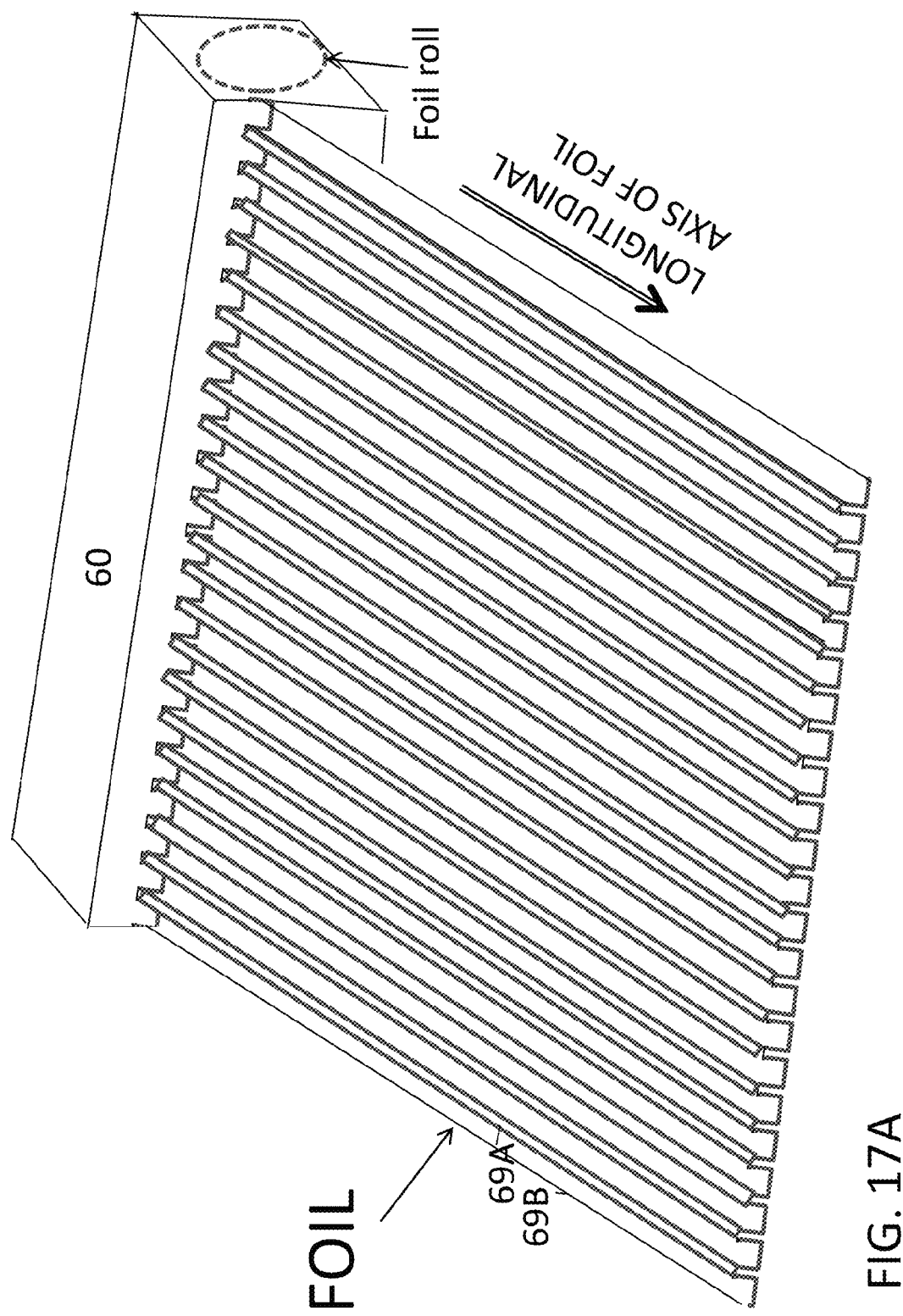
FIG. 17A is a schematic illustration of a preferred embodiment of the present invention comprising a dispenser 60 which produces foil having a grill-like surface as depicted.

FIG. 17A is a schematic illustration of a preferred embodiment of the present invention comprising a dispenser 60 which produces foil having a grill-like surface as depicted. Instead of the interface surfaces through which the foil passed in between having a serrated configuration, the configuration of the opposing surfaces is similar to a square wave, except that the upper portions 69A are smaller (not as wide) than the lower portions 69B to produce a grill-like effect. Providing a smaller surface area on the top portions 69A results in improved heat flow while cooking for better cooking of the bottom surface of the food item.

Figure 17B:
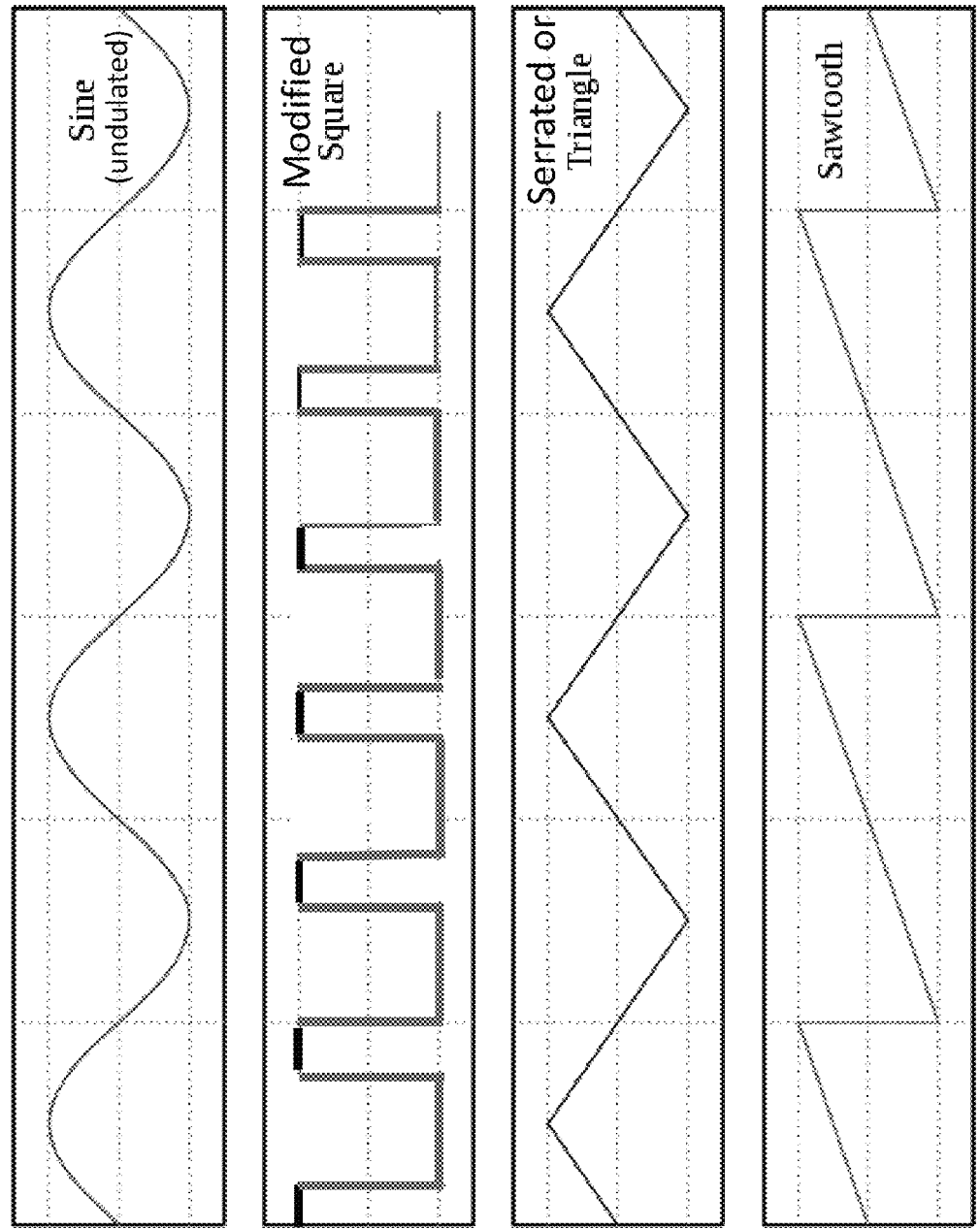
FIG. 17B illustrates various patterns which may be imparted to the foil by passing the foil through configurations resembling those shown in FIG. 17B.

FIG. 17B illustrates various patterns which may be imparted to the foil by passing the foil through configurations resembling those shown in FIG. 17B. The patterns or configurations include a sine wave, modified square wave, serrated (or triangle) or saw tooth. Such configurations are merely exemplary and other configurations may be used without departing from the scope of the invention.

Figure 18:
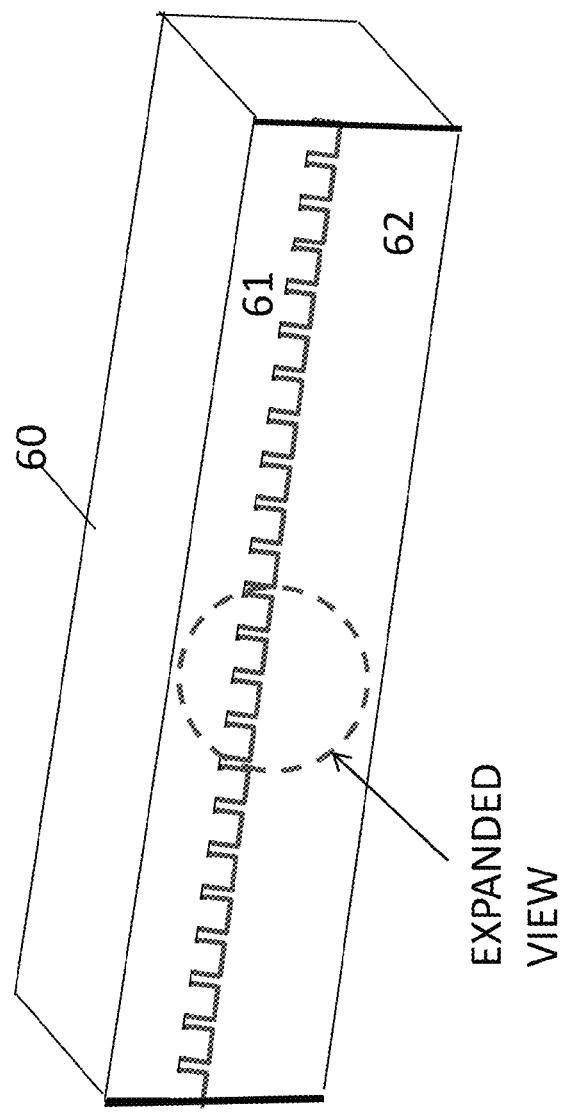
FIG. 18 is a schematic illustration of a preferred embodiment of the present invention comprising a dispenser 60 which produces foil having a grill-like surface as depicted comprising a top portion 61 and bottom portion 62 and further delineating the expanded view or cut-away portion or segment shown further in FIGS. 19 and 21.
Figure 19:
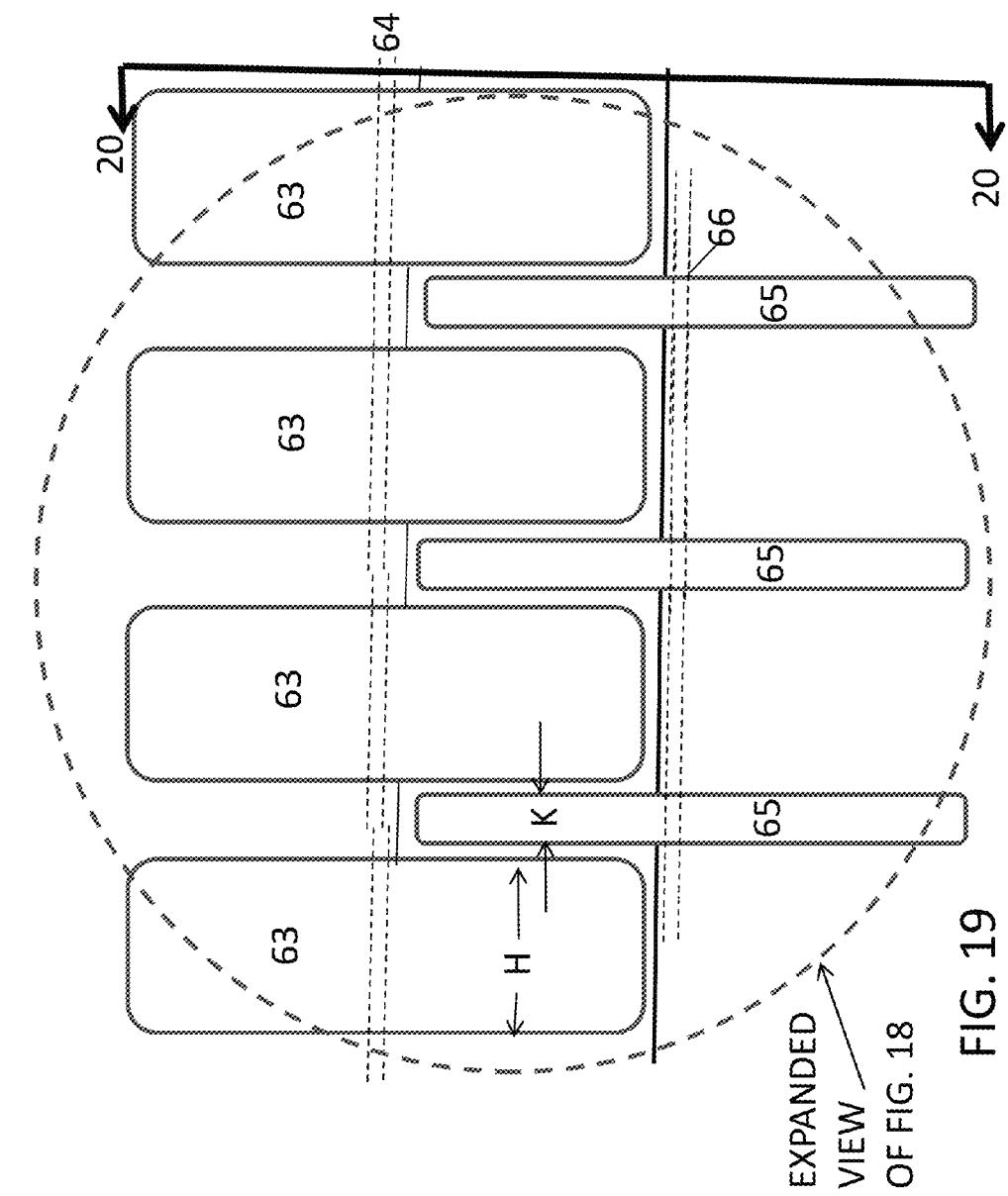
FIG. 19 is a schematic illustration of a preferred embodiment of the present invention comprising a portion of the dispenser 60 comprising wheel-like portions 63 and 65, which rotate on axles 64 and 66 respectively (where the cut-away view of FIG. 18 is enlarged in FIG. 19).
Figure 21:
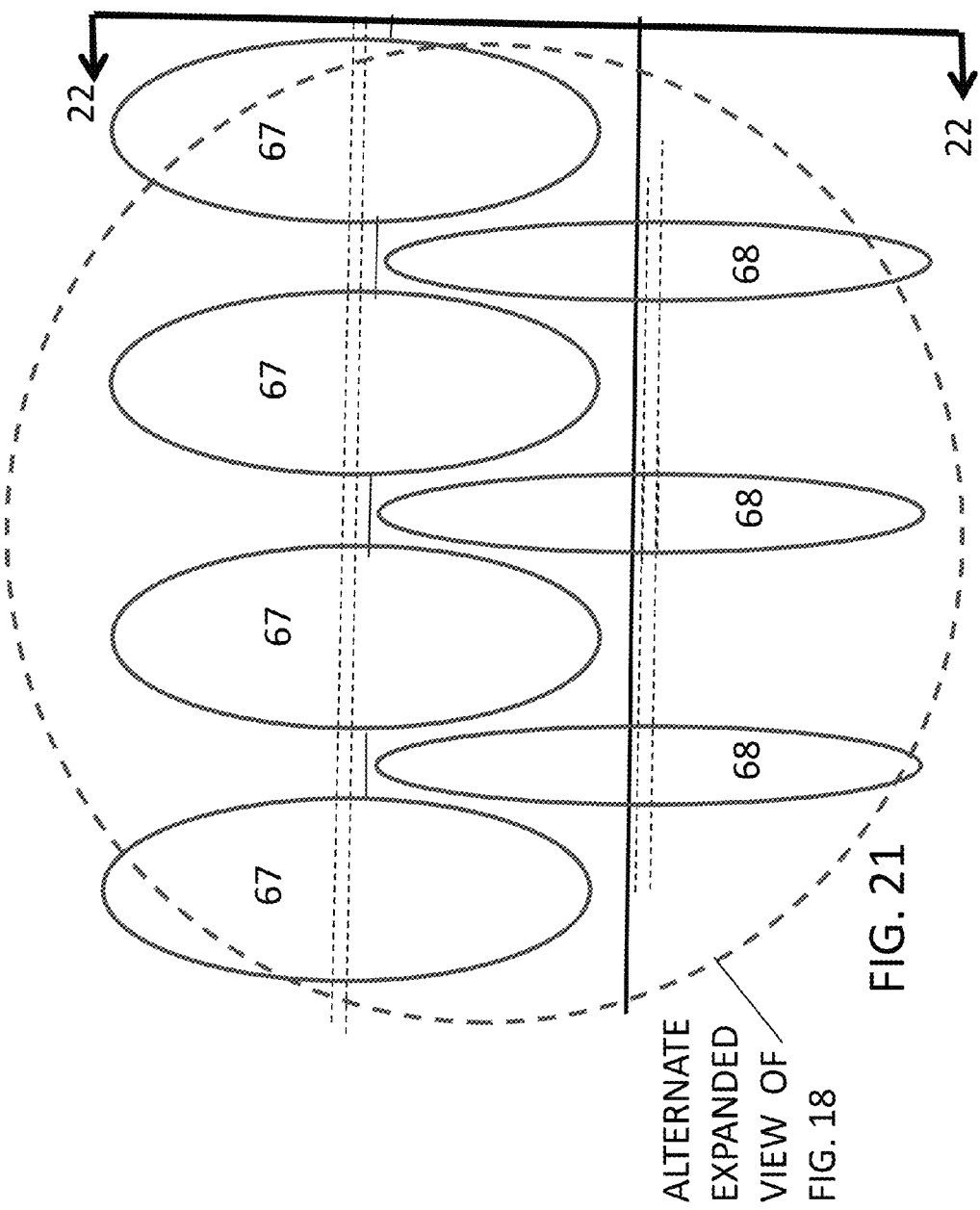
FIG. 21 is a schematic illustration of a preferred embodiment of the present invention comprising a portion of the dispenser 60 comprising wheel-like portions 67 and 68, which rotate on axles 64 and 66 respectively (note that the cut-away view of FIG. 18 is enlarged in FIG. 21).

FIG. 18 is a schematic illustration of a preferred embodiment of the present invention comprising a dispenser 60 which produces foil having a grill-like surface (an example of one type of which is depicted) comprising a top portion 61 and bottom portion 62 and further delineating the expanded view or cut-away portion or segment shown further in FIGS. 19 and 21.

FIG. 19 is a schematic illustration of a preferred embodiment of the present invention comprising a portion of the dispenser 60 comprising wheel-like portions 63 and 65, which rotate on axles 64 and 66 respectively (where the cut-away view of FIG. 18 is enlarged in FIG. 19). As the foil passes between the rollers 63, 66, the foil is shaped into a grill-like surface. Due to the horizontal width "H" of the wheels 63 relative to the width "K" of the wheels 65, a relatively small surface area (proportional to "K") is in contact with the bottom surface of the food item while cooking, while the larger width "H" allows for heat flow between the elevated "K" portions to facilitate cooking of the bottom of the food item. The configuration of the elements 63 and 63 may be utilized in conjunction with the assemblies 100, 110, 110A and 110AD illustrated in, inter alia, FIGS. 40-45, 46A-F, 49 and 50

Figure 20:
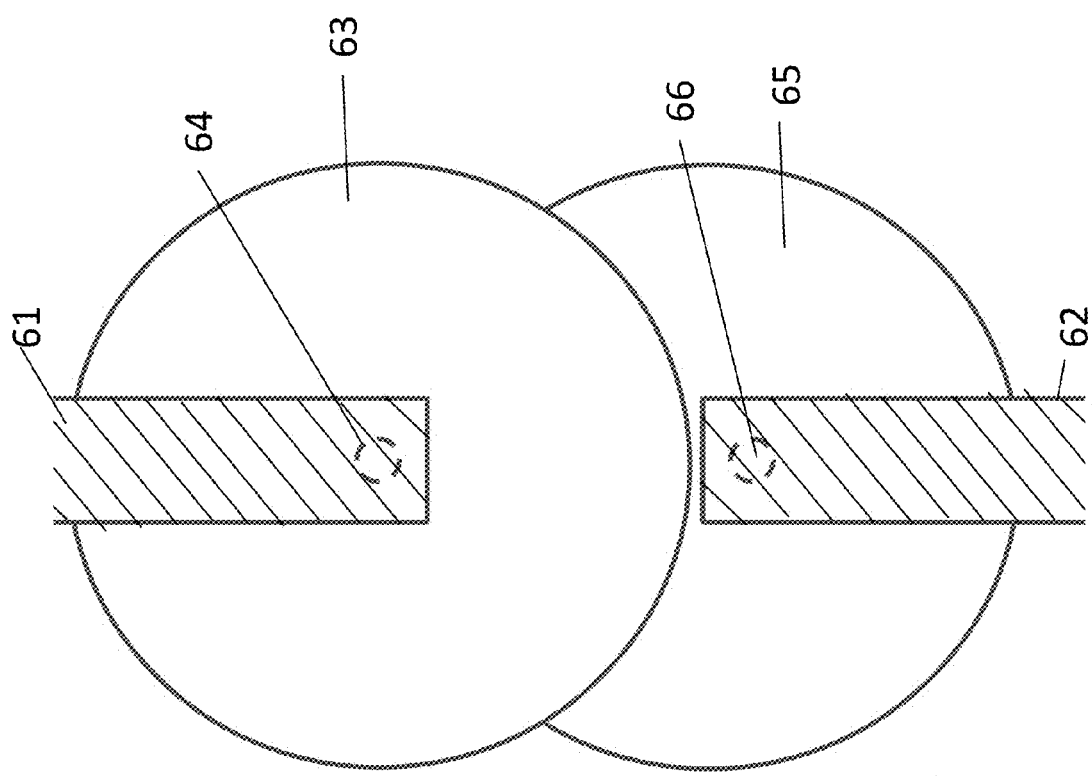
FIG. 20 is a schematic illustration of a side view taken along the lines 20-20 of FIG. 19.

FIG. 20 is a schematic illustration of a side view taken along the lines 20-20 of FIG. 19. As shown in FIG. 20, the portion 61 is a wall of the dispenser 60 which supports the wheels 63 on the axle-like portions 64 to allow turning of the wheels 63 as the foil passes between the wheels 63, 65. Likewise, the portion 62 is a lower wall portion of dispenser 60 having an axle-like portion 66 for support of wheels 65 to facilitate rotation thereof.

FIG. 21 is a schematic illustration of a preferred embodiment of the present invention comprising a portion of the dispenser 60 comprising wheel-like portions 67 and 68, which rotate on axles 64 and 66 respectively (note that the cut-away view of FIG. 18 is enlarged in FIG. 21). As can be appreciated by those of ordinary skill in the art, the foil is configured with rounded trough areas resembling the shape of wheels 67 and crest portions resembling the configuration of the top portion of wheels 68. The configuration of the elements 67 and 68 may be utilized in conjunction with the assemblies 100, 110, 110A and 110AD illustrated in, inter alia, FIGS. 40-45, 46A-F, 49 and 50

Figure 22:
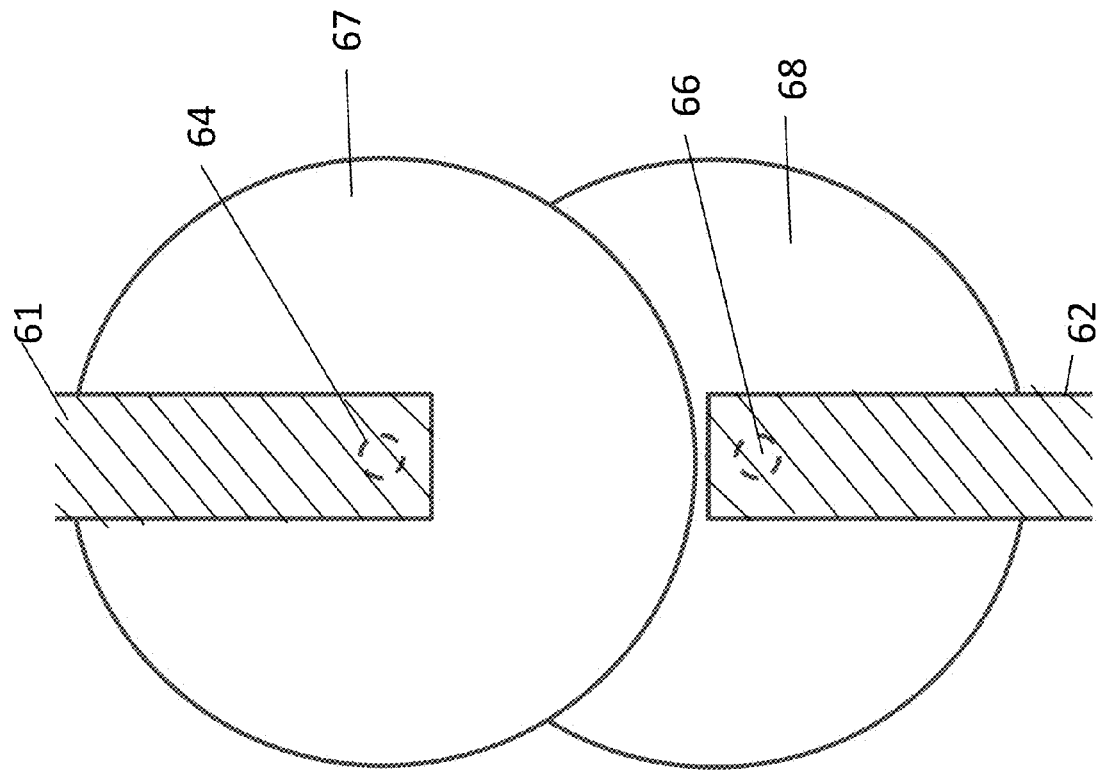
FIG. 22 is a schematic illustration of a side view taken along the lines 22-22 of FIG. 21.

FIG. 22 is a schematic illustration of a side view taken along the lines 22-22 of FIG. 21. As shown in FIG. 22, the portion 61 is a wall of the dispenser 60 which supports the wheels 67 on the axle-like portions 64 to allow turning of the wheels 67 as the foil passes between the wheels 67, 68. Likewise, the portion 62 is a lower wall portion of dispenser 60 having an axle-like portion 66 for support of wheels 68 to facilitate rotation thereof.

Figure 23:
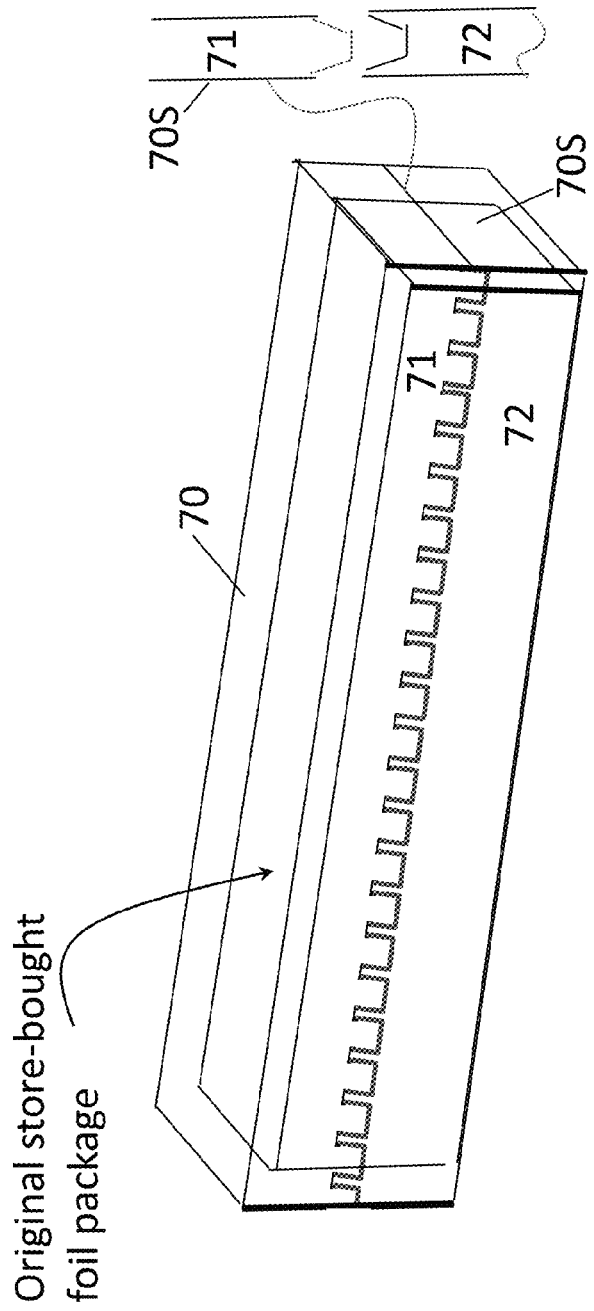
FIG. 23 is a schematic illustration of a preferred embodiment of the present invention comprising a dispenser 70 which surrounds the original store bought package of metallic foil. The outer dispenser 70 may comprise the features of any of the grill producing configurations shown in FIGS. 16, 17, 18, 19, 20, 21, 22, 24 and 27 both alone or in combination (such as the dispenser configuration of FIG. 24 being on opposite sides of the dispenser 70 as that shown in FIG. 19.

FIG. 23 is a schematic illustration of a preferred embodiment of the present invention comprising a dispenser 70 which surrounds the original store bought package of metallic foil. The outer dispenser 70 may comprise the features of any of the grill producing configurations shown in FIGS. 16, 17, 18, 19, 20, 21, 22, 24 and 27 both alone or in combination; such as the wheel combination of FIG. 24 being on opposite sides of the dispenser 70 as the wheel configuration shown in FIG. 19. That is, if one wants to configure the foil by means of the wheel configuration shown in FIG. 19, the foil will be dispensed from the side of the dispenser 70 having the wheels 63, 65 mounted thereon. If one wants to configure the foil by means of the wheel configuration shown in FIG. 21, the foil will be dispensed from the opposite side of the dispenser 70 having the wheels 67, 68 mounted thereon. One of ordinary skill in the art may appreciate that different types of food items may be best cooked by one or the other foil configurations, and the foil may be dispensed accordingly. As shown the top and bottom portions 71, 72 the dispenser 70 may separate like a box having sides 70S wherein the top and bottom portions fit together in the tongue and groove manner shown to the right in FIG. 23.

Figure 24:
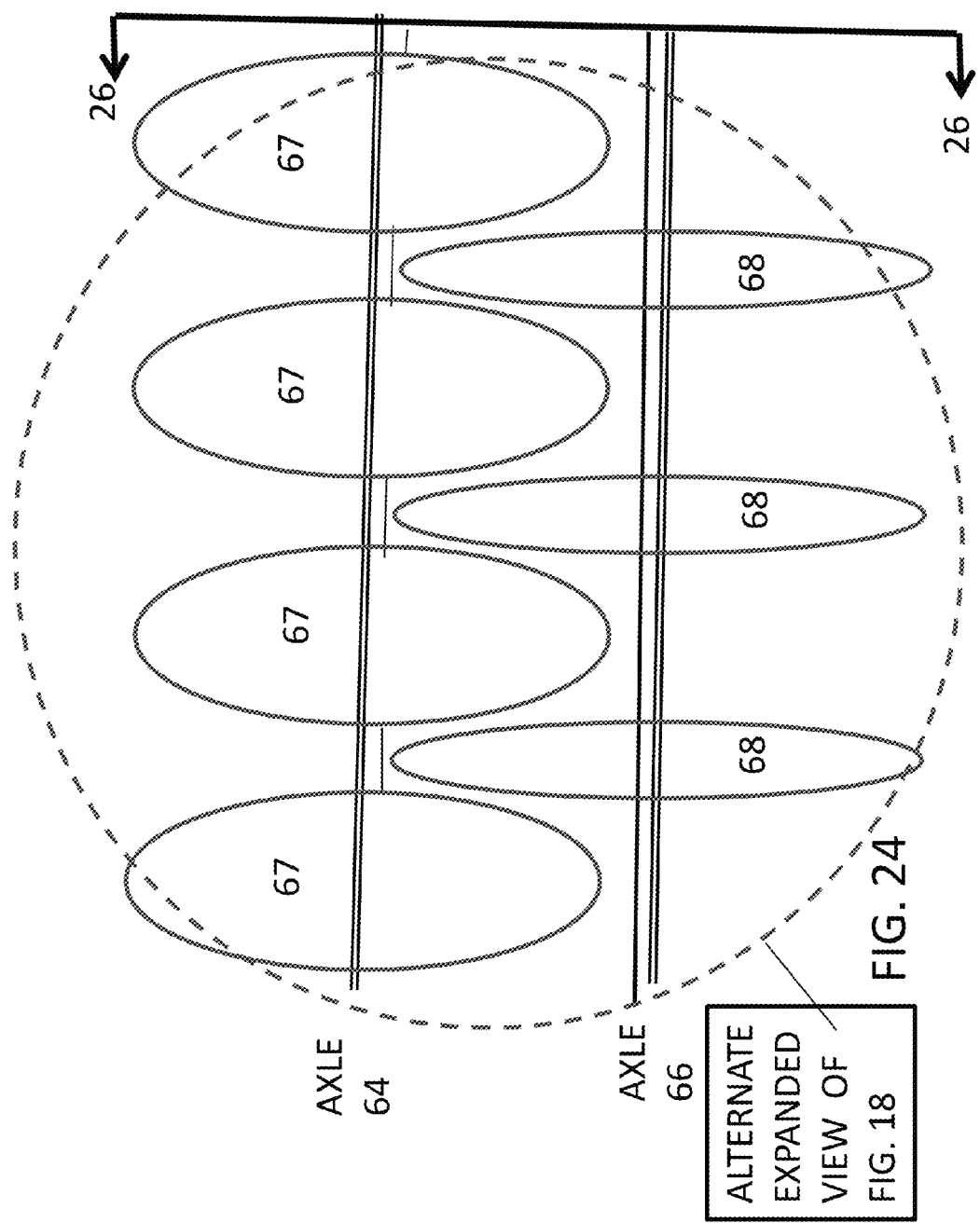
FIG. 24 is a schematic illustration of a preferred embodiment of the present invention comprising a portion of the dispenser 60 comprising wheel-like portions 67 and 68, which rotate on axles 64 and 66 respectively (note that the cut-away view of FIG. 18 is enlarged in FIG. 24) and further showing the perspective view-point by the line 26-26 for the adjustment mechanism.

FIG. 24 is a schematic illustration of a preferred embodiment of the present invention comprising a portion of the dispenser 60 comprising wheel-like portions 67 and 68, which rotate on axles 64 and 66 respectively (note that the cut-away view of FIG. 18 is enlarged in FIG. 24) and further showing the perspective view-point by the line 26-26 for the adjustment mechanism.

Figure 25:
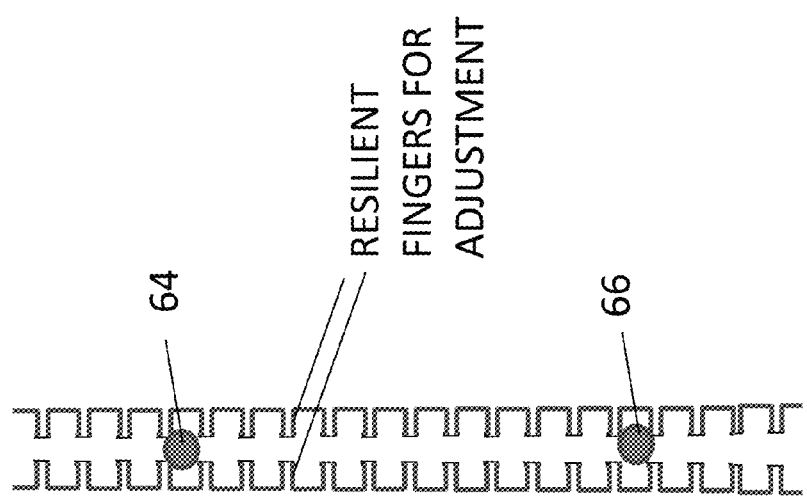
FIG. 25 is a schematic illustration of the resilient fingers which provide for the adjustment of axles 64, 65, which may be formed from a plastic material which is somewhat flexible, yet provides sufficient durability and support.

FIG. 25 is a schematic illustration of the resilient fingers which provide for the adjustment of axles 64, 65, which may be formed from a plastic material which is somewhat flexible, yet provides sufficient durability and support. Resilient fingers which may be a pliable plastic or elastic provide ample support for the axles 64 and 66 yet are easily adjustable by moving the axles up and down in the channel formed as shown in FIG. 25. It can be readily appreciated by those of ordinary skill in the art that a variety of adjustment means may be used without departing from the scope of the invention.

Figure 26:
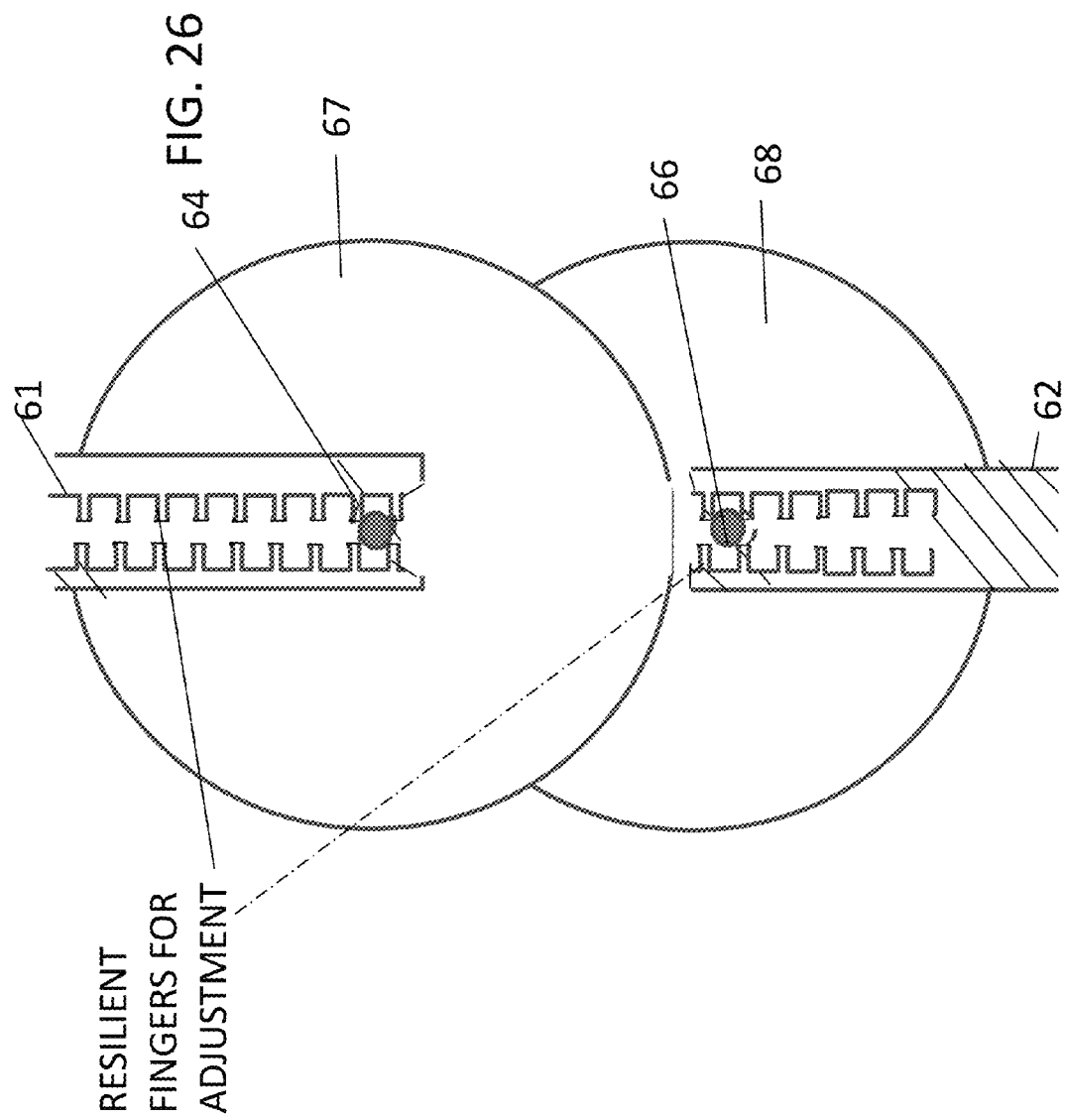
FIG. 26 is a schematic illustration of a portion of the dispenser portions 61 and 62 having resilient portions therein providing adjustment of axles 64 and 66. The resilient fingers may be formed from a plastic material (such as PVC) which is somewhat flexible, yet provides sufficient durability and support.

FIG. 26 is a schematic illustration of a portion of the dispenser portions 61 and 62 having resilient portions therein providing adjustment of axles 64 and 66. The resilient fingers may be formed from a plastic material (such as PVC) which is somewhat flexible, yet provides sufficient durability and support. The flexible nature of the fingers provide for movement of axles 64 and 66 to change the configuration of the foil passing between the wheel assemblies 63 and 65 or, as depicted in FIG. 24, the wheel assemblies 67 and 68.

Figure 27:
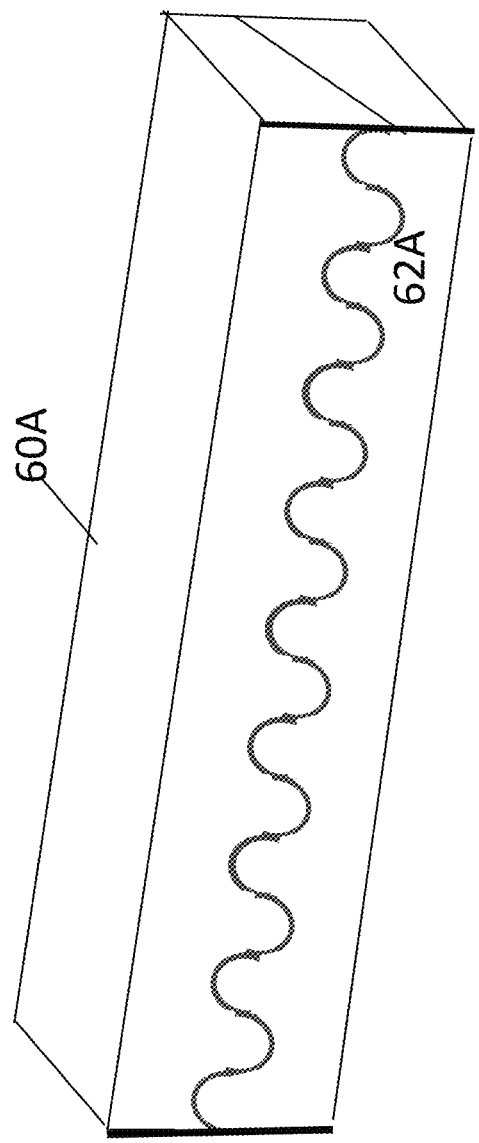
FIG. 27 is a schematic illustration of a dispenser 60A comprising top and bottom portions 61A and 62B having a corrugated-like or undulated foil interface portions.

FIG. 27 is a schematic illustration of a dispenser 60A comprising top and bottom portions 61A and 62B having a corrugated-like or undulated foil interface portions. As the foil exits the dispenser 60A, it will pass through the undulated surfaces imparting an undulated configuration to the cross-section of the foil.

Figure 28:
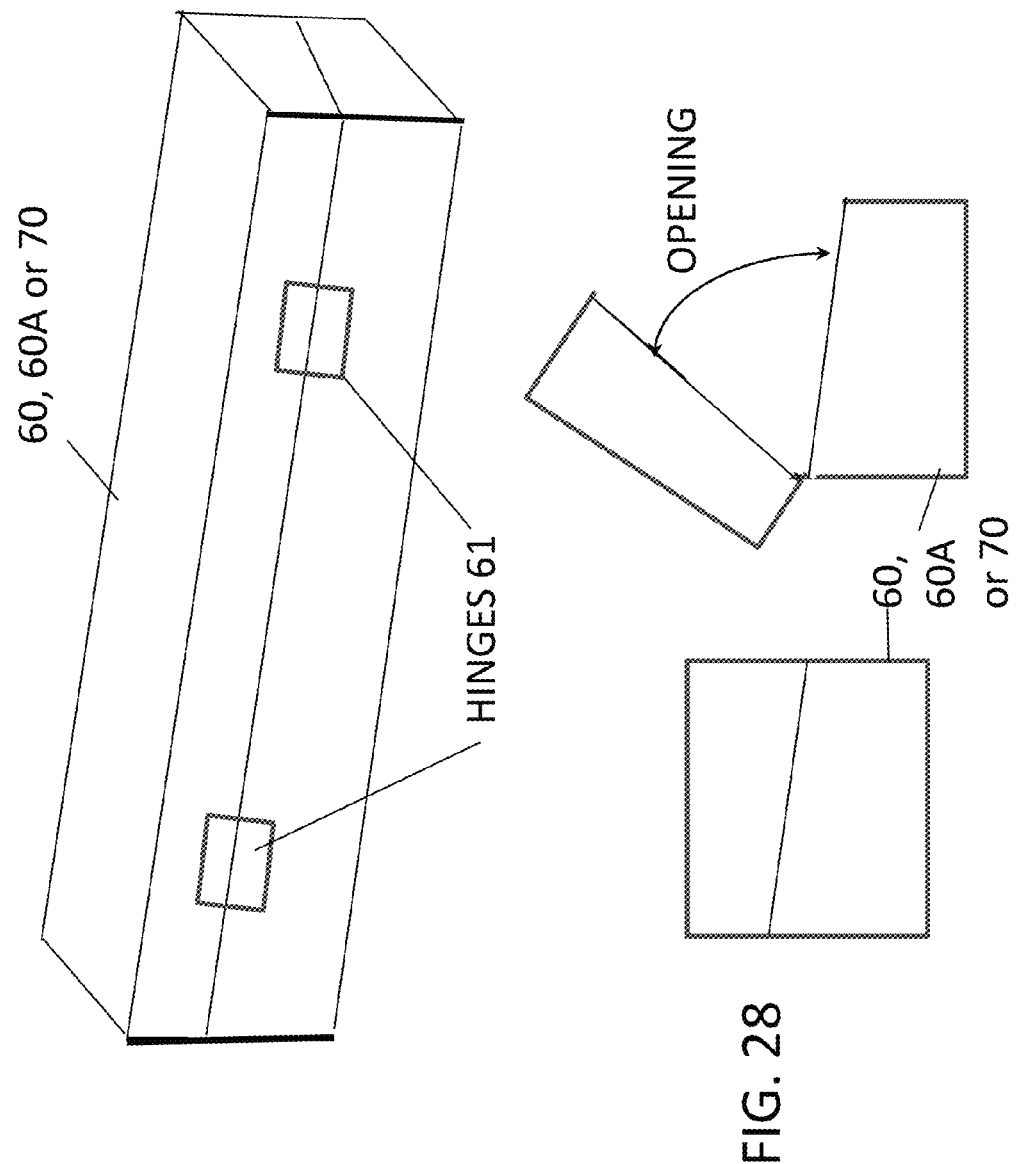
FIG. 28 is a schematic illustration of a dispenser 60, 60A or 70 comprising hinges 61 which allow the opening of the dispenser 60, 60A or 70.

FIG. 28 is a schematic illustration of a dispenser 60, 60A or 70 comprising hinges 61 which allow the opening of the dispenser 60, 60A or 70. The hinges 61 allow the top and bottom portions of the dispensers 60, 60A or 70 to separate to permit entry of the roll of foil.

Figure 29:
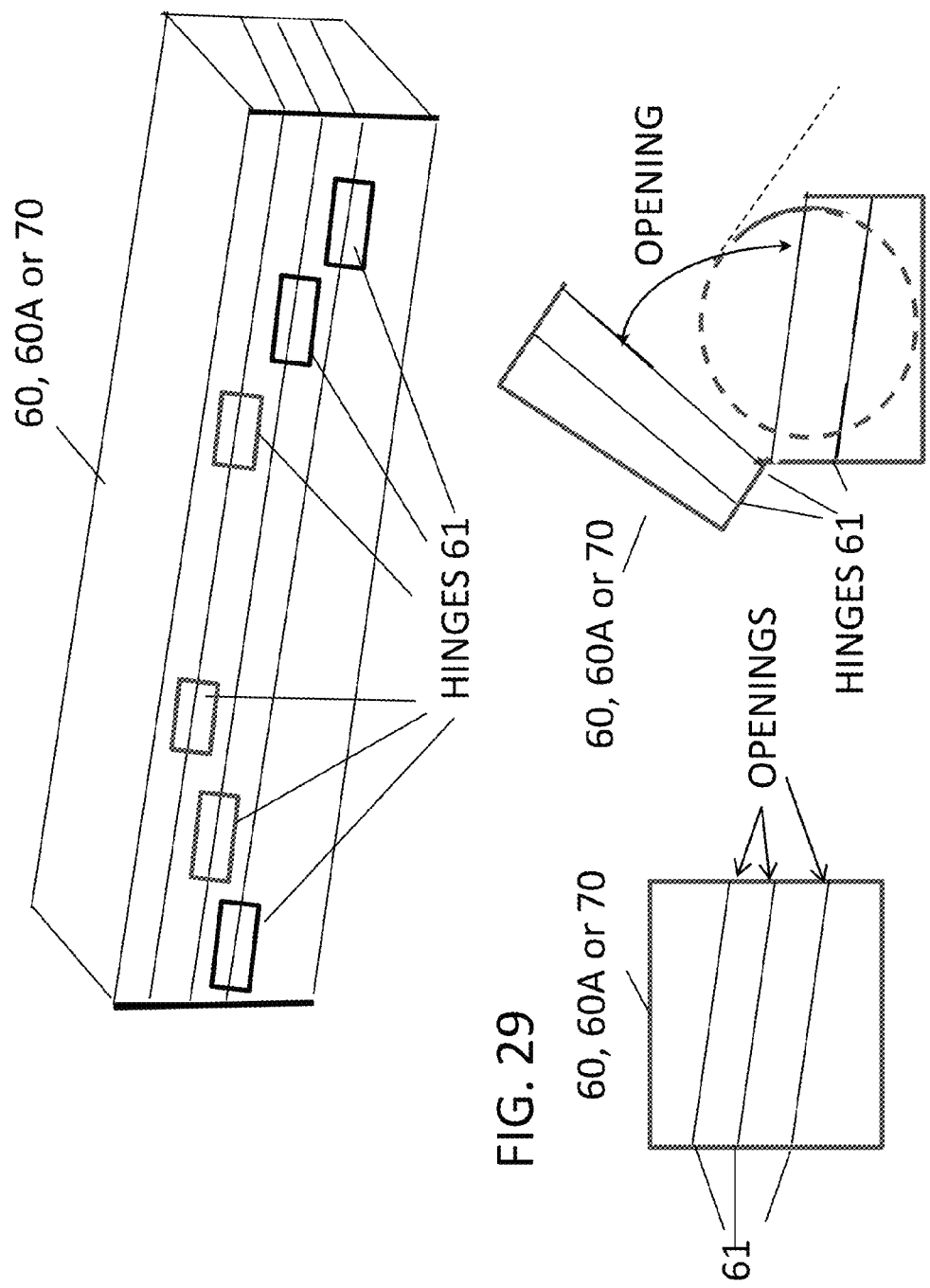
FIG. 29 is a schematic illustration of a dispenser 60, 60A or 70 comprising multiple sets of hinges 61 which allow the opening of the dispenser 60, 60A or 70 at multiple locations providing a variety of configuration patterns.

FIG. 29 is a schematic illustration of a dispenser 60, 60A or 70 comprising multiple sets of hinges 61 which allow the opening of the dispenser 60, 60A or 70 at multiple locations providing a variety of configuration patterns. As can be readily appreciated by those of ordinary skill in the art, the dispenser may be opened at different points of separation to permit entry of the foil therebetween, as depicted, for example, in FIG. 30.

FIG. 30 is a schematic illustration of a dispenser 60, 60A or 70 comprising multiple sets of configurable surfaces providing two different configuration patterns. As can be readily appreciated by those of ordinary skill in the art, the dispenser may be opened at different points of separation to permit entry of the foil therebetween, as depicted, for example, in FIG. 30.

FIG. 31A is a schematic illustration of another preferred embodiment which produces another type of grill-like configuration in the foil. FIG. 32 is an alternative schematic illustration showing an enlarged view of the broken circle portion of FIG. 31A. Upper section or portion 61 and lower portion or section 62 each contain diamond shaped wheel-like, substantially circular portions 67D, 68D which configure the foil into ridges and valleys as the foil passes between the circular, wheel-like portions (having a diamond cross-section) 67D, 68D. Note that each of the substantially circular first and second portions 67D and 68D comprise surfaces that are circular in cross section in a first plane and form an apex in a second plane perpendicular to the first plane, as illustrated in FIGS. 31B and 31C. The upper portions 67D and lower portions 68D may, for example, be made of hard or flexible plastic or rubber-like material. The axles 64 and/or 66 may be made of metal, such as for example, steel or aluminum. Motors 99U and 99L may be used to drive the axles 64 and 66. Alternately, one of the axles may be belt driven as shown in FIG. 32.

Figure 32:
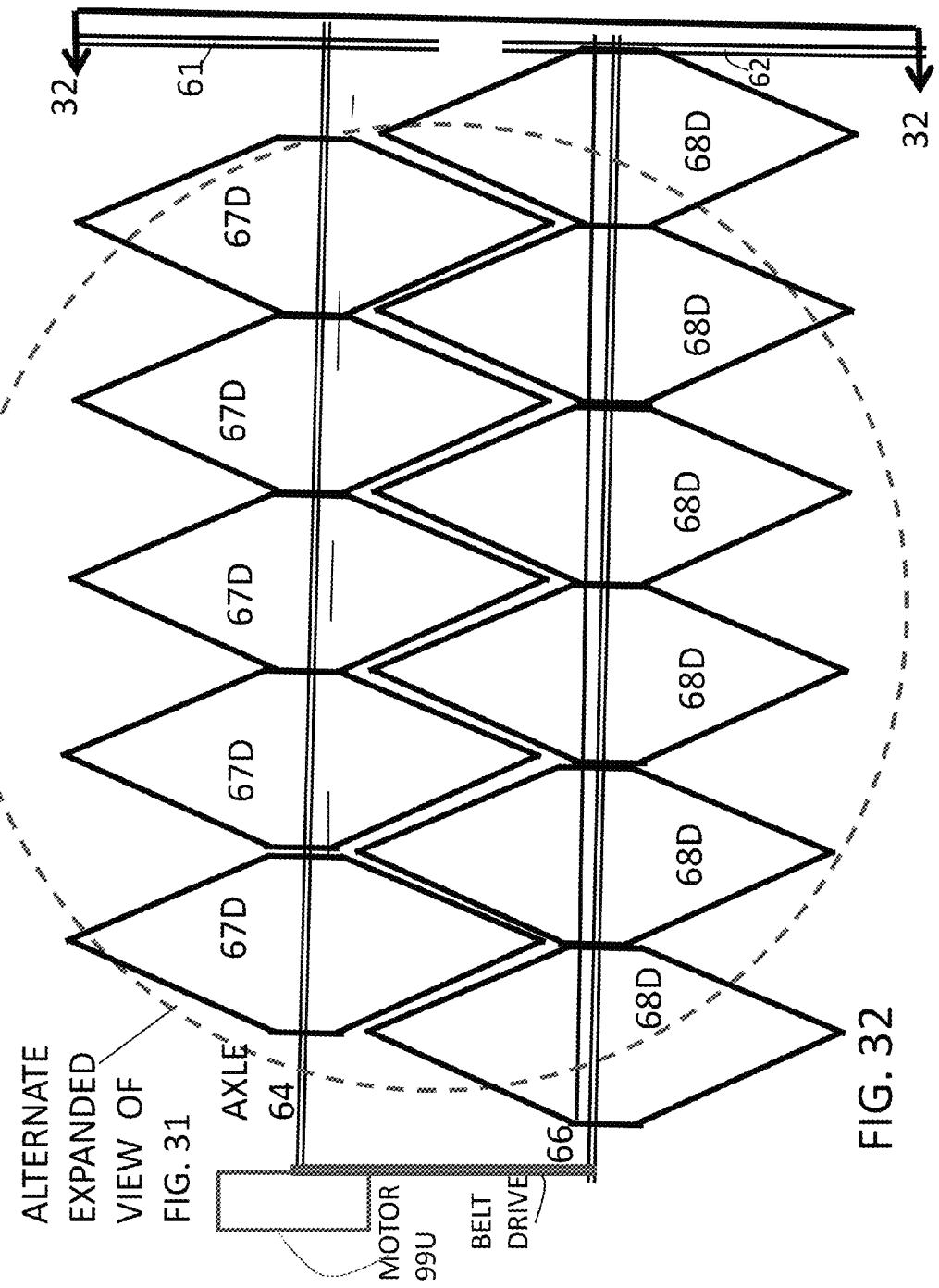
FIG. 32 is an alternative schematic illustration showing an enlarged view of the broken circle of FIG. 31.
Figure 33:
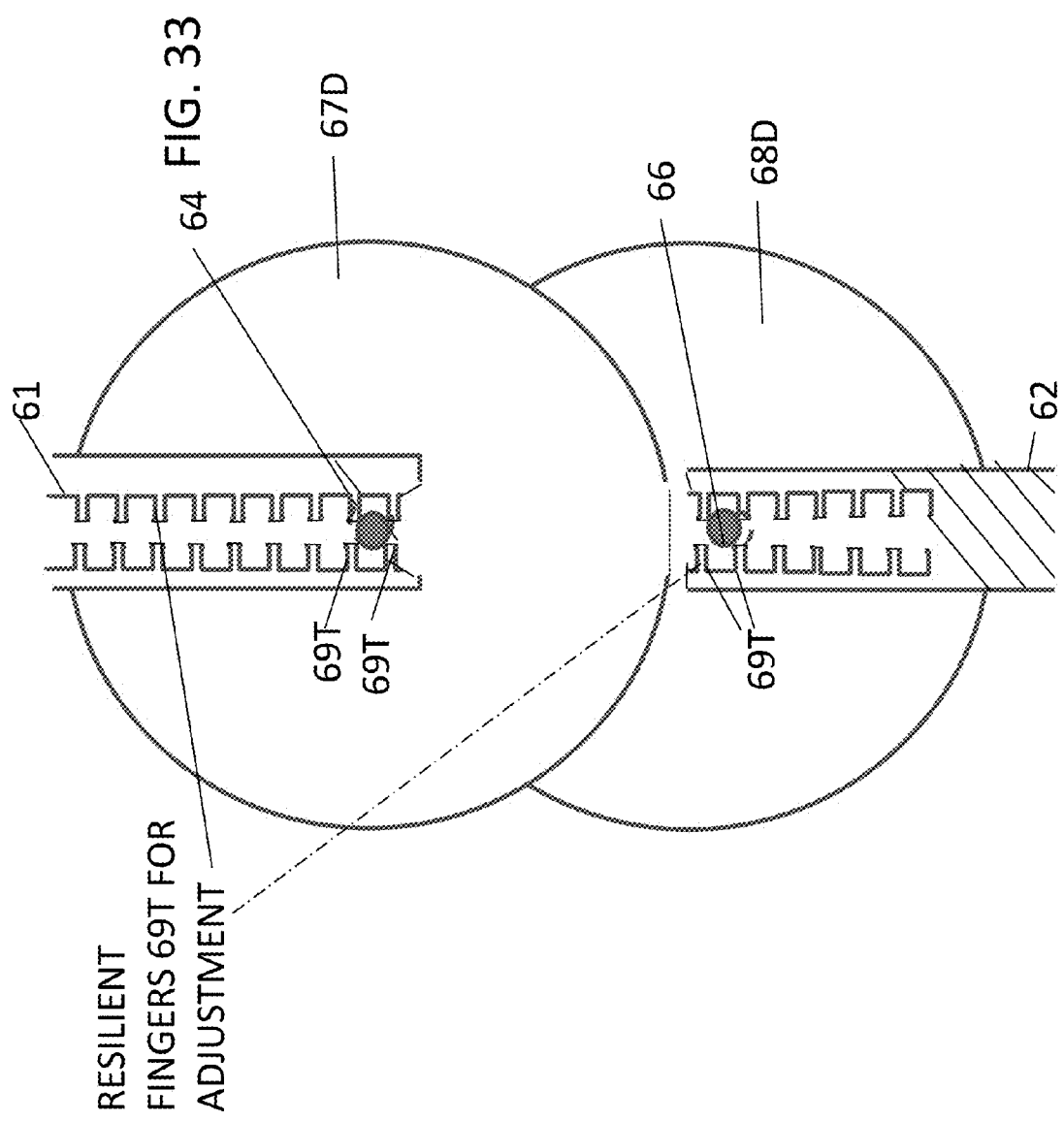
FIG. 33 is a side view of the configuration wheels of the alternate embodiment of FIG. 32.

FIG. 33 is a side view of the configuration wheels of the alternate embodiment of FIG. 32. As shown in FIG. 33, the axles 64, 66 are adjustable by moving the axles between tongued portions 69T in FIG. 33. The tongued portions and supports 61, 62 may be made of a plastic material such as polyvinyl choride. The adjustment of the axles 64 and 66 may be accomplished by pushing or pulling on the axles 64, 66. In addition, the shafts may be motor driven by motors 99L and 99U. Alternately, at least one of the shafts may be gear driven through a series of gears which extend from one shaft to the other.

Figure 31:
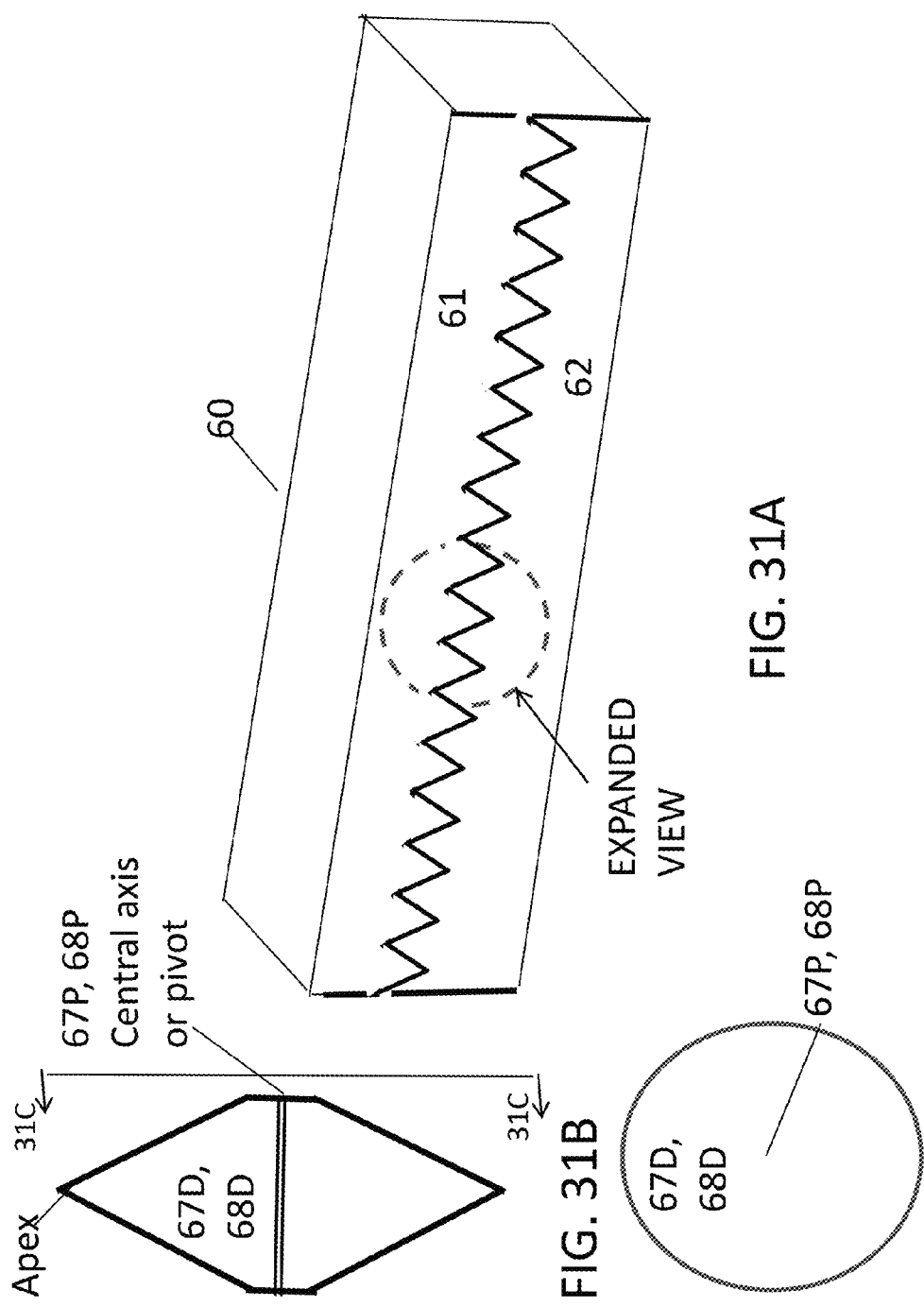
FIG. 31A is a schematic illustration of another preferred embodiment which produces another type configuration in the foil.
FIG. 31B is a schematic illustration of substantially circular first and second portions 67D and 68D comprising surfaces that form an apex in a second plane perpendicular to the first plane.
FIG. 31C is a schematic illustration of substantially circular first and second portions 67D and 68D comprising surfaces that are circular in cross section in a first plane taken along lines 31C in FIG. 31B
Figure 34:
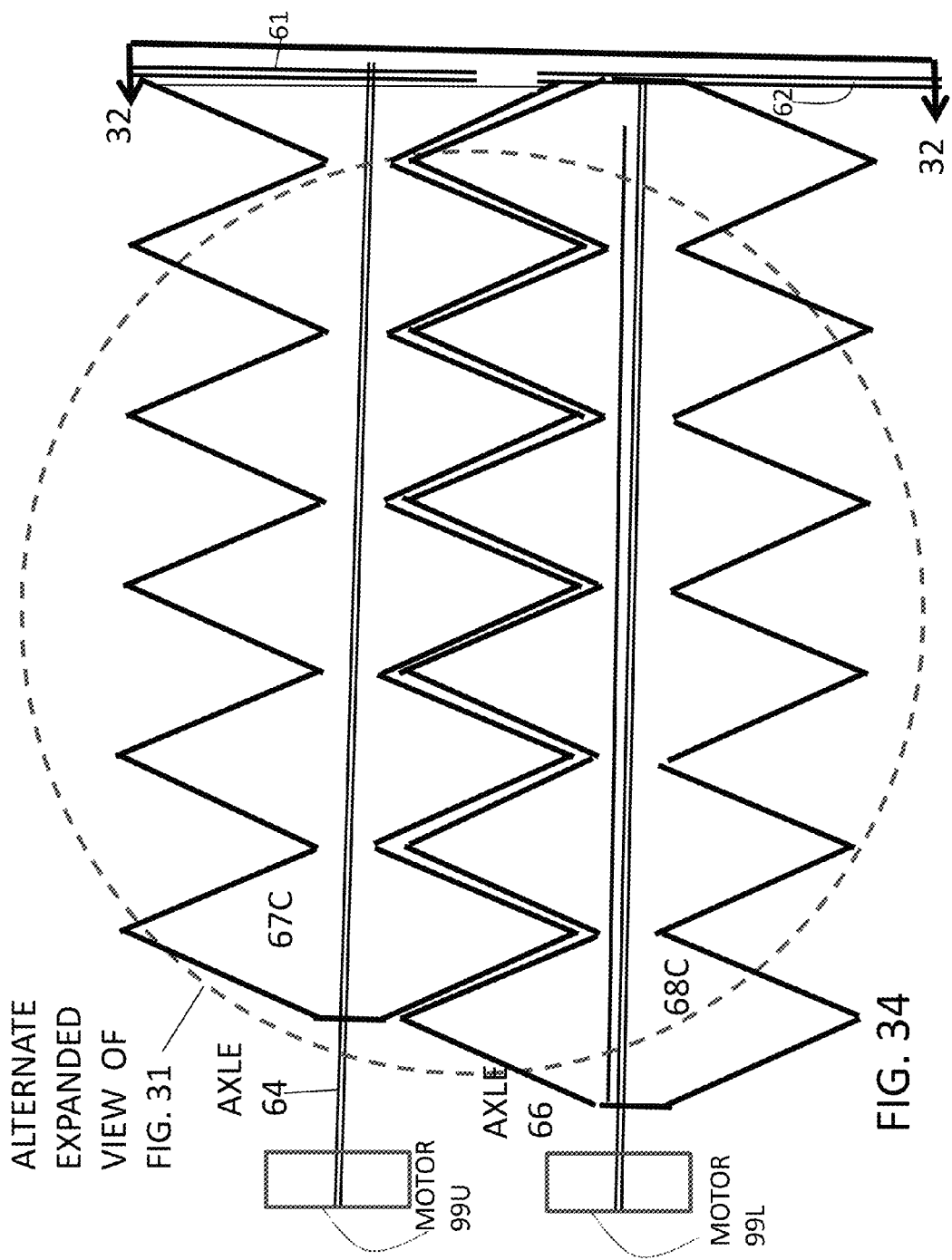
FIG. 34 is a second alternative schematic illustration showing an enlarged view of the broken circle of FIG. 31.

FIG. 34 is a second alternative schematic illustration showing an enlarged view of the broken circle portion of FIG. 31. In the embodiment of FIG. 34, the circular wheel-like portions 67C may be combined as illustrated in FIG. 34. Likewise, the circular wheel-like portions 68C may be combined as illustrated in FIG. 34. The axles 64, 66 may both be driven by motors 99U, 99L or one of the two axles 64, 66 may be belt driven as shown in FIG. 32.

Figure 35:
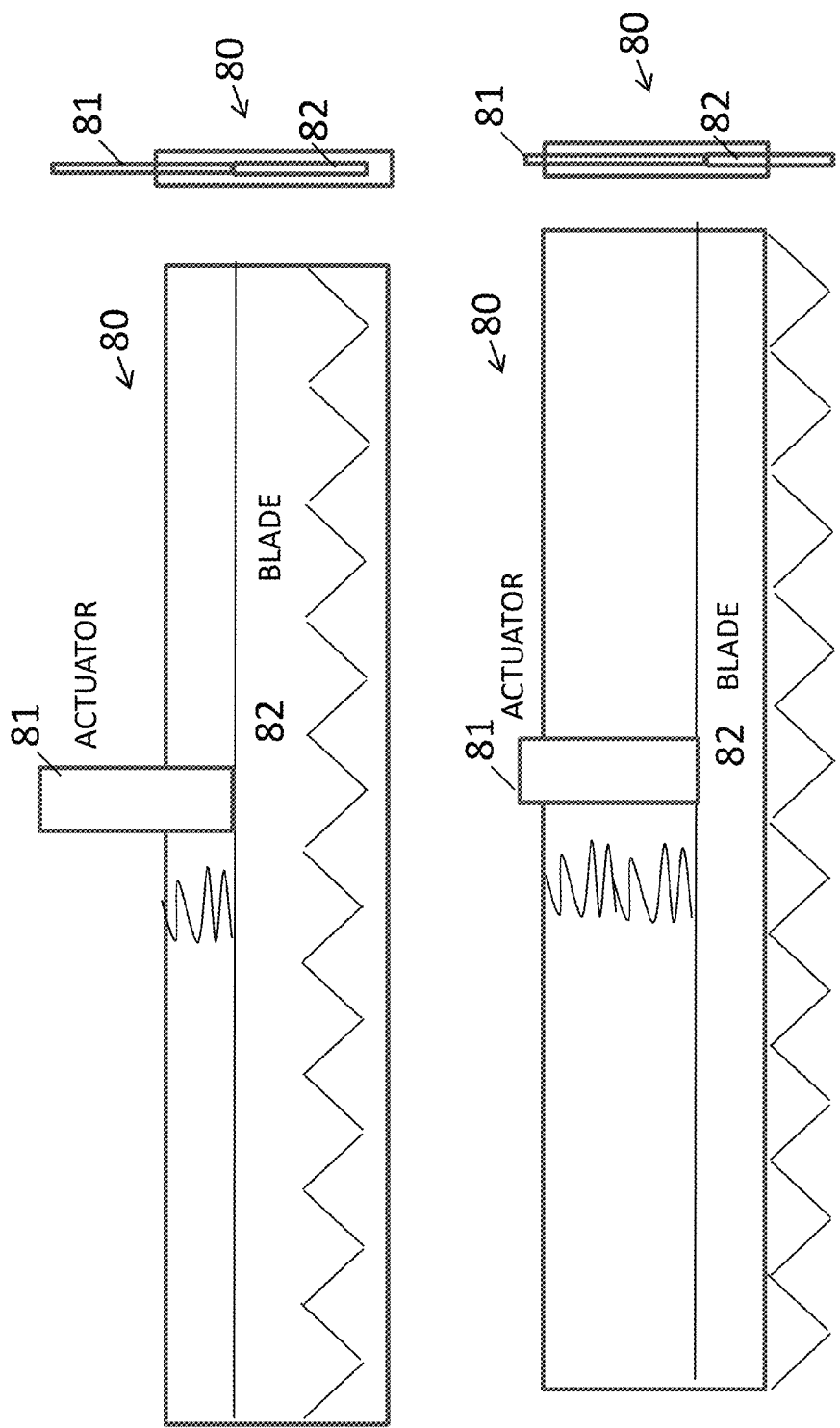
FIG. 35 is a schematic illustration of a cutting tool adapted to be used with the preferred embodiments of the present invention.
Figure 36:
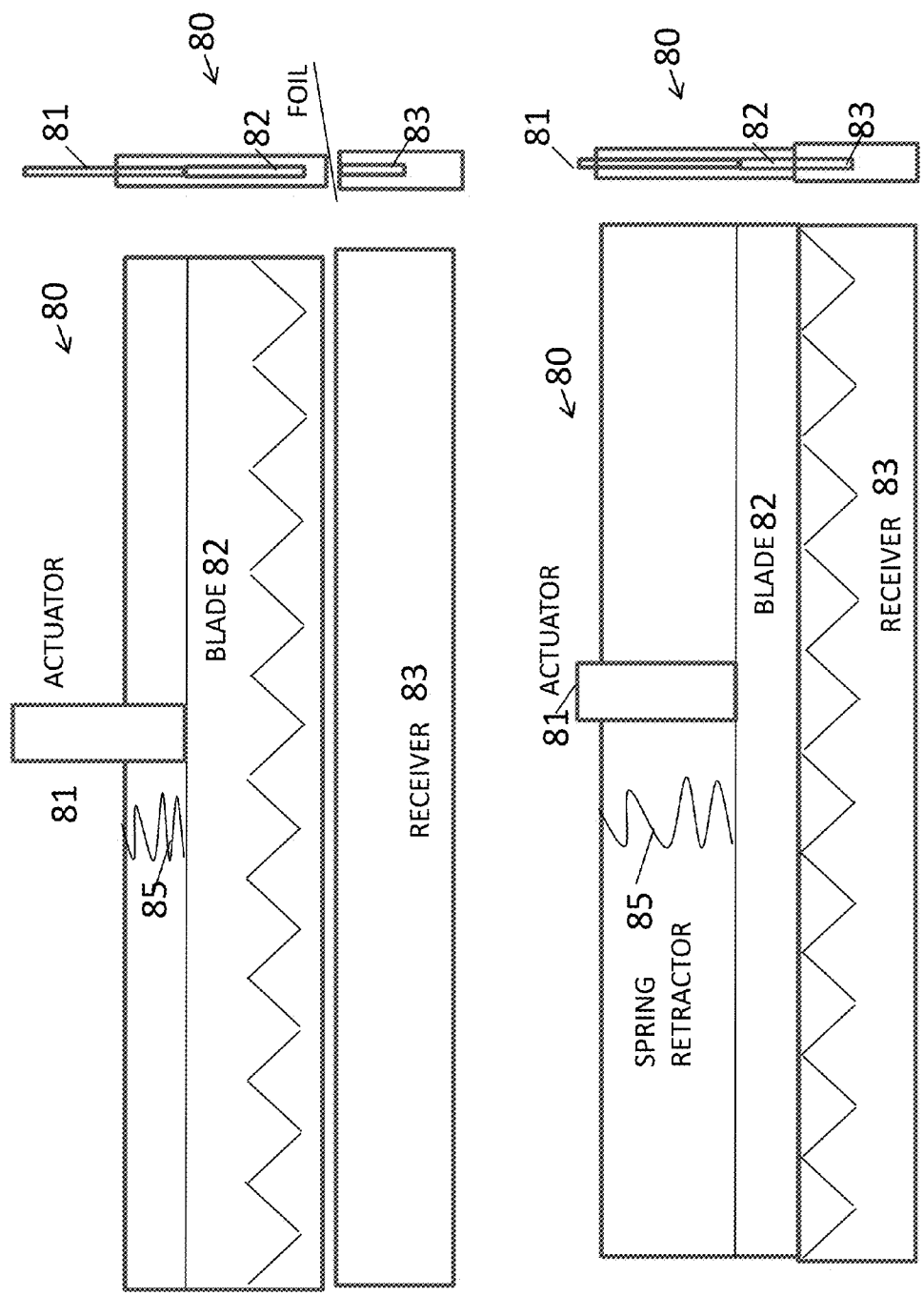
FIG. 36 is a schematic illustration of a cutting tool and receiver portion adapted to be used with the preferred embodiments of the present invention.

FIG. 35 is a schematic illustration of a cutting tool adapted to be used with the preferred embodiments of the present invention. The cutting tool may be integral with the dispenser 60 (as shown in FIG. 31), 60A or 70. The cutting tool 80 comprises an actuator 81 which engages a blade 82 within a housing as seen to the right in FIG. 35. As the actuator is pressed downward, the blade 82 engages and cuts the foil therebetween and enters the receiver 83, as shown in FIG. 36. FIG. 36 is a schematic illustration of a cutting tool and receiver portion adapted to be used with the preferred embodiments of the present invention.

Figure 37:
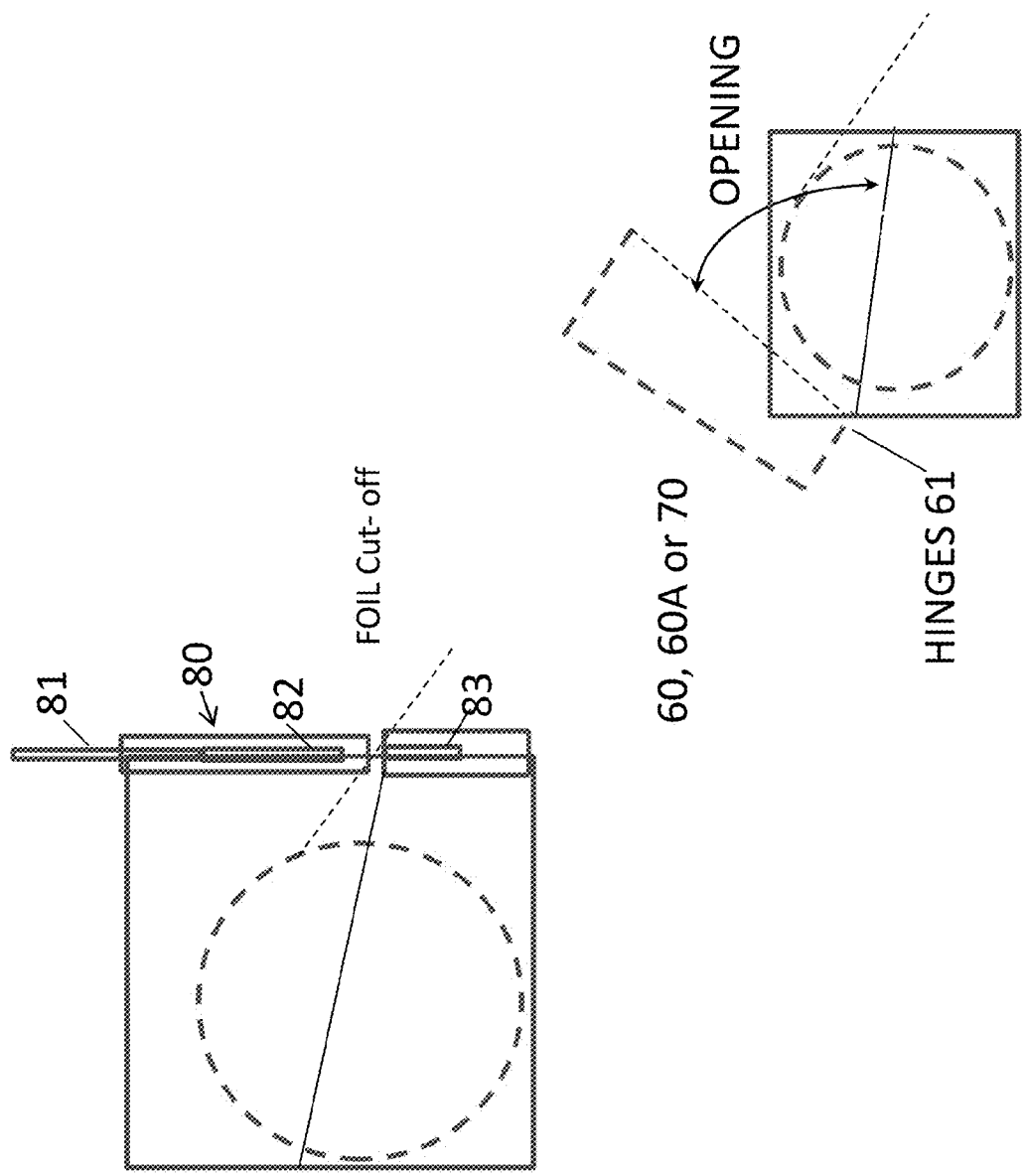
FIG. 37 is a schematic illustration of a side view of the cutting tool and receiver portion shown in FIG. 36 adapted to be used with the preferred embodiments of the present invention.

Upon release, the actuator returns to the position shown in the upper portion of FIG. 35 due to the force of spring 85. The blade 82 may be formed of rigid plastic or metal. FIG. 37 is a schematic illustration of a side view of the cutting tool and receiver portion shown in FIG. 36 adapted to be used with the preferred embodiments of the present invention.

FIG. 38A is a top view of an alternate configuration in which the axles 64, 66 and configuration portions may be bowed inward so that the configuration of the foil on the outside portion of the foil is not done at the same time as the configuration of the inner portion of the foil.

FIG. 38B is a top view of an alternate configuration in which the axles 64, 66 and configuration portions may be cascaded so that the configuration of the foil on the outside portion of the foil is not done at the same time as the configuration of the inner portion of the foil; i.e. the inner portion is configured last. Although the diamond cross section wheels are shown in the FIGS. 38A and 38B, wheel 67 and 68 (as shown in FIG. 24) may be utilized in each of the cascaded embodiments 90, 110 shown in FIGS. 38A and 38B. in each of FIGS. 38A and 38B, the axles 64 and 64 are driven by motor 99U through gears 99G. Motor 99U may be battery powered.

FIG. 39 is a depiction of a close-up view of the cascaded axles 64B, 66B of either of the embodiments of FIG. 38A or 38B. Note that the axles 64, 66 are adjustable within tongue 69T and groove portions as schematically depicted in FIG. 39. Cutter portion 80 may be affixed to the side as shown in FIG. 39. The foil cutter 80 comprises a plunger 81, blade 82 (which may be steel or hard plastic) and blade receiver 83, biased in the up position by a spring 84 (not shown). After the foil is configured by the cascaded wheel sets, the foil cutter 80 cuts the foil by the hand of the used pushing downward on the plunger 81 against the force of the spring 85. Upon the hand's release of the plunger 81, the blade 82 returns to the position shown in FIG. 39. Note that wheels 67, 67D, 68, 68D may be formed of a resilient or rigid material such as synthetic rubber, or plastic (e.g., polyvinylchloride). The configuration of the wheels is such that a grill-like configuration is produced in the foil in the embodiments depicted in, inter alia, FIGS. 38A, 38B and 39. In the alternative, an undulated configuration may be provided utilizing more rounded wheels 67, 68.

FIG. 40 is a schematic illustration of another preferred embodiment assembly 100 comprising rotatable elements 67E, 68E operatively associated with a base portion 102, 104, 107, and a support portion 101, 103, 106. The support portion pivots on hinge 105 and is shown in a closed or engaged position. Rotatable elements 67E (and 68E) are spaced from one another at a spacing determined by the spacing of the undulations in the foil. The axles 108, 109 may optionally have screw threads thereon to allow horizontal adjustment of the rotatable elements. In such an optional configuration, there may be locking nuts to lock the rotatable elements in place.

Rotatable elements 67E and 68E may turn freely on shafts 108, 109 and/or may be secured to the axles 108,109 with the axles turning freely within holes in sidewalls 103,104, 106. 107. Optionally, the axles may be mounted within circular bearings and/or supports on the sidewalls 103,104, 106. 107.

The elements 101, 102, 103, 104, 106, 107 may be made of wood, plastic or metal (such as for example aluminum). In the case of plastic or metal, elements 101, 103, 106 may be integral; and elements 104, 102, 107 may be integral. The elements 101, 103, 106 form a support portion. The elements 104, 102, 107 form the base portion. The support portion 101, 103, 106 pivot relative to the base portion 104, 102, 107.

FIG. 41 is a schematic illustration of the preferred embodiment of FIG. 40 showing the support portion 101, 103, 106 in an open position. In this open position, the user may position the aluminum foil within the assembly 100 and move the support 101, 103, 106 to an engaged or closed portion. By moving the foil within the assembly (i.e. pulling the foil though), the rotatable elements 67E, 68E engage the foil from one end of the foil to the other to thereby impart undulations to the foil.

Figure 42:
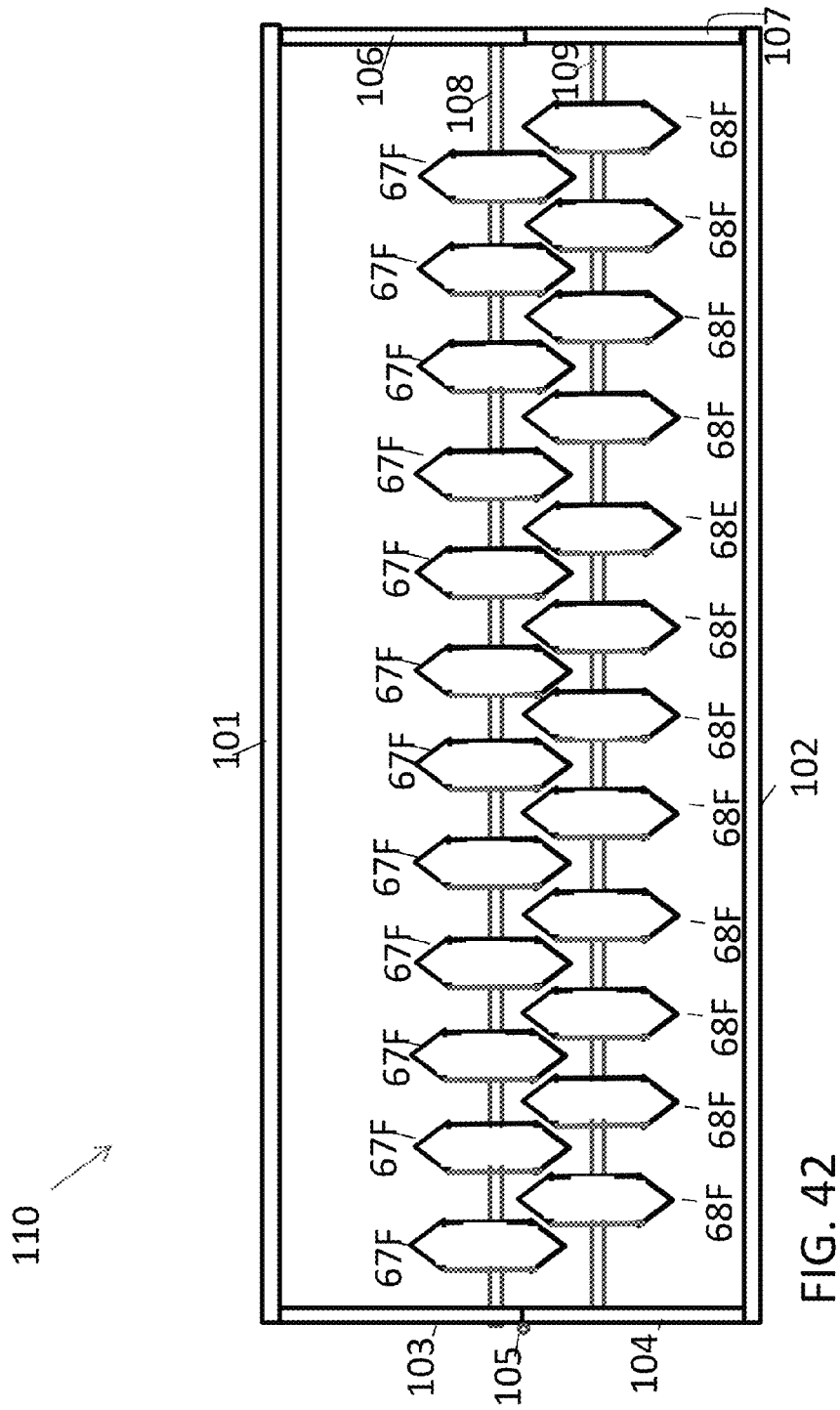
FIG. 42 is a schematic illustration of another preferred embodiment comprising rotatable elements 67F, 68F operatively associated with a base portion 102, 104, 107, and a support portion 101, 103, 106. The support portion pivots on hinge 105 and is shown in a closed or engaged position.

FIG. 42 is a schematic illustration of another preferred embodiment Assembly 110 comprising rotatable elements 67F, 68F operatively associated with a base portion 102, 104, 107, and a support portion 101, 103, 106. The support portion pivots on hinge 105 and is shown in a closed or engaged position. Rotatable elements 67F (and 68F) are spaced from one another at a spacing determined by the spacing of the undulations in the foil. The axles 108, 109 may optionally have screw threads thereon to allow horizontal adjustment of the rotatable elements. In such an optional configuration, there may be locking nuts to lock the rotatable elements in place.

Rotatable elements 67F and 68F may turn freely on shafts 108, 109 and/or may be secured to the axles 108,109 with the axles turning freely within holes in sidewalls 103,104, 106. 107. Optionally, the axles may be mounted within circular bearings and/or supports on the sidewalls 103,104, 106. 107.

The elements 101, 102, 103, 104, 106, 107 may be made of wood, plastic or metal (such as for example aluminum). In the case of plastic or metal, elements 101, 103, 106 may be integral; and elements 104, 102, 107 may be integral. The elements 101, 103, 106 form a support portion. The elements 104, 102, 107 form the base portion. The support portion 101, 103, 106 pivot relative to the base portion 104, 102, 107.

Figure 43:
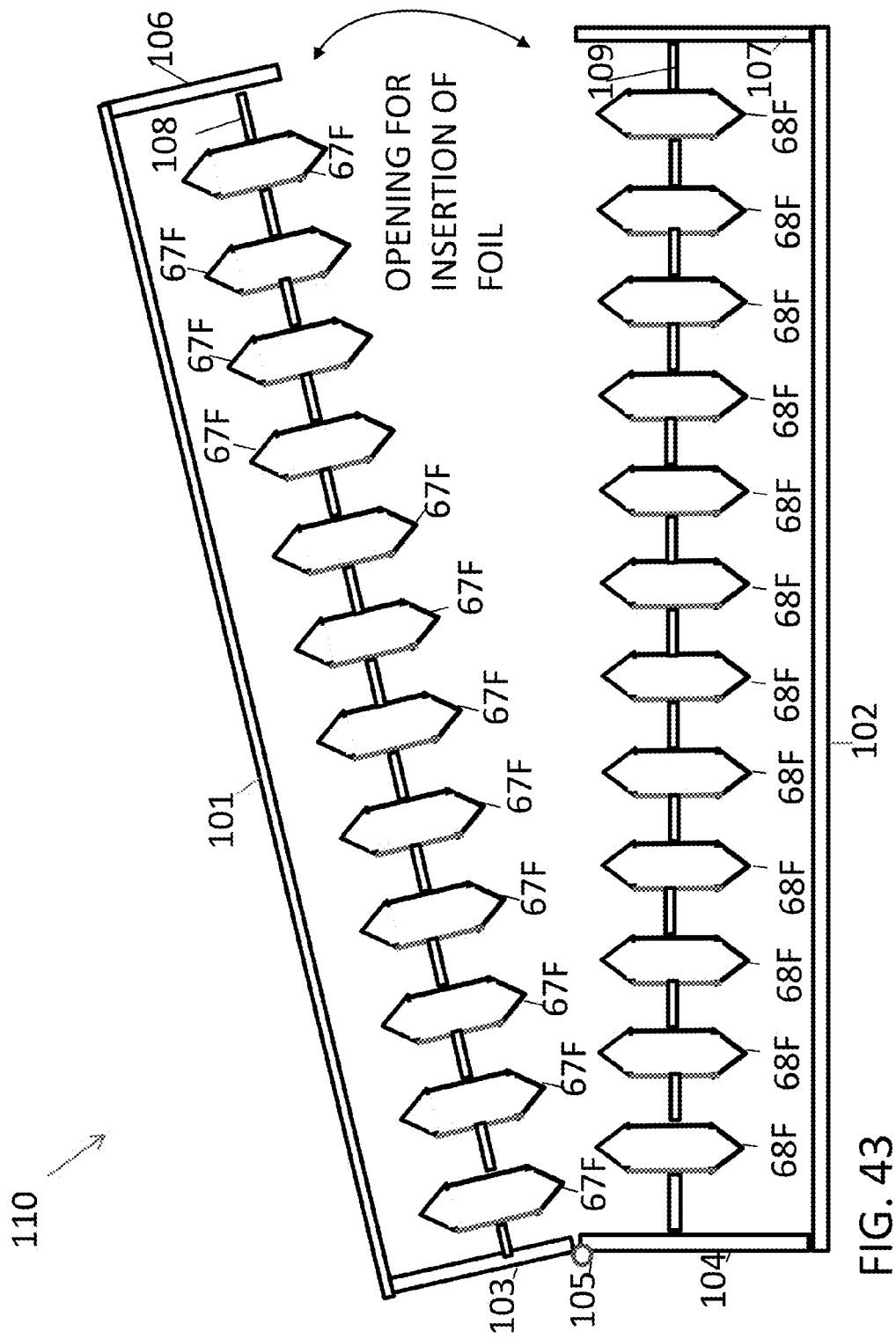
FIG. 43 is a schematic illustration of the preferred embodiment of FIG. 42 showing the support portion in an open position.

FIG. 43 is a schematic illustration of the preferred embodiment of FIG. 42 showing the support portion 101, 103, 106 in an open position. In this open position, the user may position the aluminum foil within the assembly 100 and move the support 101, 103, 106 to an engaged or closed portion. By moving the foil within the assembly (i.e. pulling the foil though), the rotatable elements 67F, 68F engage the foil from one end of the foil to the other to thereby impart undulations to the foil.

Figure 44:
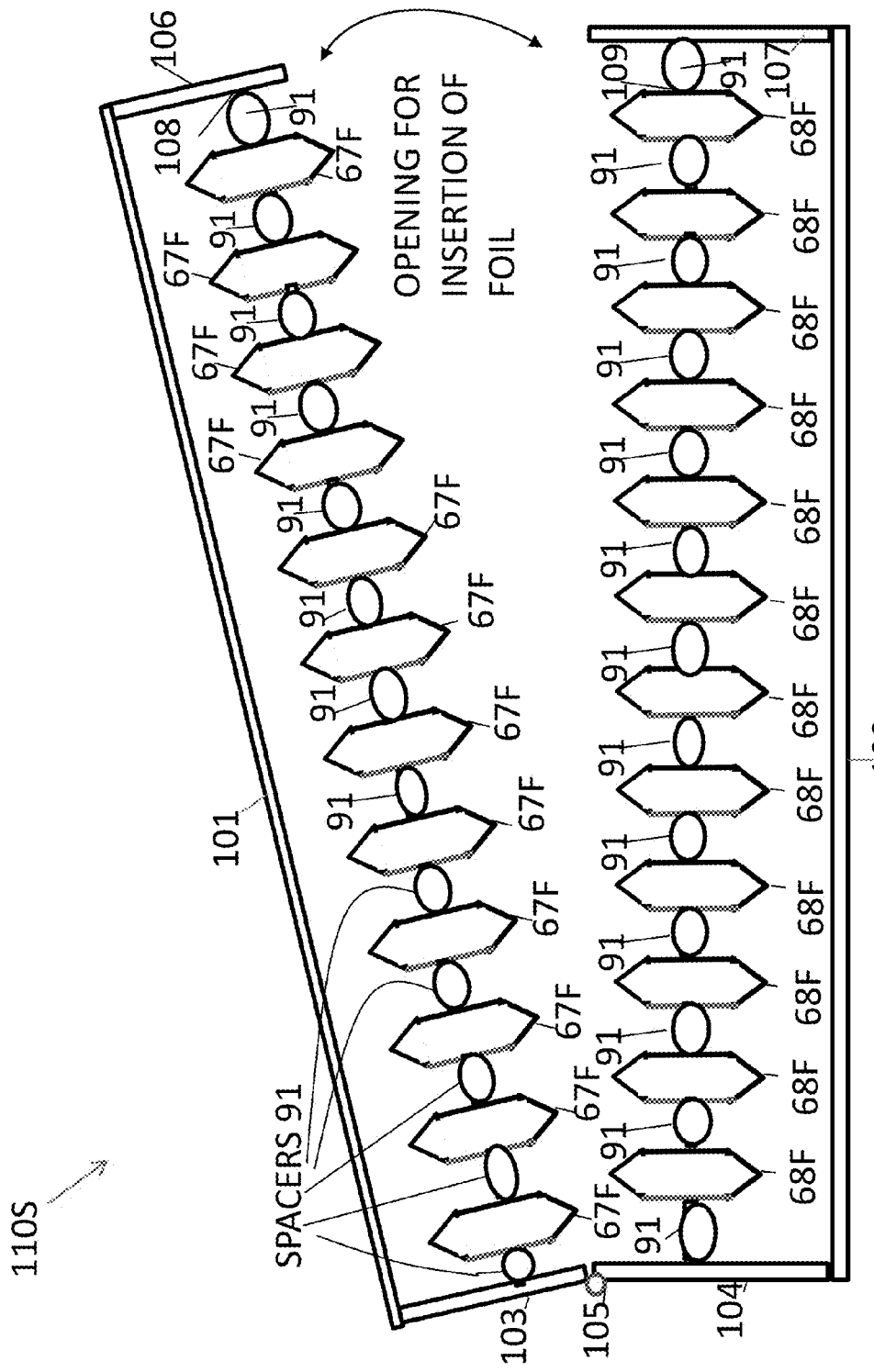
FIG. 44 is a schematic illustration of another preferred embodiment comprising rotatable elements 67F, 68F having spacers therebetween and operatively associated with a base portion 102, 104, 107, and a support portion 101, 103, 106. The support portion pivots on hinge 105 and is shown in an open position.

FIG. 44 is a schematic illustration of another preferred embodiment assembly 1105 comprising rotatable elements 67F, 68F having spacers therebetween and operatively associated with a base portion 102, 104, 107, and a support portion 101, 103, 106. The support portion pivots on hinge 105 and is shown in an open position. Although not shown, rotatable elements 67E, 68E may be substituted for the rotatable elements 67F, 68F; i.e., spaces could be utilized with either of the 100 or 110 assemblies. In the assemblies 100, 110, the rotatable elements 67E, 68E, 67F, 68F may be made of wood, plastic or metal (such as for example aluminum).

Figure 45:
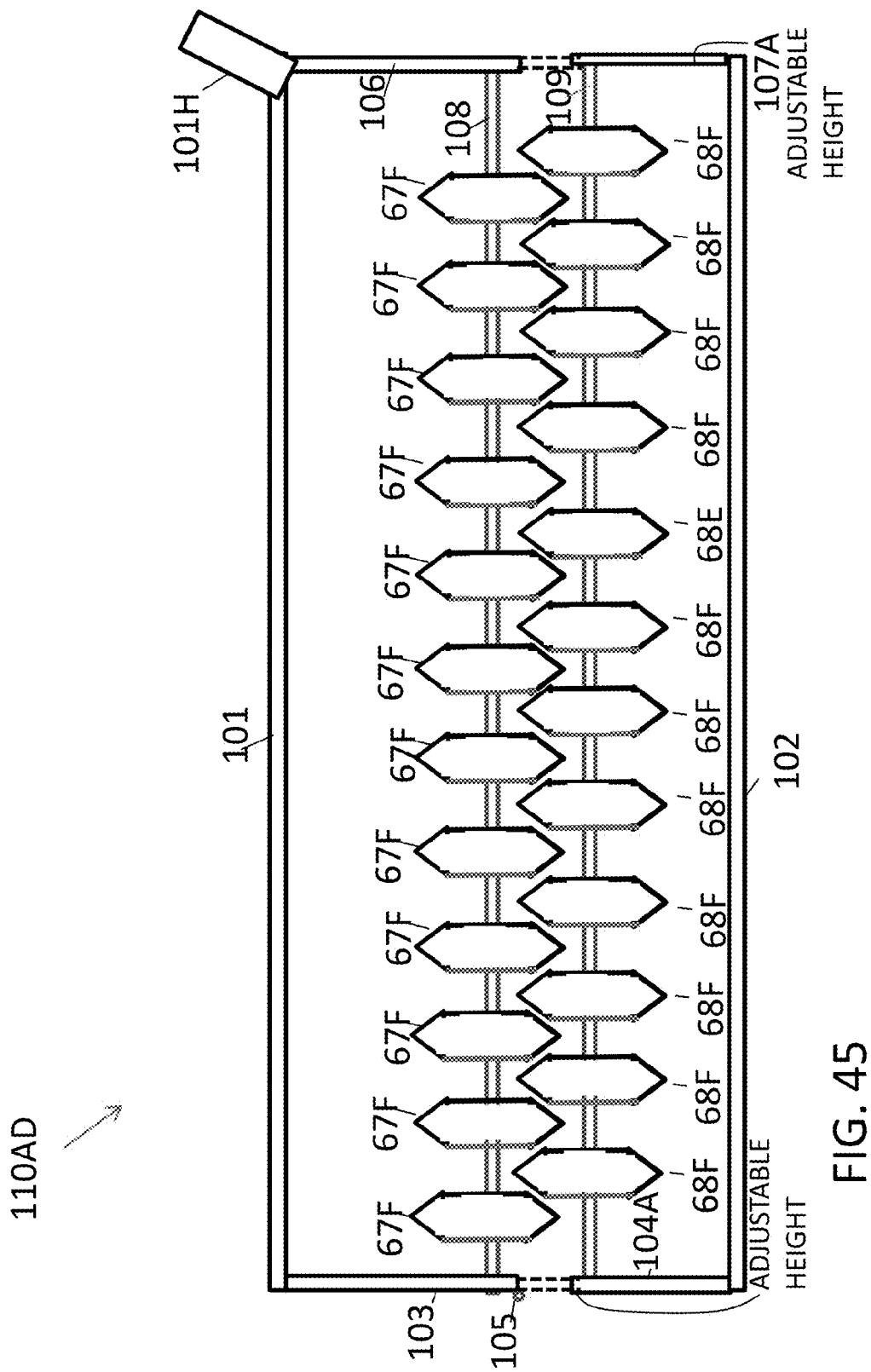
FIG. 45 is a schematic illustration of another preferred embodiment comprising rotatable elements 67F, 68F operatively associated with a base portion 102, 104, 107, and a support portion 101, 103, 106. The support portion pivots on hinge 105 and is shown in a closed or engaged position. The spacing between the rotatable elements 67F and 68F is adjustable.

FIG. 45 is a schematic illustration of another preferred embodiment assembly 110AD comprising rotatable elements 67F, 68F operatively associated with a base portion 102, 104, 107, and a support portion 101, 103, 106. The support portion pivots on hinge 105 and is shown in a closed or engaged position. The spacing between the rotatable elements 67F and 68F is adjustable. Rotatable elements 67F (and 68F) are spaced from one another at a spacing determined by the spacing of the undulations in the foil. The axles 108, 109 may optionally have screw threads thereon to allow horizontal adjustment of the rotatable elements. In such an optional configuration, there may be locking nuts to lock the rotatable elements in place.

Rotatable elements 67F and 68F may turn freely on shafts 108, 109 and/or may be secured to the axles 108,109 with the axles turning freely within holes in sidewalls 103,104, 106. 107. Optionally, the axles may be mounted within circular bearings and/or supports on the sidewalls 103,104, 106. 107.

Figure 46F:
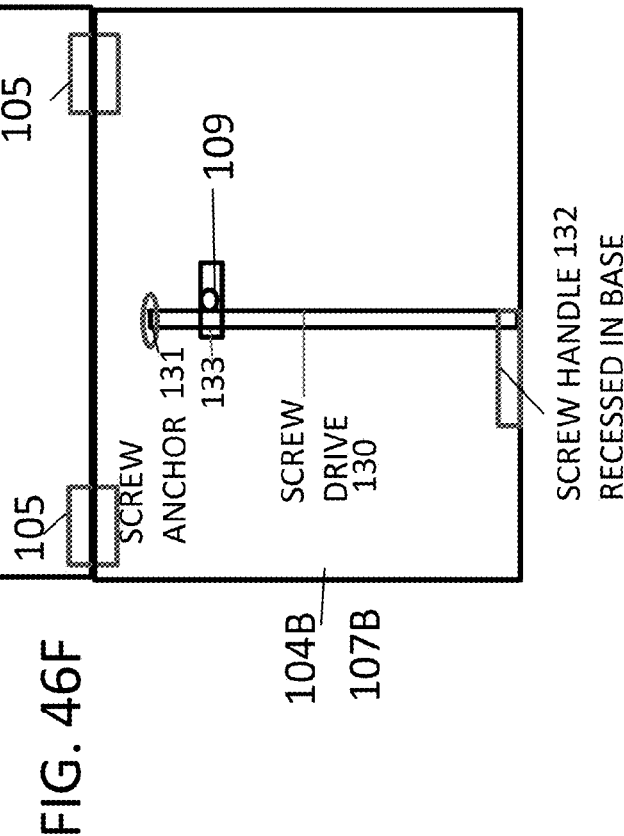
FIG. 46F is a schematic illustration showing a side view showing the sides 103, 106, 104B, 107B wherein the spacing between the rotatable elements is adjustable using a screw drive.

The elements 101, 102, 103, 104A, 106, 107A may be made of wood, plastic or metal (such as for example aluminum). In the case of plastic or metal, elements 101, 103, 106 may be integral. The elements 101, 103, 106 form a support portion. The elements 104, 102, 107 form the base portion. The support portion 101, 103, 106 pivot relative to the base portion 104, 102, 107. In the assembly 110AD the spacing between the axles 108, 109 is adjustable as shown in FIG. 45. The adjustment mechanism may be, for example, a scissors type of adjustment (FIG. 46E) or a screw type adjustment (FIG. 46F).

FIG. 46A is a schematic illustration showing a side view showing the sides 103, 104. Also shown are hinges 105. Hinges 105 may be integral with the sides 103, 104 in which case a material such as plastic may be used with a thinner portion at the pivoting area to allow pivoting. FIG. 46B is a schematic illustration showing a side view showing the sides 106, 107. Optionally a handle 101H may be placed on the top 101 or side 106 to facilitate opening and closing of the support portion.

FIG. 46C is a schematic illustration showing a side view showing the sides 103, 104 wherein the spacing between the rotatable elements is adjustable.

FIG. 46D is a schematic illustration showing a side view showing the sides 106, 107 wherein the spacing between the rotatable elements is adjustable. The adjustable section is labeled 11.

FIG. 46E is a schematic illustration showing a scissor type adjustment mechanism for changing the spacing between the rotatable elements. This adjustment mechanism may be positioned in the area shown as 111 in FIGS. 46C and 46D.

FIG. 46F is a side view showing the sides 103, 106, 104B, 107B wherein the spacing between the rotatable elements is adjustable using a screw drive. On both sides 104B and 107B the screw drive comprises a screw rod or drive 130. The support element 133 supports the axle 109 and has a threaded engagement with the screw drive 130. The screw drive may be turned by a handles 132 which turns within a circular hollowed out area in the base. The threaded rod or drive 130 is supported at the end and turns freely within the screw anchor 131. One of ordinary skill in the art can appreciate that by turning the handle 132 the axle 109 is moved vertically (as shown in FIG. 46F) in order to change the spacing between the axles 108, 109 which in turn changes the spacing between the rotatable elements 67E and 68E or 67F and 68F. This adjustment changes the depth of the undulations or ridges imparted to the foil as the foil passes between the rotatable elements 67E and 68E or 67F and 68F. Also, the spacing between the rotatable elements 67E and 68E or 67F and 68F may be adjusted to change the spacing between the undulations or ridges in the foil. See in this regard FIG. 25, which is a schematic illustration of the resilient fingers which may provide for the adjustment of axles 108, 109, which fingers may be formed from a plastic material which is somewhat flexible, yet provides sufficient durability and support. Resilient fingers which may be a pliable plastic or elastic provide ample support for the axles 108, 109 yet are easily adjustable by moving the axles up and down in the channel formed as shown in FIG. 25. It can be readily appreciated by those of ordinary skill in the art that a variety of adjustment means may be used without departing from the scope of the invention.

FIG. 47A is a cross sectional schematic illustration of rotatable elements 67D, 67F, 68D, and 68F taken in a plane perpendicular to the axis of rotation. Each rotatable element 67D, 67F, 68D, and 68F comprises a central section 122 and an engagement surface section 121. The engagement surface section 121 comprises an apex portion which further comprises substantially linear (in the cross-section) portions which join at point (in the cross-section) or a curved portion (FIG. 47C)

FIG. 47B is a cross sectional schematic illustration of rotatable elements 67D, 67F, 68D, and 68F taken in a plane parallel to the axis of rotation. Each rotatable element 67D, 67F, 68D, and 68F comprises a central section 122 and an engagement surface section 121. The engagement surface section 121 comprises an apex portion which further comprises substantially linear (in the cross-section) portions which join at point (in the cross-section) or a curved portion (FIG. 47C)

FIG. 47C is a cross sectional schematic illustration of rotatable elements 67D, 67F, 68D, and 68F taken in a plane parallel to the axis of rotation. Each rotatable element 67D, 67F, 68D, and 68F comprises a central section 122 and an engagement surface section 121. The engagement surface section 121 comprises an apex portion which further comprises substantially linear (in the cross-section) portions and a curved portion 121C.

FIG. 48A is a cross sectional schematic illustration of rotatable elements 67, 67E, 68, and 68E taken in a plane perpendicular to the axis of rotation. Each element 67, 67E, 68, and 68E comprises a central section 124 and an engagement surface section 125. The engagement surface section 125 comprises a substantially curved portion.

FIG. 48B is a cross sectional schematic illustration of rotatable elements 67, 67E, 68, and 68E taken in a plane parallel to the axis of rotation. Each element 67, 67E, 68, and 68E comprises a central section 124 and an engagement surface section 125. The engagement surface section 125 comprises a substantially curved portion in the center of the cross-section.

Figure 49:
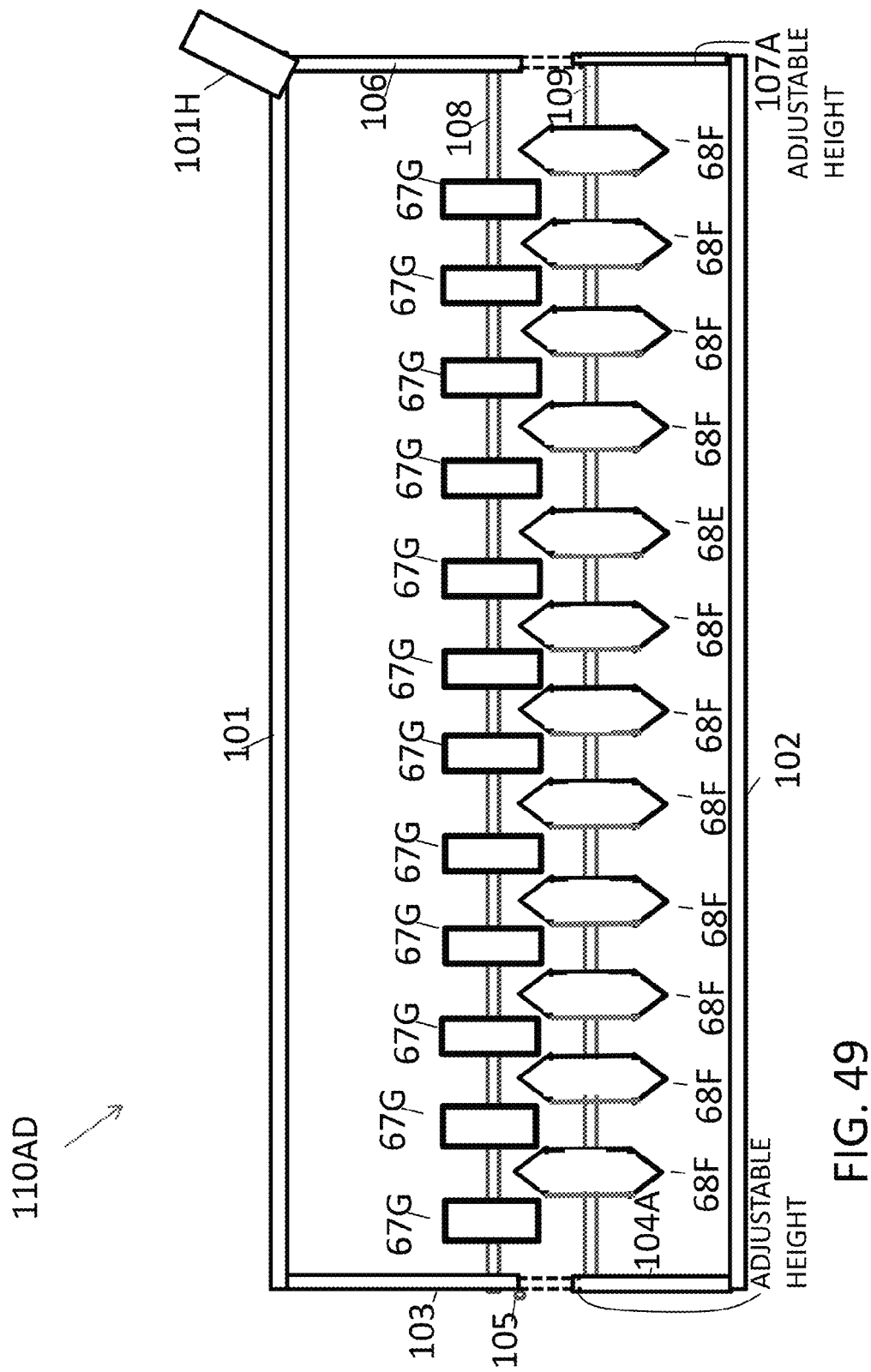
FIG. 49 is a schematic illustration of another preferred embodiment comprising rotatable elements 67F, 68G operatively associated with a base portion 102, 104, 107, and a support portion 101, 103, 106. The support portion pivots on hinge 105 and is shown in a closed or engaged position. The spacing between the rotatable elements 67G and 68F is adjustable.

FIG. 49 is a schematic illustration of another preferred embodiment comprising rotatable elements 67F, 68G operatively associated with a base portion 102, 104, 107, and a support portion 101, 103, 106. The support portion pivots on hinge 105 and is shown in a closed or engaged position. The spacing between the rotatable elements 67G and 68F is adjustable.

FIG. 50 is a schematic illustration of another preferred embodiment comprising rotatable elements 67G, 68G operatively associated with a base portion 102, 104, 107, and a support portion 101, 103, 106. The support portion pivots on hinge 105 and is shown in a closed or engaged position. The spacing between the rotatable elements 67G and 68G is adjustable. The rotatable elements 67G and 68G are cylindrical and impart ridges to the foil (see in this regard FIG. 17B, second embodiment from the top identified as a square wave). Optionally, the widths of the elements 67G, 68G may be different. For example, the widths of rotatable elements 67G may be larger, such as one half inch and the rotatable elements 68G may be one quarter of an inch.

In the alternative the assemblies 100, 110 may comprise rotatable elements configured as in the embodiment of FIG. 34, wherein the circular wheel-like portions 67C may be combined as illustrated in FIG. 34. Likewise, the circular wheel-like portions 68C may be combined as illustrated in FIG. 34.

As used herein, the terminology "grill-like" includes narrow, rounded or rectangular edges upon which an item, such as a food item, may be supported.

As used herein, the terminology "interface" refers to the interfacing portions of two separate portions, or the operative interconnection between two separate portions by which the surfaces of the nearby or adjacent portions coordinate or interact effectively.

As used herein, the terminology "undulate" or "undulated" refers to a wavelike form, outline, or appearance. As used herein, the cross-section of the aluminum foil is undulated.

As used herein, the terminology "apex" means the point of culmination and/or the end of an object or of a portion of an object. The apex may be pointed or rounded.

As used herein, the longitudinal axis of foil being unrolled is defined as extending in the direction of the unrolling foil as shown in FIG. 17.

As used herein the terminology "ridge" means a long narrow elevated portion which has a top which may be substantially rounded, flat or neither.

As used herein, the terminology "catter-corner" means the slanted across a polygon on a diagonal line; diagonally opposing.

As used herein, the terminology "wall" means a tangible, physical structure serving to enclose or protect an area, or a vertical construction built to contain or retain something.

As used herein, the terminology "serrated" or "serrations" means a configuration resembling a triangular confirmation such as that depicted in FIG. 16, which may or may not have rounded corners.

As used herein, the terminology "cross section" refers to the intersection of a body in 3-dimensional space with a plane perpendicular to the longitudinal axis.

As used herein the terminology "diagonally across" means diagonally opposite, kitty-corner; facing each other across a center line but not directly across from one another.

By way of background, household aluminum foils products commonly have a thickness in the range of 0.01-0.018 mm and a width of 300 mm (approximately 12")-500 mm (approximately 20") and a length in the range of 5-100 m. According to Wikipedia, aluminum foil is widely sold into the consumer market, often in rolls of 500 mm (20 in) width and several meters in length. Note that 30.48 centimeters equals 12 inches. Commercial aluminum foil may have a thickness less than 0.2 millimeters (0.0079 in), although much thinner gauges down to 0.006 mm are available.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

The invention claimed is:

1. A device for configuring foil for use in cooking food comprising:
   a base portion;
   a first plurality of rotatable elements operatively associated with the base portion;
   a support mounted on the base portion; and
   a second plurality of rotatable elements operatively associated with the support;
   the support operating to pivot relative to the base portion so as to allow entry of foil between the first and second plurality of rotatable elements in a first position and engagement of the first and second plurality of rotatable elements in a second position;
   whereby in the second position the first and second plurality of rotatable elements impart a configuration to the foil.

2. The device of claim 1 wherein the first and second plurality of rotatable elements are positioned diagonally across from each other.

3. The device of claim 1 wherein the base portion comprises a first axle, and wherein the first plurality of rotatable elements are rotatable on the first axle, and wherein the support comprises a second axle and wherein the second plurality of rotatable elements are rotatable on the second axle.

4. The device of claim 1 wherein when the support is in the second position, the first and second plurality of rotatable elements are interleaved and off-set from each other so as to produce one of ridges, undulations or serrations in the foil is passed therebetween.

5. The device of claim 1 wherein the base portion has a longitudinal axis and wherein the first and second plurality of rotatable elements are substantially circular in a plane perpendicular to the longitudinal axis of the base portion.

6. The device of claim 4 wherein each of the first and second plurality of rotatable elements comprise a central portion and an engagement portion, the surface of the engagement portion having a cross-section which is substantially pointed.

7. The device of claim 1 wherein each of the a first plurality of rotatable elements comprise surfaces that are circular in cross section in a first plane and form an oval in a second plane perpendicular to the first plane.

8. The device of claim 1 wherein each of the first and second plurality of rotatable elements is cylindrical.

9. The device of claim 1 wherein each of the first and second plurality of rotatable elements comprise a central portion which is substantially cylindrical and an engagement portion having a surface which forms an apex in cross-section.

10. The device of claim 1 wherein the first and second plurality of rotatable elements rotate on first and second axles, respectively, and wherein the first and second plurality of rotatable elements are adapted to pass foil therebetween in order to configure one of ridges, undulations or serrations along the longitudinal axis of the foil.

11. A device for configuring foil for use in cooking food comprising:
a base portion;
a first plurality of rotatable elements operatively associated with the base portion;
a support mounted on the base portion; and
a second plurality of rotatable elements operatively associated with the support;
the support operating to move relative to the base portion so as to allow entry of foil between the first and second plurality of rotatable elements in a first position and engagement of the foil with the first and second plurality of rotatable elements in a second position; the first plurality of rotatable elements being positioned diagonally across from the second plurality of rotatable elements;
whereby in the second position the first and second plurality of rotatable elements impart a configuration to the foil.

12. The device of claim 11 wherein the first and second plurality of rotatable elements are positioned on first and second axles, respectively, that are separated spatially from one another in the vertical direction.

13. The device of claim 12 wherein the spacing between the spatially separated first and second axles is adjustable such that the depth of the configuration imparted to the foil is adjustable.

14. The device of claim 13 wherein passage of aluminum foil between the opening between the first and second plurality of rotatable elements imparts a cross sectional configuration to the foil; the first and second plurality of rotatable elements being configured to create continuously elevated portions along the longitudinal axis of the foil.

15. The device of claim 14 wherein the continuously elevated portions are ridge-like which provide a grill-like surface along the longitudinal axis of the foil.

16. The device of claim 13 wherein the first and second plurality of rotatable elements comprise rounded engagement portions which create undulations in aluminum as the foil is passed therebetween.

17. The device of claim 11 adapted to be used in conjunction with aluminum foil having a longitudinal axis, and wherein the foil is moved in a first direction the foil is configured with continuous ridges or undulations along the longitudinal axis of the foil which provide for the circulation of air when the foil is used for cooking.

18. The device of claim 17 wherein the spacing between the ridges or undulations in the lateral direction of the foil is in a range of approximately one-eighth to approximately one inch and wherein the length of the device is approximately one of 12, 18, 20 or 24 inches.

19. The device of claim 11 wherein the first and second plurality of rotatable elements create a plurality of continuous ridges in the longitudinal direction of the foil.

20. The device of claim 11 wherein the spacing between the first and second plurality of rotatable elements is adjustable and wherein he first and second plurality of rotatable elements create one of an undulated surface or a serrated surface in aluminum foil.

* * * * *